(12) United States Patent
Harviainen

(10) Patent No.: US 12,519,992 B2
(45) Date of Patent: *Jan. 6, 2026

(54) SYSTEM AND METHOD FOR MULTIPLEXED RENDERING OF LIGHT FIELDS

(71) Applicant: InterDigital VC Holdings, Inc., Wilmington, DE (US)

(72) Inventor: Tatu V.J. Harviainen, Helsinki (FI)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/632,040

(22) Filed: Apr. 10, 2024

(65) Prior Publication Data

US 2024/0259616 A1 Aug. 1, 2024

Related U.S. Application Data

(63) Continuation of application No. 17/442,554, filed as application No. PCT/US2020/024299 on Mar. 23, 2020, now Pat. No. 11,991,402.

(Continued)

(51) Int. Cl.
  *H04N 7/12* (2006.01)
  *H04N 13/282* (2018.01)
  (Continued)

(52) U.S. Cl.
  CPC ....... *H04N 21/2343* (2013.01); *H04N 13/282* (2018.05); *H04N 13/383* (2018.05); *H04N 19/597* (2014.11)

(58) Field of Classification Search
  CPC ............ H04N 21/2343; H04N 13/282; H04N 13/383; H04N 19/597; H04N 13/117;
  (Continued)

(56) References Cited

U.S. PATENT DOCUMENTS 8,290,358 B1 10/2012 Georgiev
10,558,264 B1 2/2020 Watson
(Continued)

FOREIGN PATENT DOCUMENTS

CN 106068645 A 11/2016
CN 109923867 A 6/2019
(Continued)

OTHER PUBLICATIONS

Yang, Zhenyu, et. al., "Enabling Multi-party 3D Tele-immersive Environments with ViewCast". In ACM Transactions on Multimedia Computing, Communications and Applications, vol. 6, No. 2, (2010), pp. 111-139 (29 pages).

(Continued)

*Primary Examiner* — Gims S Philippe
(74) *Attorney, Agent, or Firm* — Smadar Gefen

(57) ABSTRACT

An example method in accordance with some embodiments may include: receiving a media manifest file identifying a plurality of representations of a multi-view video, at least a first representation of the plurality of representations comprising a first sub-sampling of views and at least a second representation of the plurality of representations comprising a second sub-sampling of views different from the first sub-sampling of views; selecting a selected representation from the plurality of representations; retrieving the selected representation; and rendering the selected representation.

8 Claims, 33 Drawing Sheets

Related U.S. Application Data

(60) Provisional application No. 62/823,714, filed on Mar. 26, 2019.

(51) Int. Cl.
*H04N 13/383* (2018.01)
*H04N 19/597* (2014.01)
*H04N 21/2343* (2011.01)

(58) Field of Classification Search
CPC .. H04N 13/194; H04N 13/232; H04N 13/366; H04N 13/16
See application file for complete search history.

(56) References Cited

U.S. PATENT DOCUMENTS

| | | | |
|---|---|---|---|
| 10,733,924 | B2 | 8/2020 | Lapstun |
| 11,284,124 | B2 | 3/2022 | D'Acunto |
| 11,367,247 | B2 | 6/2022 | Thudor |
| 2008/0043095 | A1 | 2/2008 | Vetro |
| 2012/0013746 | A1 | 1/2012 | Chen |
| 2014/0013375 | A1 | 1/2014 | Giladi |
| 2014/0019593 | A1 | 1/2014 | Reznik et al. |
| 2014/0019635 | A1 | 1/2014 | Reznik |
| 2014/0035959 | A1 | 2/2014 | Lapstun |
| 2014/0189772 | A1 | 7/2014 | Yamagishi |
| 2015/0100996 | A1 | 4/2015 | Freeman |
| 2015/0201176 | A1 | 7/2015 | Graziosi |
| 2015/0334380 | A1* | 11/2015 | Kim ............... H04N 13/327 348/54 |
| 2016/0150212 | A1 | 5/2016 | Moura |
| 2016/0156834 | A1 | 6/2016 | Kim |
| 2016/0192296 | A1 | 6/2016 | Rehan |
| 2016/0255322 | A1 | 9/2016 | Kerofsky |
| 2016/0357147 | A1* | 12/2016 | Falkenberg ......... G03H 1/0443 |
| 2017/0004750 | A1 | 1/2017 | Lapstun |
| 2017/0039904 | A1 | 2/2017 | Jepsen |
| 2017/0069133 | A1* | 3/2017 | Gu ................. G06T 19/006 |
| 2017/0118540 | A1 | 4/2017 | Thomas |
| 2018/0332317 | A1 | 11/2018 | Song |
| 2019/0174150 | A1 | 6/2019 | D'Acunto |
| 2019/0238933 | A1 | 8/2019 | Di |
| 2020/0154138 | A1 | 5/2020 | Song |
| 2020/0169753 | A1* | 5/2020 | Xiu ................. H04N 19/126 |
| 2021/0337202 | A1* | 10/2021 | Xiu ................. H04N 19/186 |

FOREIGN PATENT DOCUMENTS

| | | |
|---|---|---|
| KR | 20140115354 A | 9/2014 |
| KR | 20160065742 A | 6/2016 |
| WO | 2013109941 A2 | 7/2013 |
| WO | 2014102088 | 7/2014 |
| WO | 2017202700 A1 | 11/2017 |
| WO | 2017205794 A1 | 11/2017 |
| WO | WO2018049321 A1 | 3/2018 |
| WO | 2018068236 A1 | 4/2018 |
| WO | 2018175855 A1 | 9/2018 |
| WO | 2019024521 A1 | 2/2019 |
| WO | 2020198164 A1 | 10/2020 |

OTHER PUBLICATIONS

Wien, Mathias, et. al., "Standardization Status of Immersive Video Coding". IEEE Journal on Emerging and Selected Topics in Circuits and Systems, vol. 9, No. 1, XP011714056, Mar. 1, 2019, pp. 5-17 (13 pages).

International Search Report and Written Opinion of the International Searching Authority for PCT/US2020/024299 mailed Jun. 4, 2020, 12 pages.

International Search Report and Written Opinion of the International Searching Authority for PCT/US2020/042756 mailed Nov. 26, 2020, 13 pages.

D'Acunto, Lucia, et al. "MPD Signalling of 360 Content Properties for VR Applications". International Organization for Standardization, ISO/IEC JTC1/SC29/WG11 MPEG2016/m38605, May 2016, 16 pages.

Jin, Xin, et al., "[MPEG-I Visual] Exploration of Lenselt Data Compression". International Organization for Standardization, ISO/IEC JTC1/SC29/WG11 MPEG2018/M44685, Oct. 2018, 10 pages.

Kurutepe, Engin, et al., "Client-Driven Selective Streaming of Multiview Video for Interactive 3DTV". IEEE Transactions on Circuits and Systems For Video Technology, vol. 17, No. 11, Nov. 2007, pp. 1558-1565 (8 pages).

Ozcinar, Cagri, et al., "Adaptive 3D Multi-View Video Streaming Over P2P Networks". IEEE International Conference on Image Processing (ICIP), (2014), pp. 2462-2466 (5 pages).

International Preliminary Report on Patentability for PCT/US2020/024299 issued on Sep. 28, 2021, (8 pages).

Kara, Peter A., et al. "Evaluation of the Concept of Dynamic Adaptive Streaming of Light Field Video". IEEE Transactions on Broadcasting, pp. 1-15, 2018 (16 pages).

Ebrahimi, Touradj, et al. "JPEG Pleno: Toward an Efficient Representation of Visual Reality". IEEE MultiMedia, vol. 23, No. 4, pp. 14-20, Oct.-Dec. 2016 (7 pages).

Vetro, A., et al. "Overview of the Stereo and Multiview Video Coding Extensions of the H.264/MPEG-4 AVC Standard". Proceedings of the IEEE, 2011, pp. 1-15 (17 pages).

Sullivan, Gary J., et al. "Standardized Extensions of High Efficiency Video Coding (HEVC)". IEEE Journal of Selected Topics in Signal Processing, vol. 7, No. 6, Dec. 2013, pp. 1001-1016 (16 pages).

Kalantari, Nima Khademi, et al. "Learning-Based View Synthesis for Light Field Cameras". ACM Transactions on Graphics (TOG), 2016, 35.6: 193 (10 pages).

Niklaus, Simon, et al. "Video Frame Interpolation via Adaptive Separable Convolution". arXiv preprint arXiv:1708.01692, 2017 (10 pages).

Vukotić, Vedran, et al. "One-Step Time-Dependent Future Video Frame Prediction with a Convolutional Encoder-Decoder Neural Network". In: International Conference on Image Analysis and Processing. Springer, Cham, 2017, pp. 140-151 (11 pages).

Gürler, C. Göktug, et al. "Peer-to-Peer System Design for Adaptive 3D Video Streaming". IEEE Communications Magazine, 2013, vol. 51, No. 5, pp. 108-114 (8 pages).

Hamza, Ahmed, et al. "Adaptive streaming of interactive free viewpoint videos to heterogeneous clients." In Proceedings of the 7th International Conference on Multimedia Systems, pp. 1-12. 2016 (12 pages).

Su, Tianyu, et al. "A DASH Based HEVC Multi-View Video Streaming System". Journal of Real-Time Image Processing, May 2015, pp. 1-25 (26 pages).

Hedman, Peter, et al. "Deep blending for free-viewpoint image-based rendering". ACM Transactions on Graphics (TOG), vol. 37, No. 6, Article No. 257, Nov. 2018, pp. 1-2 (2 pages).

Graf, Mario, et al. "Towards Bandwidth Efficient Adaptive Streaming of Omnidirectional Video over HTTP". Jun. 20-23, 2017, Taipei, Taiwan (11 pages).

International Preliminary Report on Patentability for PCT/US2020/042756 issued Jan. 25, 2022, 8 pages.

Mola, I., et al., "Objective and subjective evaluation of light field image compression algorithms" In: 32nd Picture Coding Symposium. 2016 (5 pages).

Lanman, D. et al., "Near-eye light field displays" ACM Transactions on Graphics 2013 (1 page).

Zahir. A. et al., "Small form factor full parallax tiled light field display." In Stereoscopic Displays and Applications XXVI, vol. 9391, SPIE, 2015 (11 pages).

Light field Powered: First Smartphones with Holographic Displays Could Arrive Within Two Years, Lightfield Forum (2019), available at http://lightfield-forum.com/2014/08/light-field-powered-first-smartphones-with-holographic-displays-could-arrive-within-two-years/ (last visited Jul. 22, 2019) 7 pages.

(56) References Cited

OTHER PUBLICATIONS

[MPEG-I Visual] Introduction to a New Test Sequence "Tunnel_Train_2" Captured by Light Field Video Camera, http://www.fujii.nuee.nagoya-u.ac.jp/multiview-data/, 2018 (8 pages).

* cited by examiner

FIG. 6A — FULL ARRAY 5x5 (600)

| (1,1) | (1,2) | (1,3) | (1,4) | (1,5) |
|---|---|---|---|---|
| (2,1) | (2,2) | (2,3) | (2,4) | (2,5) |
| (3,1) | (3,2) | (3,3) | (3,4) | (3,5) |
| (4,1) | (4,2) | (4,3) | (4,4) | (4,5) |
| (5,1) | (5,2) | (5,3) | (5,4) | (5,5) |

FIG. 6B — SUBSAMPLED 3x3 UNIFORM (620)

| (1,1) | (1,3) | (1,5) |
|---|---|---|
| (3,1) | (3,3) | (3,5) |
| (5,1) | (5,3) | (5,5) |

FIG. 6C — SUBSAMPLED 3x3 CENTER (640)

| (1,1) | (2,3) | (1,5) |
|---|---|---|
| (3,2) | (3,3) | (3,4) |
| (5,1) | (4,3) | (5,5) |

FIG. 6D — SUBSAMPLED 3x3 LEFT (660)

| (1,1) | (2,2) | (1,5) |
|---|---|---|
| (3,1) | (3,2) | (3,3) |
| (5,1) | (4,2) | (5,5) |

SYSTEM AND METHOD FOR MULTIPLEXED RENDERING OF LIGHT FIELDS

CROSS-REFERENCE TO RELATED APPLICATIONS

The present application is a continuation of U.S. patent application Ser. No. 17/442,554, entitled "SYSTEM AND METHOD FOR MULTIPLEXED RENDERING OF LIGHT FIELDS" and filed Sep. 23, 2021, which is hereby incorporated by reference in its entirety and which is a national stage application under 35 U.S.C. § 371 of International Application No. PCT/US2020/024299, entitled "SYSTEM AND METHOD FOR MULTIPLEXED RENDERING OF LIGHT FIELDS," filed on Mar. 23, 2020, which claims benefit under 35 U.S.C. § 119(e) from U.S. Provisional patent application Ser. No. 62/823,714, entitled "System and Method for Multiplexed Rendering of Light Fields," filed Mar. 26, 2019, which is hereby incorporated by reference in its entirety.

BACKGROUND

Many display technologies enabling adjustable viewpoint viewing of video content are emerging. Light fields used by such adjustable viewpoint displays may include vast amounts of data. Handling of light field data may become a bottleneck for networks.

SUMMARY

An example method in accordance with some embodiments may include: receiving a media manifest file identifying a plurality of representations of a multi-view video, at least a first representation of the plurality of representations including a first sub-sampling of views and at least a second representation of the plurality of representations comprising a second sub-sampling of views different from the first sub-sampling of views, selecting a selected representation from the plurality of representations; retrieving the selected representation; and rendering the selected representation.

For some embodiments of the example method, each representation of the plurality of representations may have a respective density of views toward a particular respective direction.

For some embodiments of the example method, the media manifest file may identify, for one or more representations of the plurality of representations, the respective density of views and the particular respective direction.

For some embodiments of the example method, the two or more different sub-samplings of views may differ at least in with respect to density of views of the sub-samplings of views toward particular directions.

Some embodiments of the example method may further include: tracking the view direction of the user, wherein selecting the selected representation may include selecting a sub-sampling of views of the two or more sub-samplings of views, the selected sub-sampling of views having a high density of view toward the tracked view direction of the user.

Some embodiments of the example method may further include: tracking the view direction of the user, wherein selecting the selected representation may include selecting the selected representation based on the tracked view direction of the user.

Some embodiments of the example method may further include: obtaining the view direction of the user, wherein selecting the selected representation comprises selecting the selected representation based on the obtained view direction of the user.

For some embodiments of the example method, selecting the selected representation may be based on a position of a user.

For some embodiments of the example method, selecting the selected representation may be based on a bandwidth constraint.

For some embodiments of the example method, at least one of the plurality of representations may include a higher density of views for a first view direction than a second view direction.

Some embodiments of the example method may further include generating a signal for display using the rendered representation.

Some embodiments of the example method may further include tracking a head position of a user, wherein selecting the selected representation may be based on the head position of the user.

Some embodiments of the example method may further include tracking a direction of gaze of a user, wherein selecting the selected representation may be based on the direction of gaze of the user.

Some embodiments of the example method may further include determining a viewpoint of the user using the direction of gaze of the user, wherein selecting the selected representation may include selecting the selected representation based on the viewpoint of the user.

Some embodiments of the example method may further include determining a viewpoint of the user using the direction of gaze of the user; and selecting at least one sub-sampling of a view of the multi-view video, wherein selecting the at least one sub-sampling of the view may include selecting at least one sub-sampling of the view within a threshold viewpoint angle of the viewpoint of the user.

Some embodiments of the example method may further include interpolating at least one view, wherein selecting the selected representation may select the selected representation from the plurality of representations and the at least one view.

For some embodiments of the example method, wherein the media manifest file may include priority data for one or more views, and wherein interpolating the at least one view uses the priority data.

For some embodiments of the example method, wherein the media manifest file may include priority data for one or more views, and wherein selecting the selected representation uses the priority data.

Some embodiments of the example method may further include: obtaining light field content associated with the selected representation; decoding a frame of the light field content; combining two or more views represented in the frame to generate a combined view synthesis result; and rendering to a display the combined view synthesis result.

For some embodiments of the example method, the frame may include a frame-packed representation of two or more views corresponding to the selected representation.

For some embodiments of the example method, for at least one of the plurality of representations, the media manifest file may include information corresponding to two or more views of the light field content.

For some embodiments of the example method, selecting the selected representation may select the representation based on at least one of the following criteria: user head position, gaze tracking, complexity of the content, display capability, and bandwidth available to retrieve light field content.

For some embodiments of the example method, selecting the selected representation may include: predicting a viewpoint of a user; and selecting the selected representation based on the predicted viewpoint of the user.

Some embodiments of the example method may further include: obtaining light field content associated with the selected representation; generating a generated view of the light field content from the obtained light field content; and rendering to a display the generated view.

For some embodiments of the example method, generating the generated view of the light field content may include: decoding a frame of the light field content; and combining two or more views represented in the frame to generate the generated view, wherein the obtained light field content may include the frame of the light field content.

Some embodiments of the example method may further include: decoding a frame of light field content; and combining two or more views represented in the frame to generate a combined view synthesis result, wherein the plurality of representations of the multi-view video may include a plurality of sub-sampling of views of the light field content, and wherein rendering the selected representation may include rendering the combined view synthesis result to a display.

Some embodiments of the example method may further include: requesting the media manifest file from a server; and requesting the light field content associated with the selected view subset, wherein obtaining the light field content associated with the selected view subset may include executing a process selected from a group consisting of: retrieving the light field content associated with the selected view subset from the server, requesting the light field content associated with the selected view subset from the server, and receiving the light field content associated with the selected view subset.

For some embodiments of the example method, combining two or more views represented in the frame may include using a view synthesis technique.

For some embodiments of the example method, selecting one of the plurality of sub-sampling of views may select the view subset based on at least one of the following criteria: user head position, gaze tracking, complexity of the content, display capability, and bandwidth available to retrieve light field content.

For some embodiments of the example method, selecting one of the plurality of sub-sampling of views may include: predicting a viewpoint of a user; and selecting the view subset based on the predicted viewpoint of the user.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file including information for a plurality of subsampled representations of views of light field video content; selecting one of the plurality of subsampled representations; obtaining the selected subsampled representation; interpolating one or more sub-views from the selected subsampled representation using the information in the manifest file respectively corresponding to the one or more views; synthesizing one or more synthesized views from the one or more sub-views; and displaying the one or more synthesized views.

Some embodiments of the example method may further include estimating bandwidth available for streaming the light field video content, such that selecting the subsampled representation of the plurality of subsampled representations is based on the estimated bandwidth.

Some embodiments of the example method may further include tracking a position of a user, such that selecting the subsampled representation of the plurality of subsampled representations is based on the position of the user.

Some embodiments of the example method may further include requesting the light field video content from a server, wherein obtaining the selected subsampled representation may include executing a process selected from a group consisting of: retrieving the selected subsampled representation from the server, requesting the selected subsampled representation from the server, and receiving the selected subsampled representation.

For some embodiments of the example method, the information in the manifest file may include location data of two or more views.

For some embodiments of the example method, the information in the manifest file may include interpolation priority data for one or more of the plurality of views, and selecting one of the plurality of subsampled representations may be based on the interpolation priority data for one or more of the plurality of views.

Some embodiments of the example method may further include tracking a head position of a user, wherein selecting one of the plurality of subsampled representations is based on the head position of the user.

Some embodiments of the example method may further include tracking a direction of gaze of a user, wherein selecting one of the plurality of subsampled representations may be based on the direction of gaze of the user.

Some embodiments of the example method may further include: determining a viewpoint of the user from the direction of gaze of the user; and selecting one or more sub-views of the light field video content from a group including the one or more interpolated views and the selected subsampled representation, wherein synthesizing the one or more synthesized views from the one or more interpolated sub-views may include synthesizing the one or more synthesized views of the light field using the one or more selected sub-views and the viewpoint of the user.

Some embodiments of the example method may further include displaying the synthesized view of the light field.

For some embodiments of the example method, selecting one or more sub-views of the light field may include selecting one or more sub-views within a threshold viewpoint angle of the viewpoint of the user.

Some embodiments of the example method may further include: determining a viewpoint of the user from the direction of gaze of the user, wherein selecting one of the plurality of subsampled representations may include selecting the subsampled representation based on the viewpoint of the user.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file including information for a plurality of sub-sampling of views of light field content; selecting one of the plurality of subsampling of views; obtaining light field content associated with the selected sub-sampling of views; decoding a frame of the light field content; combining two or more views represented in the frame to generate a combined view synthesis result; and rendering the combined view synthesis result to a display, wherein the obtained light field content comprises the frame of the light field content.

Some embodiments of the example method may further include: requesting the media manifest file from a server; and requesting the light field content associated with the selected view subset, wherein obtaining the light field content associated with the selected view subset may include executing a process selected from a group consisting of: retrieving the light field content associated with the selected view subset from the server, requesting the light field content associated with the selected view subset from the server, and receiving the light field content associated with the selected view subset.

For some embodiments of the example method, the frame may include a frame-packed representation of two or more views corresponding to the selected view subset.

For some embodiments of the example method, the media manifest file may include information corresponding to the two or more views corresponding to the selected view subset.

For some embodiments of the example method, for at least one of the plurality of sub-sampling of views, the media manifest file may include information corresponding to two or more views of the light field content.

For some embodiments of the example method, selecting one of the plurality of sub-sampling of views may include parsing the information in the media manifest file for the plurality sub-sampling of views of light field content.

For some embodiments of the example method, combining two or more views represented in the frame may include using a view synthesis technique.

For some embodiments of the example method, selecting one of the plurality of sub-sampling of views may select the view subset based on at least one of the following criteria: gaze tracking, complexity of the content, display capability, and bandwidth available to retrieve light field content.

For some embodiments of the example method, selecting one of the plurality of sub-sampling of views may include: predicting a viewpoint of a user; and selecting the view subset based on the predicted viewpoint of the user.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file including information for a plurality of sub-sampling of views of light field content; selecting one of the plurality of sub-sampling of views; obtaining light field content associated with the selected view subset; generating a view from the obtained light field content; and rendering the generated view to a display.

For some embodiments of the example method, generating the view from the obtained light field content may include interpolating the view from the light field content associated with the selected view subset using the information in the manifest file respectively corresponding to the view to generate the generated view.

For some embodiments of the example method, generating one or more views from the obtained light field content may include: decoding a frame of the light field content; and combining two or more views represented in the frame to generate the generated view, wherein the obtained light field content may include the frame of the light field content.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file identifying a plurality of sub-sampling of views of a multi-view video, the plurality of sub-sampling of views including two or more different density of views; selecting a selected sub-sampling from the plurality of sub-sampling of views; retrieving the selected sub-sampling; and rendering the selected sub-sampling.

An example apparatus in accordance with some embodiments may include: a processor; and a non-transitory computer-readable medium storing instructions that are operative, when executed by the processor, to perform any one of the methods listed above.

An example method in accordance with some embodiments may include: rendering a representation of views including a full array of light field video content; sending the rendered full array representation of views; obtaining a current viewpoint of a client; predicting a future viewpoint using the current viewpoint and a viewpoint motion model; prioritizing a plurality of subsampled representations of views of the light field video content; rendering the prioritized plurality of subsampled representations of views of light field video content; and sending the prioritized plurality of subsampled representations of views.

An example apparatus in accordance with some embodiments may include: a processor; and a non-transitory computer-readable medium storing instructions that are operative, when executed by the processor, to perform any one of the methods listed above.

An example method in accordance with some embodiments may include: selecting a plurality of sub-views of light field video content; producing streaming data for each of the plurality of sub-views of the light field video content; and producing a media manifest tile including the streaming data for each of the plurality of sub-views of the light field video content.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a request for information for light field video content; sending a media manifest file including information for a plurality of subsampled representations of views of the light field video content when the request is a new session request; and sending a data segment including a sub-set of the light field video content when the request is a sub-set data segment request.

An example apparatus in accordance with some embodiments may include: a processor; and a non-transitory computer-readable medium storing instructions that are operative, when executed by the processor, to perform any one of the methods listed above.

An example signal in accordance with some embodiments may include a signal carrying a representation of views including a full array of light field video content and a plurality of subsampled representations of views of the light field video content.

An example signal in accordance with some embodiments may include a signal carrying a plurality of sub-views of light field video content.

An example signal in accordance with some embodiments may include a signal carrying streaming data for each of a plurality of sub-views of light field video content.

An example signal in accordance with some embodiments may include a signal carrying information for a plurality of subsampled representations of views of light field video content.

An example signal in accordance with some embodiments may include a signal carrying a data segment including a sub-set of light field video content.

BRIEF DESCRIPTION OF THE DRAWINGS

FIG. 6A is a diagram showing an example full image 5×5 array light field configuration corresponding to FIG. 2 according to some embodiments.

FIG. 6B is a diagram showing an example uniform subsampled 3×3 array light field configuration corresponding to FIG. 3 according to some embodiments.

FIG. 6C is a diagram showing an example center-biased subsampled 3×3 array light field configuration corresponding to FIG. 4 according to some embodiments.

FIG. 6D is a diagram showing an example left-biased subsampled 3×3 array light field configuration corresponding to FIG. 5 according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description.

Example Networks for Implementation of the Embodiments

A wireless transmit/receive unit (WTRU) may be used, e.g., as a viewing client in some embodiments described herein.

Figure 1A:
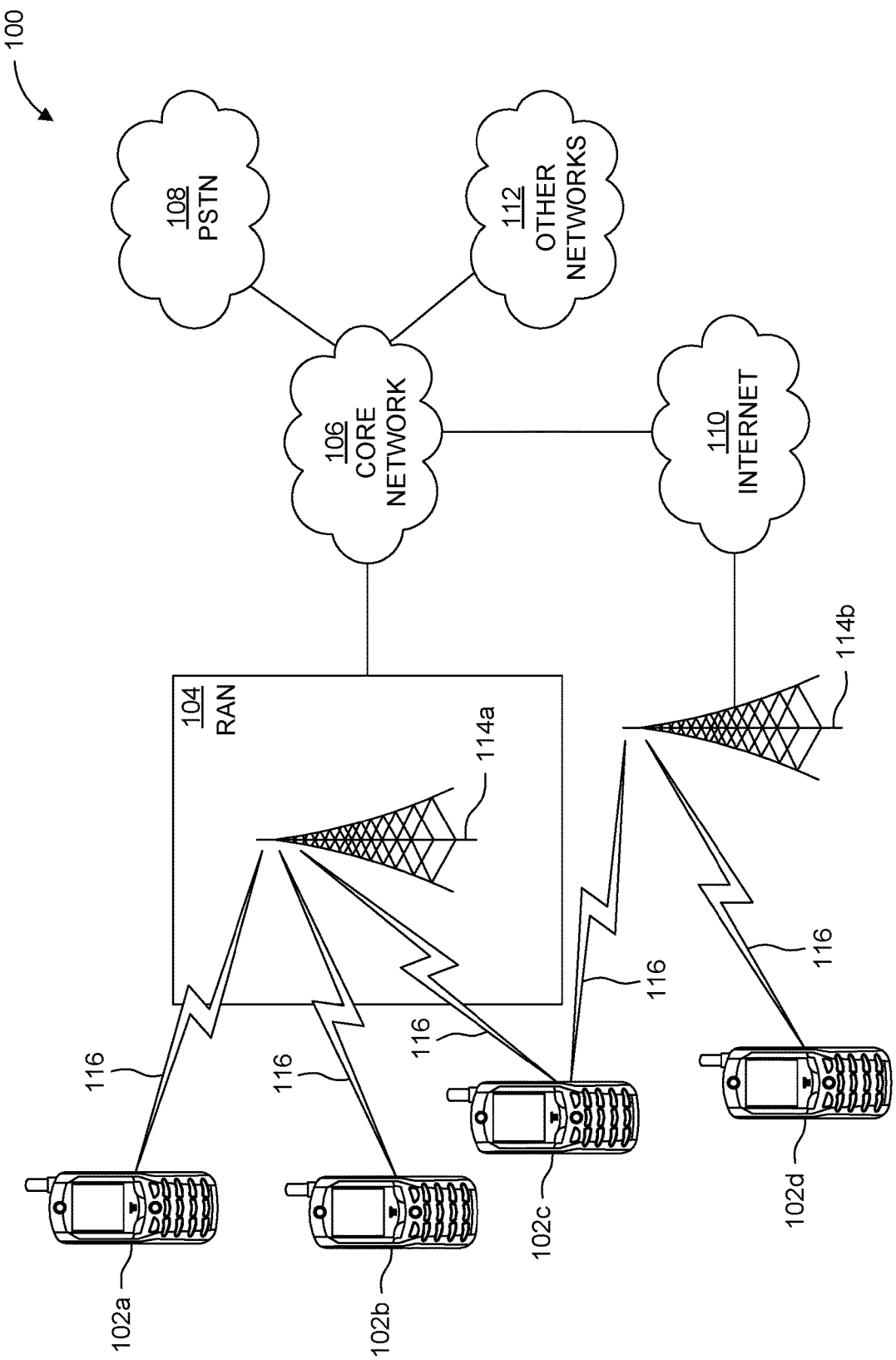
FIG. 1A is a system diagram of an example system illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104/113 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
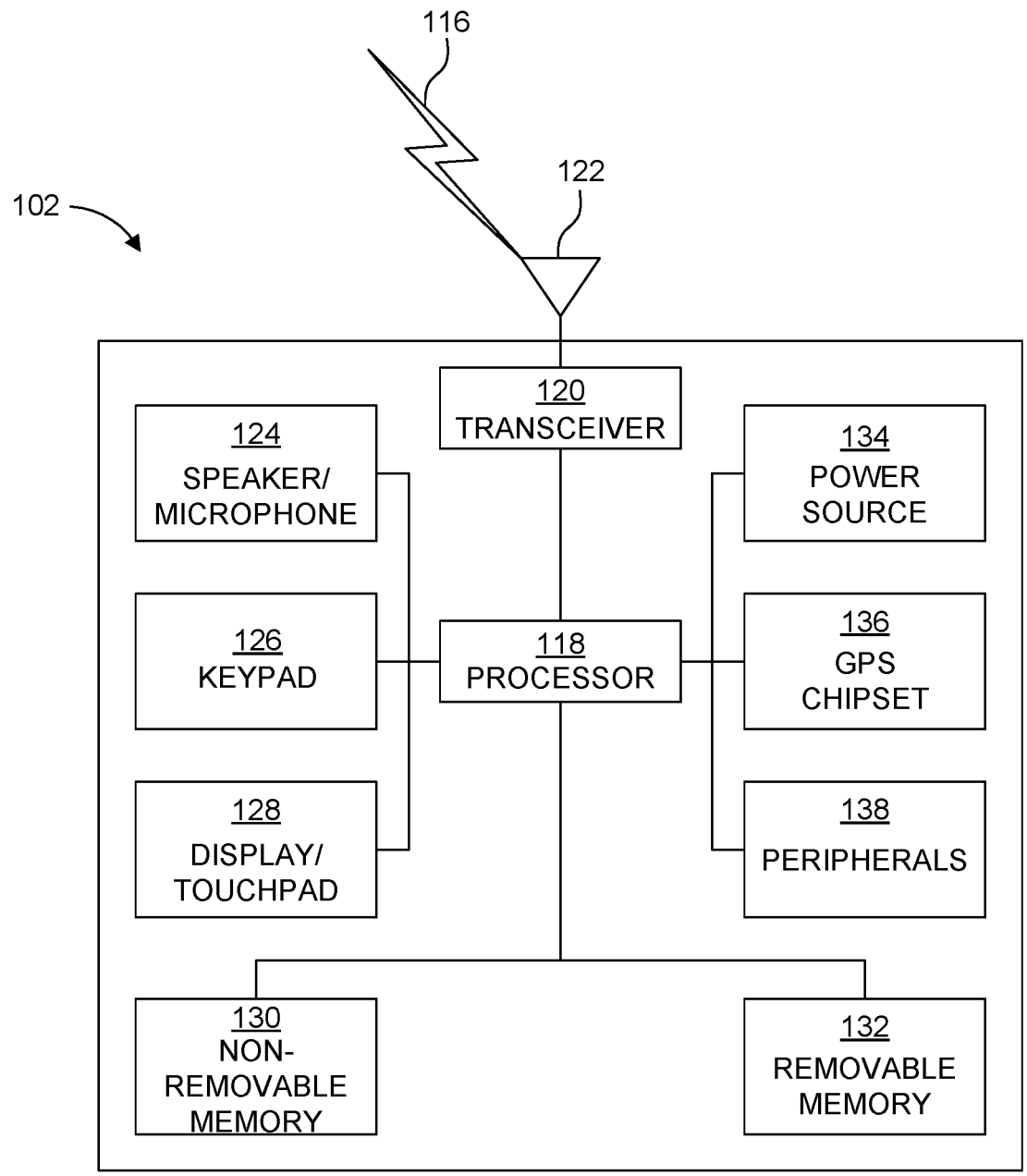
FIG. 1B is a system diagram of an example system illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Light fields produce vast amounts of data, which may include descriptions of the amount of light flowing in a set of directions emanating from a point in space. A high-fidelity light field, as a representation of a 3D scene, may contain a huge amount of data. In order to support real-time transmission and visualization, efficient data distribution optimization methods may be needed, and the amount of light field data rendered and transmitted may be reduced.

For compressing a traditional 2D video, various lossless and lossy bitrate reduction and compression methods have been developed. In addition to current spatio temporal compression methods, one class of bitrate reduction methods sends parts of the information integrally, multiplexed over time. With CRT displays, multiplexing was widely used in the format of interlacing image lines in analog TV transmission.

Another class of compression algorithms are various prediction methods, which may typically be used similarly in both the transmission side (encoder or server) and the receiving side (decoder). These predictions may be both spatial (intra frame) or temporal (inter frame). Some of the above-mentioned approaches have been used also with light fields. As an example, the journal article, Kara, Peter A., et al., *Evaluation of the Concept of Dynamic Adaptive Streaming of Light Field Video*, IEEE TRANSACTIONS ON BROADCASTING (2018), describes how subjective quality of light field renderings is affected by simple quality switching and stalling (frame freezing) approaches and balancing between associated tradeoffs between transfer bitrate, light field angular resolution, and spatial resolution.

In general, methods applying predictive coding methods to real-time transmission of light fields are still rare. An example of light field compression is discussed in the journal article Ebrahimi, Touradj, et al., *JPEG Pleno: Toward an Efficient Representation of Visual Reality*, 23:4 IEEE MULTIMEDIA 14-20 (October-December 2016). This article describes how existing multi-view coding methods (e.g. MPEG HEVC or 3D HEVC) may be used for the compression of light fields. 3D HEVC is an extension of HEVC for supporting depth images.

H.264 MVC, and later MFPEG HEVC (H.265) and its derivatives, support several important 3D functionalities. These include viewing content on external 3D displays, which project a set of viewpoints into different angular directions in space. For this purpose, the entire 3D information may generally be transmitted and decoded. The aforementioned standards also support dynamic viewpoints and motion parallax using conventional 2D displays including HMD, but in these applications, receiving a complete set of spatial views for one or a few time-varying user viewpoints may not be optimal.

The H.264 MVC, HEVC and 3D HEVC standards may be used for the coding of light field data. A traditional and commonly-used format for light fields is the matrix of views (integral format), which represents different viewpoints to a scene as a matrix/mosaic of 2D views from adjacent viewpoints. For example, the HEVC standard supports up to 1024 multiviews, which may be applied to light fields represented by multiple sub-views.

MPEG video codecs may be used for compressing light fields in multiview format. In these codecs, the Network Abstraction Layer (NAL) defines an upper level data structure but also causes restrictions in exploiting of sub-view redundancies over time. In particular, according to the journal article Vetro, Anthony, et al., *Overview of the Stereo and Multiview Video Coding Extensions of the H.264/MPEG-4 AVC Standard*, 99:4 PROC. IEEE 1-15 (April 2011) ("Vetro"), this NAL structure does not allow predicting of a sub-view picture at a given time instant from another sub-view picture at a different time instant. Further, for backward compatibility reasons, Vetro is understood to state that compressed MVC multiview must include a base view bitstream. In usage scenarios where the base view is not used, or is used only from time to time, this condition leads to excessive use of bandwidth during transmission.

In existing multiview coding standards, as discussed in Sullivan, Gary J., et al., *Standardized Extensions of High Efficiency Video Coding (HEVC)*, 7:6 IEEE J. SELECTED TOPICS IN SIGNAL PROC. 1001-16 (December 2013), all views may generally need to be decoded even if a particular sub-view is being viewed. Correspondingly, decoding only one sub-view at a time may not be possible, except if the sub-view is the mandatory base view.

Journal article Kurutepe, Engin, et al., *Client-Driven Selective Streaming of Multiview Video for Interactive 3DTV*, 17:11 IEEE TRANS. ON CIRCUITS AND SYSTEMS FOR VIDEO TECHNOLOGY 1558-65 (2007) ("Kurutepe") proposes a modification to the MVC structure to allow individual views of a multiview video to be distributed as enhancement layers. Enhancement layers are linked with the MVC base layer containing low bitrate spatially down sampled frames for all the views of the multiview video. As such, the proposed alternative MVC structure is understood to distribute all views, but only as low-quality versions while contrary to standard MVC, single view or view pair high resolution versions may be selectively downloaded as an enhancement layer. In addition to proposing modification to the MVC structure, Kurutepe describes pre-fetching of views according to the predicted user head location in the future inferred from collected head tracking data.

With distribution of large data files, a peer-to-peer (P2P) distribution model provides a robust alternative to the strict client-server model alleviating server connection and bandwidth requirements as clients share parts of the data they have already downloaded among all other clients. P2P distribution has also been considered for visual content distribution. Articles Ozcinar, et al., *Adaptive 3D Multi-View Video Streaming Over P2P Networks*, CONFERENCE PROCEEDINGS OF 2014 IEEE INTERNATIONAL CONFERENCE ON IMAGE PROCESSING (ICIP) 2462-66 (2014) ("Ozcinar") and Gürler, C. Goktug & Tekalp, Murat, *Peer-to-Peer System Design for Adaptive 3D Video Streaming*, 51:5 IEEE COMM. 108-114 (2013) ("Gürler") propose adaptive P2P multiview content distribution solutions. In proposed approaches, all clients connecting to the streaming session are connected into a mesh network where each client downloads missing content segments from the server or any client in the mesh while also allowing other clients to download segments they have already downloaded. A tracker is being used to collect and share information about available content segments on each client. Gürler proposes two multiview adaptation approach variations both of which perform adaptation by degrading image quality between individual sub-views of the multiview content asymmetrically, following observations from previous asymmetric image quality studies done on stereoscopic views. Both Ozcinar and Gürler discuss distributing depth information along with the color images of the multiview content. Ozcinar proposes distribution of additional metadata describing which of the multiview image downloads are preselected to be discarded in case of network congestion as a practical mechanic for handling the adaptation on the client side. The experimental results show that the robustness of P2P multi-view streaming using the proposed adaptation scheme is significantly increased under congestion.

In addition to the camera array producing high resolution sub-views, a lensarray optics may be used in the capturing that produces the light field image in a lenslet format. If using a lenslet format for light fields, the contents may be converted to a multiview light field before the compression (cf. JPEG Pleno) and back to lenslet format for the receiver to use.

Resolution and frame rate of a video sequence may be adapted to enable content streaming via the DASH protocol. Many other devices do not use the angular aspect of light field content in adaptive video streaming. Many other devices also do not vary the number of views bundled into a frame-packed multi-view representation.

Multiplexed Light Field Rendering

Supporting dynamic user viewpoints and motion parallax with many existing multi-view coding standards may generally lead to excessive usage of bandwidth, especially in applications producing only single-view or stereo-view 2D images for the display in a single time step. Examples of such applications include 3DoF+ or 6DoF application based on viewing the content on HMDs or other 2D displays.

For optimizing the rendering and data distribution, a subset of the full integral light field data may be produced and transmitted, and the receiver may synthesize additional views from the views transmitted. Furthermore, the impact of perceived image quality resulting from the selection of rendered and transmitted sub-views may guide the process of sub-view rendering either at the server side or on the client side to ensure the quality of experience.

For some embodiments, data transmission may be optimized with a multiplexed rendering of a light field (which may be at the content server) and view synthesis (which may be at the viewing client), which may mitigate the temporal variance in the light field data caused by the multiplexing.

The viewing client may send the current viewpoint to the content server or analyze content locally and request specific light field sub-views. A viewpoint motion estimation model may be used to predict the client viewpoint for a future time step. Based on the viewpoint prediction, sub-views of the integral light field may be prioritized. Priorities may control rendering and transmission of individual sub-views of the integral light field.

In some embodiments, processes multiplexing light field data may not transmit all integral light field images each time step but instead transmit a subset of sub-views. The content delivery bandwidth used may be reduced as a result. Temporal multiplexing of sub-views may be detected in the transmission of data and associated metadata (e.g., streamed sub-view and virtual camera specifications and timestamps), as well as current viewpoint signaling by the client.

In accordance with some embodiments, server-side processing may be reduced, and content delivery bandwidth requirements may be reduced by dynamically limiting the number of light field sub-views that are rendered and delivered. The content server may continually render individual light field sub-views instead of rendering full integral images for each time step in a sequential fashion, using content analysis to prioritize rendering of the sub-views to maintain image quality perceived by the viewer on the client side.

In some embodiments, the viewer uses an HMD or similar mobile device that provides monocular or stereoscopic views by synthesizing novel views to the light field data according to the tracking and user input.

Some embodiments use, e.g., an example server push model or an example client pull model for streaming. In the server push model, for example, an example server process may prioritize sub-view rendering and streaming according to the viewpoint signaled by the client, and an example client process may synthesize viewpoints from the light field data if a sub-view of the integral light field has temporal variability. In the client pull model, for example, operating, e.g., similar to the MPEG-Dash model, the server may provide a manifest file to the client indicating versions of the array image for different viewing locations, and the client may, in some embodiments: determine the number of sub-views based on bandwidth and viewer position for the collection of sub-views described in the manifest; prioritize the sub-views; and pull data from the content server according to priority.

Supporting dynamic viewpoints and motion parallax with existing multi-view coding standards may generally lead to excessive usage of bandwidth in particular in applications requiring only one viewpoint at a time. Such applications may include for example certain 3DoF+ or 6DoF applications, e.g., based on viewing either real-time or stored content by HMDs or other 2D displays. Systems and methods described herein in accordance with some embodiments may avoid existing restrictions by taking into account current and predicted user viewpoint and impact of chosen rendered and transmitted sub-views to the perceived image quality.

In general, by tracking a user, and predicting his/her movements and viewpoint, substantial savings in bitrate may be obtained. In Yang, Zhengyu, et al., *Enabling Multiparty 3D Tele-immersive Environments with ViewCast*, 6:2 ACM TRANS. ON MULTIMEDIA COMPUTING, COMM'S, AND APPL'S 111-139 (March 2010) ("Yang"), temporal prediction of user viewpoints to a real-time 3D captured scene resulted with bitrate savings of about 70% (if using viewpoint prediction, instead of eight 3D captures per scene, an average of 2-3 simultaneous captures was coded and transmitted). Yang provides some examples of user viewpoint prediction techniques. Example methods and systems disclosed herein, in accordance with some embodiments, apply, e.g., user viewpoint prediction to, e.g., light field rendering. Yang is not understood to apply user viewpoint prediction to light field rendering.

Some embodiments reduce the number of sub-views that are rendered and transmitted via content analysis and multiplexed light field rendering. In some embodiments, by analyzing the content based on the content features, the estimated user viewpoint location, and the prediction accuracy of the estimated viewpoint location, the content server weights the priorities for full light field sub-views that in turn may determine the order and frequency at which the sub-views are rendered and submitted. Dynamic selection of a set of view subsampling locations may allocate greater view density near a predicted viewpoint, allowing improved interpolation of views near the predicted viewpoint if the rendered frames reach the viewing client and are displayed. Coarser view sampling may be used away from the signaled viewpoint to enable data to be shown for areas that are not in focus or that are in focus instead of the predicted viewpoint due to inaccuracy in the viewpoint motion estimation. FIGS. 2 to 5 illustrate example priorities assigned for light field sub-images.

Figure 2:
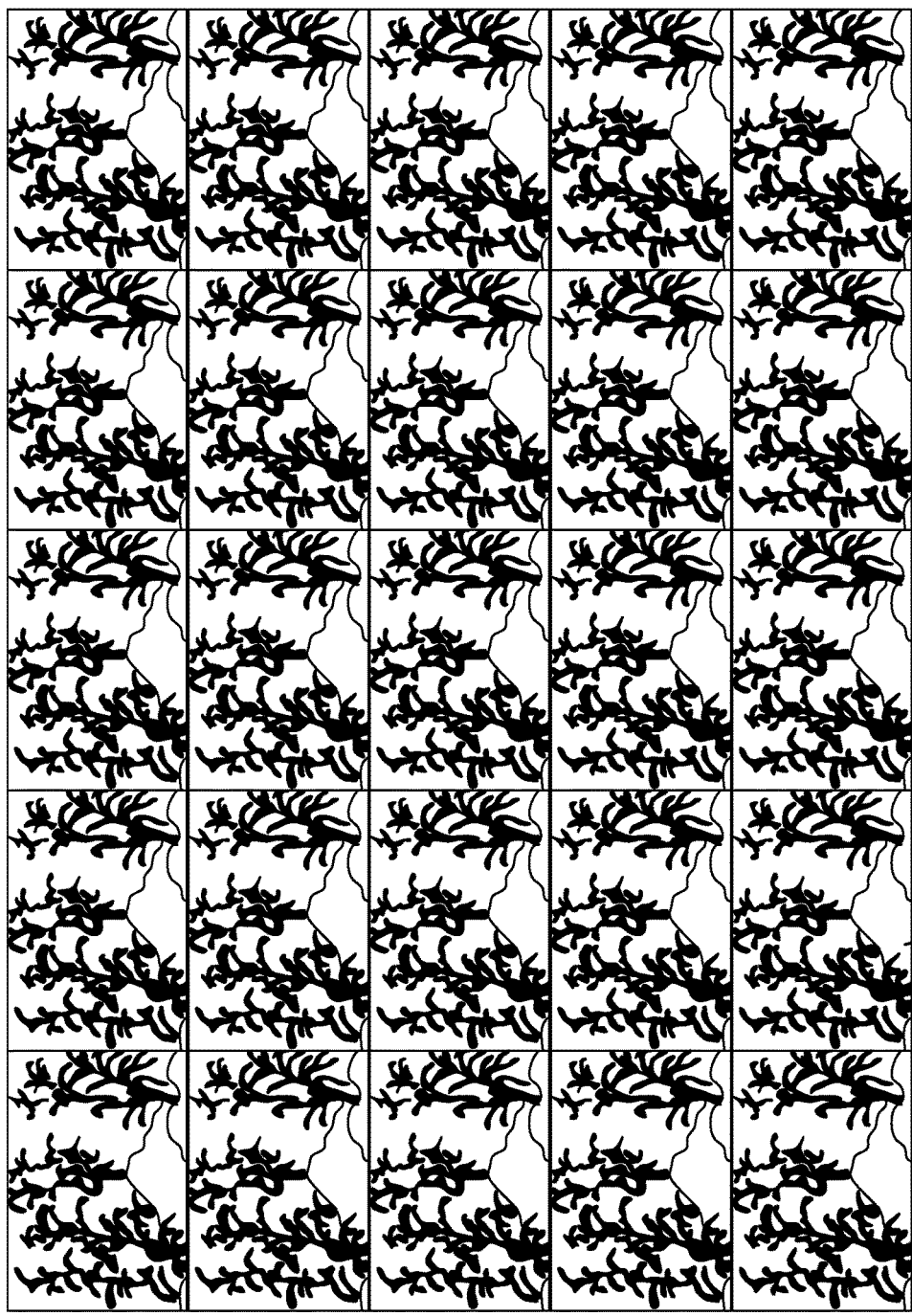
FIG. 2 is a schematic illustration showing an example full light field rendered with 5×5 sub-views according to some embodiments.

FIG. 2 is a schematic illustration showing an example full light field rendered with 5×5 sub-views according to some embodiments. In FIG. 2, an example full light field 200 is rendered with a 5×5 virtual camera array of sub-views 202. FIG. 2 shows an example full light field 200 upon which the sub-sampling examples of FIGS. 3-5 are based.

Figure 3:
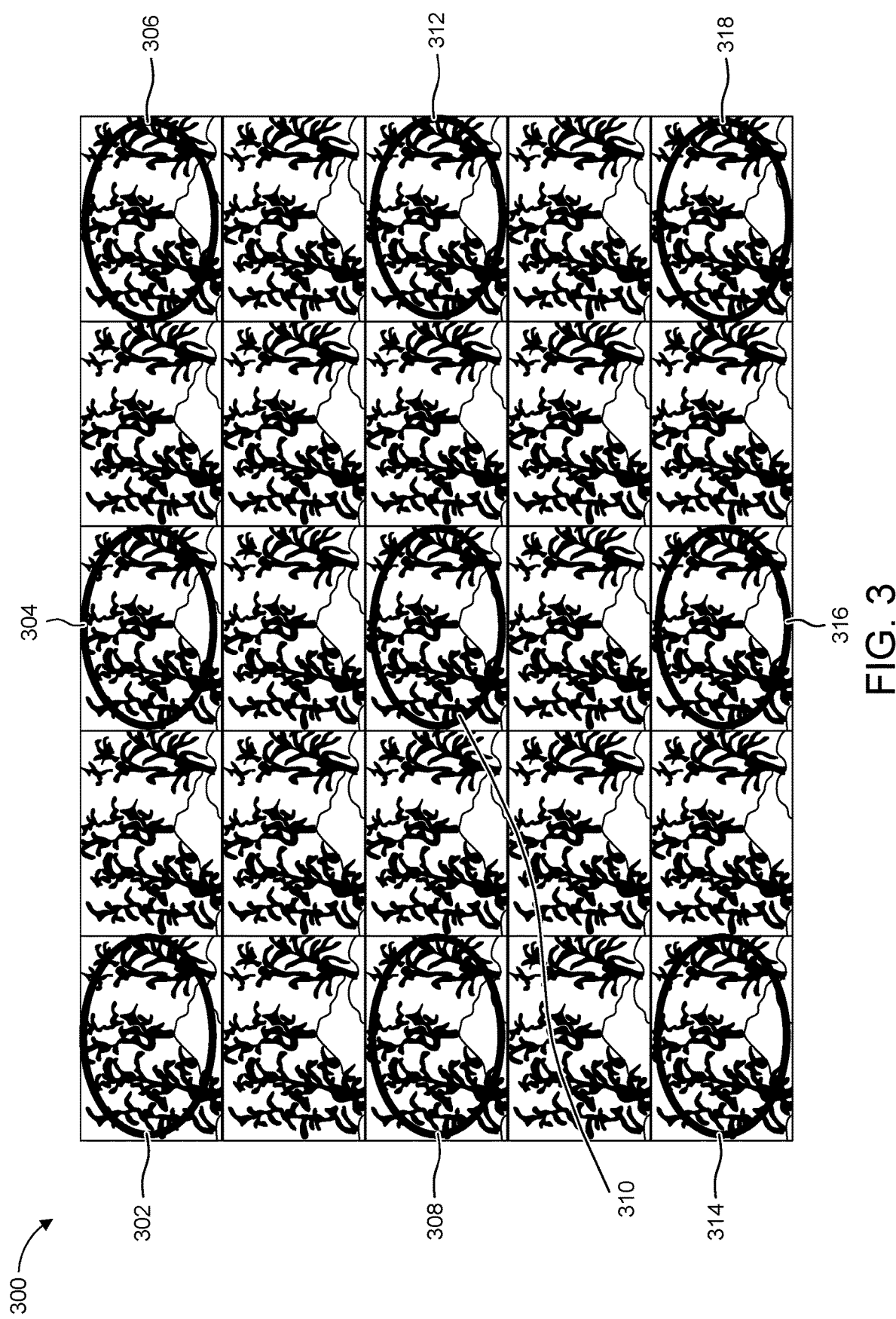
FIG. 3 is a schematic illustration showing example sub-sampling using 3×3 sub-views according to some embodiments.

FIG. 3 is a schematic illustration showing example subsampling using 3×3 sub-views according to some embodiments. To reduce bandwidth, a 3×3 array of images may be selected from the example full light field 300 for transmission to the client. For some embodiments, the server may use estimated viewpoint locations predicted by a viewpoint motion model to prioritize sub-views. FIG. 3 shows an example 3×3 array of sub-views 302, 304, 306, 308, 310, 312, 314, 316, 318 selected in a form of a checkerboard pattern with the selected sub-views shown with solid black ovals.

In accordance with some embodiments, subsampling views may generally reduce the transmission bandwidth with view interpolation used at the receiver to generate additional views. In some embodiments, the location of subsampled views are specified relative to a full grid. Different subsampling priority may be assigned based on user gaze. Individual light field sub-view priorities may be determined based on content analysis and context information (e.g., user/gaze location and display capabilities). Individual sub-view sets may be produced and/or transmitted in sequential fashion based on the priorities. On the client side, a cache may receive sub-views and the client may use temporally-coherent interpolations of sub-views to synthesize viewpoints, e.g., novel viewpoints.

Figure 4:
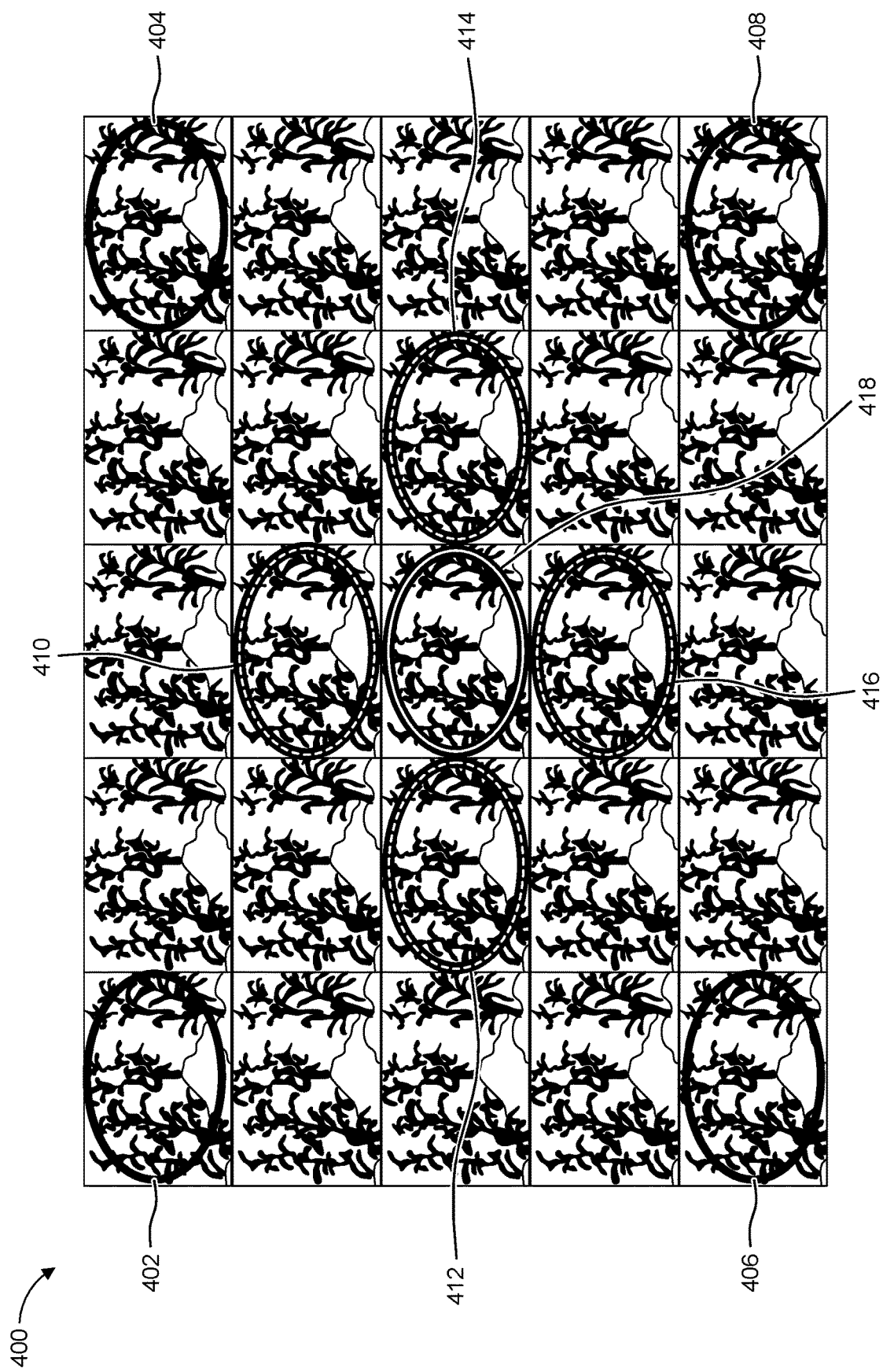
FIG. 4 is a schematic illustration showing example 5×5 sub-views assigned with priorities based on an estimated viewpoint according to some embodiments.
Figure 5:
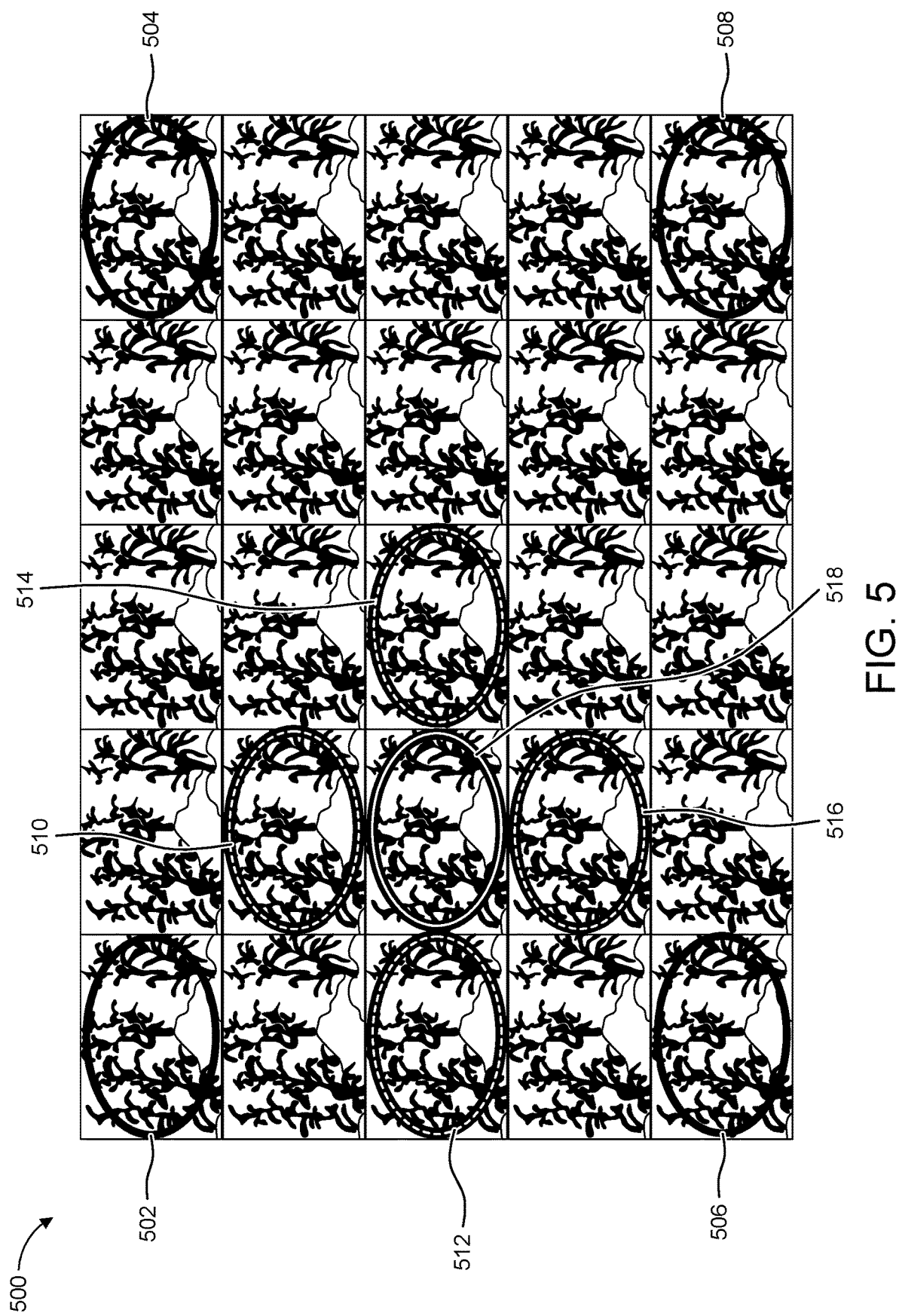
FIG. 5 is a schematic illustration showing example adjusted sub-view priorities based on an updated viewpoint motion model according to some embodiments.

FIG. 4 is a schematic illustration showing example 5×5 sub-views assigned with priorities based on an estimated viewpoint according to some embodiments. FIG. 5 is a schematic illustration showing example adjusted sub-view priorities based on an updated viewpoint motion model according to some embodiments. For some embodiments, the sub-view 418, 518 closest to the estimated viewpoint is assigned with the highest priority (marked with a solid white oval) in FIGS. 4 and 5.

Using the current speed of viewpoint motion, the accuracy of the viewpoint location estimation is determined, and sub-view priorities are set. In some embodiments, the sub-view priorities may be an indication of how large a range of close-by sub-views to render. For some embodiments, visual differences between previously rendered sub-views may be used for weighting the priorities. Because small shifts in viewpoint location may cause a visual difference (such as, e.g., specular reflections or large depth variations in the content), denser sampling around an estimated most likely viewpoint location may be used and sub-view priorities may be assigned accordingly. In some embodiments, an analysis process may use these metrics and assign a second highest priority to the area surrounding a most likely viewpoint at an appropriate sampling density. For the examples shown in FIGS. 4 and 5, frames assigned with a second highest priority are marked with dashed black ovals 410, 412, 414, 416, 510, 512, 514, 516.

According to the examples, for the likely viewpoint, areas outside the focus area (the areas with highest and second highest priority for this example) are assigned a third highest priority and are rendered with a lower sampling density. As a result, a large portion of the full light field may be rendered with a lower sampling density. For the examples shown in FIGS. 4 and 5, sub-views assigned the third highest priority are marked with solid black ovals 402, 404, 406, 408, 502, 504, 506, 508.

FIG. 5 indicates that the viewpoint of the user is estimated to shift to the left in comparison with FIG. 4. The sub-views 510, 512, 514, 516 directly adjacent to the estimated user viewpoint are assigned a second-highest priority. Comparing FIGS. 4 and 5, the second-highest priority sub-view set 410, 412, 414, 416, 510, 512, 514, 516 also moves to the left corresponding to the shift to the left by the estimated user viewpoint.

In some embodiments, an example rendering process may use the priorities assigned to determine the frequency of how often to render (or, e.g., update a rendering of) a sub-view. For example, the rendering process may send the rendered view to the client along with a timestamp. The timestamp may indicate a synchronized time that is synchronized between the viewing client and a virtual camera used by the sub-view. For some embodiments, a prioritized subset of views (e.g., a 3×3 array) may be used by a light field compression and distribution process or device, along with the original locations (or, e.g., relative locations for some embodiments) of each sub-view in the larger array (e.g., a 5×5 array).

In some embodiments, an example viewing client process may include determining a viewpoint of the user from the direction of gaze of the user and selecting a subsampled representation of light field content based on the viewpoint of the user. In some embodiments, an example viewing client process may include determining a viewpoint of the user from the direction of gaze of the user, such that selecting one of the plurality of subsampled representations may include selecting the subsampled representation based on the viewpoint of the user. For example, the center point of a subsampled representation may be selected to be within a threshold angle or distance of the viewpoint of the user.

FIG. 6A is a diagram showing an example full image 5×5 array light field configuration corresponding to FIG. 2 according to some embodiments. For some embodiments, a manifest file (e.g., media manifest file) such as, e.g., a Media Presentation Description (MPD) may include details of a full (or entire) light field array, such as the number of views, an index to those views, and the sampling location of views within the adaptation sets. For example, the full light field array may have N×M view positions. FIG. 6A shows an example naming convention for a full light field 5×5 array 600. The first number in each coordinate position indicates the row, and the second number indicates the column. Location (1, 1) is in the upper left corner, and location (5, 5) is the lower right corner. Of course, this is merely an example and, e.g., other embodiments may use a different naming convention, such as the example shown in FIG. 7.

FIG. 6B is a diagram showing an example uniform subsampled 3×3 array light field configuration corresponding to FIG. 3 according to some embodiments. The 3×3 array 620 shown in FIG. 6B corresponds to the solid black ovals in FIG. 3. For example, the uniform subsampled 3×3 array of FIG. 6B indicates a sub-view (5, 3) in the lower center position. This sub-view corresponds to the black oval of FIG. 3 in the fifth (bottom) row and third (center) column.

FIG. 6C is a diagram showing an example center-biased subsampled 3×3 array light field configuration corresponding to FIG. 4 according to some embodiments. The 3×3 array 640 shown in FIG. 6C corresponds to the ovals in FIG. 4. For example, the center-biased subsampled 3×3 array of FIG. 6C indicates a sub-view (3, 4) in the middle right position. This sub-view corresponds to the black dashed oval of FIG. 4 in the third (middle) row and fourth (center-right) column.

FIG. 6D is a diagram showing an example left-biased subsampled 3×3 array light field configuration corresponding to FIG. 5 according to some embodiments. The 3×3 array 660 shown in FIG. 6D corresponds to the ovals in FIG. 5. For example, the left-biased subsampled 3×3 array of FIG. 6D indicates a sub-view (2, 2) in the top center position. This sub-view corresponds to the black dashed oval of FIG. 5 in the second (upper-middle) row and second (center-left) column.

For some embodiments, a representation may include a full light field array. For some embodiments, a representation may include a collection of views of a light field array. For some embodiments, a representation may include a sub-sampling of views of a light field array. For some embodiments, a representation may include a subset of views selected from a full light field array or a subset of views of a light field array. For some embodiments, a representation (which may be designated as a subsampled representation) may include a subsample of another representation of a light field array. For some embodiments, a sub-sampling of views may include views corresponding to a particular direction, such as the examples shown in FIGS. 6B, 6C, and 6D, as well as other directions, and may include one or more uniform sub-samplings. For some embodiments, a collection of views of light field content may include one or more views with different sampling rates such that the collection of views may correspond to multiple sampling rates.

Figure 7:
FIG. 7 is a schematic illustration showing an example numbering configuration of light field sub-views according to some embodiments.
Figure 8:
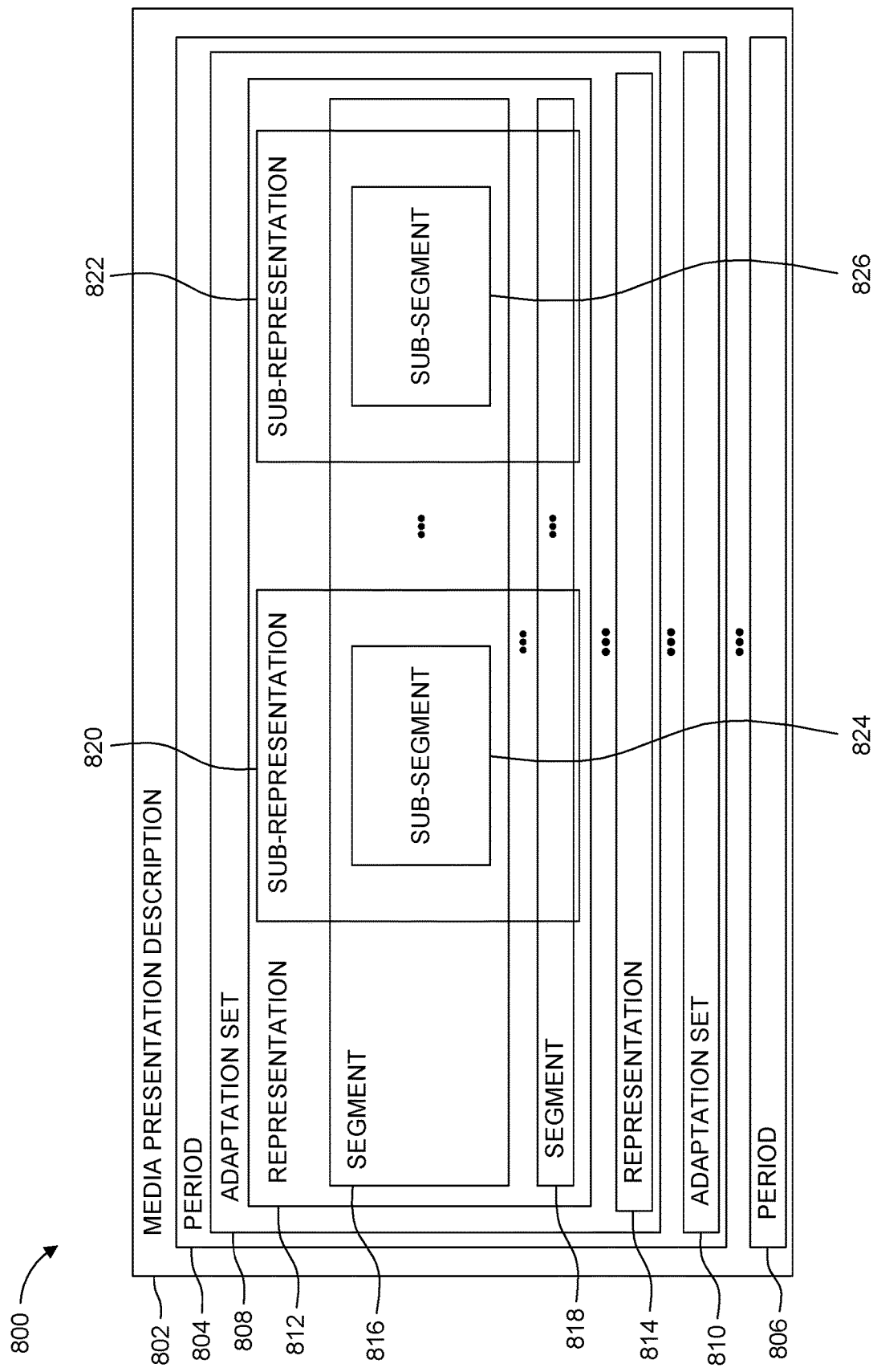
FIG. 8 is a diagram showing an example MPEG-DASH Media Presentation Description (MPD) file according to some embodiments.
Figure 9:
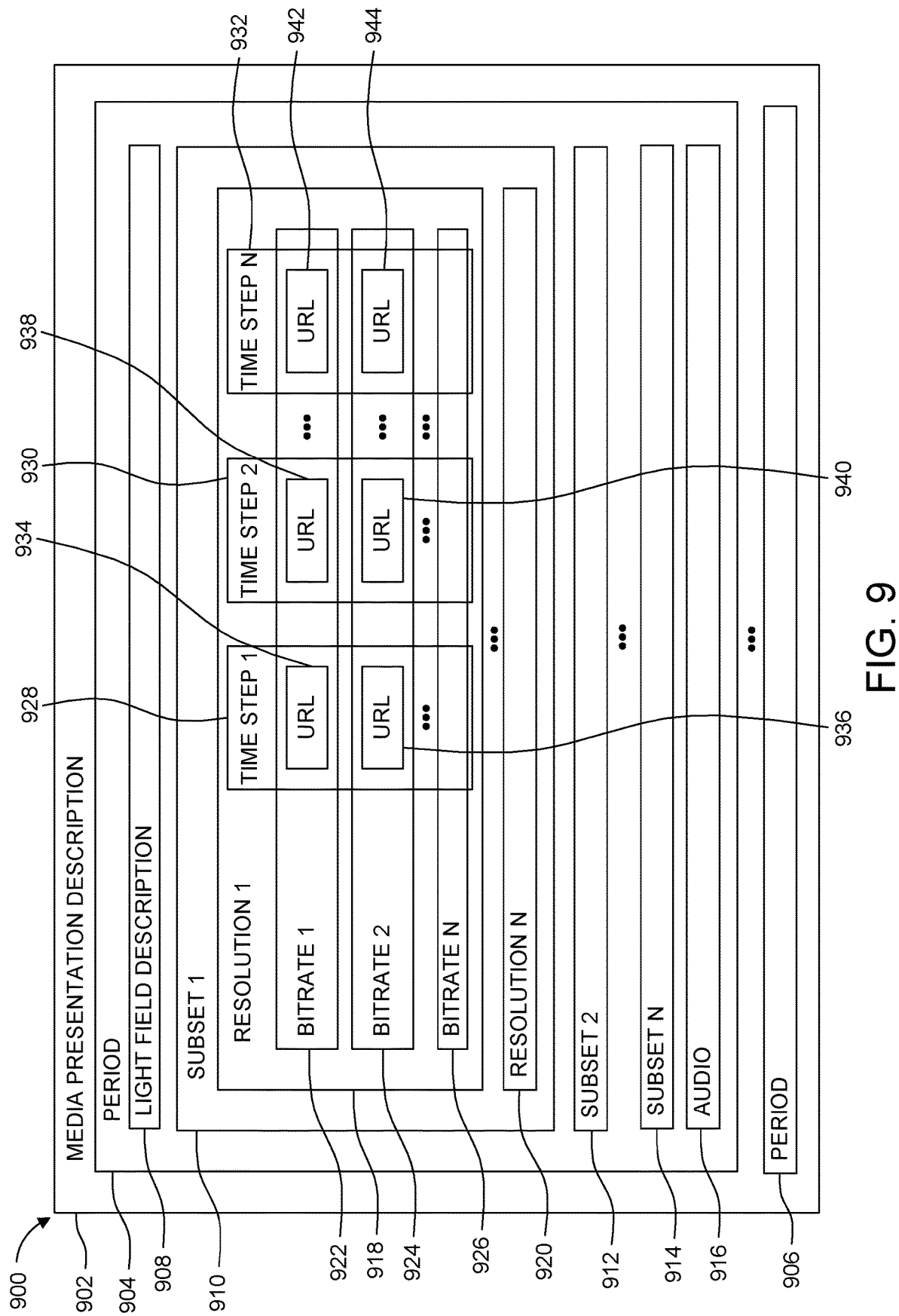
FIG. 9 is a diagram showing an example MPD file with light field configuration elements according to some embodiments.

FIG. 7 is a schematic illustration showing an example numbering configuration of light field sub-views according to some embodiments. The example sub-view numbering configuration shown in FIG. 7 is used in the example MPD shown below in Table 1. FIG. 7 shows an example sub-view number configuration for a full light field 5×5 array 700. The sub-view numbering configuration of FIG. 7 may be compared with the sub-view numbering configuration of FIG. 6A. While FIG. 6A shows an example coordinate sub-view numbering configuration, FIG. 7 shows an example sequential sub-view numbering configuration. The top row of the 5×5 array 700 of FIG. 7 numbers the sub-views 1 to 5 left to right. The second-row numbers the sub-views 6 to 10 left to right down to the last row, which numbers the sub-views 21 to 25 left to right. FIGS. 7-9 and Table 1 together show an example MPD for an example client pull model.

FIG. 8 is a diagram showing an example MPEG-DASH Media Presentation Description (MPD) file according to some embodiments. An example client pull model (e.g., using MPEG-DASH) may use the standard structure of the MPEG-DASH media presentation description (MPD) 802 illustrated in FIG. 8. The MPD file format 800 shown in FIG. 8 may be used for transmitting the overall media description downloaded by the viewing client as part of a streaming session initialization. The organizational structure of the MPEG-DASH MPD is shown in FIG. 8.

The top-level period fields 804, 806 may indicate a start time and a duration. An MPD 802 may include one or more period fields 804, 806. A period field 804, 806 may include one or more adaptation sets 808, 810. An adaptation set 808, 810 may include one or more representation fields 812, 814. Each representation 812, 814 within an adaptation set 808, 810 may include the same content encoded with different parameters. A representation field 812, 814 may include one or more segments 816, 818. A segment 816, 818 may include one or more sub-segments 824, 826 that includes a DASH media file. A representation field 812, 814 may be divided into one or more sub-representation fields 820, 822. A sub-representation field 820, 822 may include information that applies to only one media stream.

For some embodiments, one or more representation fields of an MPD may include a higher density of views for a first view direction compared to a second view direction. In some embodiments, a media manifest file (e.g., an MPD) may include priority data for one or more views, and a process interpolating a view may use the priority data (such as to select which view may be interpolated). With some embodiments, a media manifest file (e.g., an MPD) may include priority data for one or more views, and a process selecting a representation may use the priority data (such as to select a representation with a higher priority). For some embodiments, a media manifest file (e.g., an MPD) may include at least one representation with information corresponding to two or more views of light field content. In some embodiments, the information in the manifest file may include location data for two or more views. In some embodiments, the information in the manifest file may include interpolation priority data for one or more of the plurality of views, and wherein selecting one of the plurality of subsampled representations is based on the interpolation priority data for one or more of the plurality of views. For some embodiments, a process may include tracking a view direction of a user, such that selecting a representation selects a representation with a density of views correlated to the view direction of the user. For some embodiments, the representation may include two or more views with a density of the two or more views correlated to a view direction of a user, such as a density of views correlated to a left view direction or a density of views correlated to a right view direction.

FIG. 9 is a diagram showing an example MPD file with light field configuration elements according to some embodiments. FIG. 9 illustrates how MPD data 902 enabling an example client pull model of multiplexed light field streaming may be organized in compliance with the MPEG-DASH protocol structure.

In some embodiments, the MPD structure 900 uses a period 904, 906 as the top hierarchical entity. Each period 904, 906 may provide information for a single light field scene. A single scene may be, for example, a continuous light field rendering within which the virtual camera array used for rendering remains constant. An entire experience may include several scenes that are each specified in a separate period block. Each period block may include a light field rendering setup, which is labeled as a light field description 908 in FIG. 9 and correlates with a first adaptation set. The light field rendering setup block 908 may include the number of sub-views, the placement of virtual cameras used by the sub-views, and an overview of the scene layout, such as the size of the view and the size and placement of elements in the view. Each period block 904, 906 may include one or more subset blocks 910, 912, 914, in which each subset block correlates to an adaptation set. Each subset adaptation set 910, 912, 914 may include one or more different version of the content encoded with different configuration parameters. For example, content may be encoded with different resolutions, different compression rates, different bitrates, and/or different supported codecs. Each subset 910, 912, 914 may include a set number of sub-views depending on the adaptation set, with a resolution depending on the representation block, encoded with a particular codec at a particular bitrate for a segment block. Each subset 910, 912, 914 may be divided into short clips included in sub-segment blocks that have a link to the actual video data.

Adaptation sets within a period 904, 906 of an MPD 902 may include subsets 910, 912, 914 of a full array of views, varying the number of views and sampling location of views among an adaptation set. An adaptation set may include the number of views present and an index of available views. An adaptation set may indicate a priority level of sub-views. An adaptation set (or subset 910, 912, 914 for some embodiments) may include one or more resolutions 918, 920 that each include one or more bitrates 922, 924, 926. For each resolution 918, 920, there may be a series of time steps 1, 2, . . . , N (928, 930, 932). Each time step 928, 930, 932 may have a separate URL 934, 936, 938, 940, 942, 944 for each bitrate supported. For the example shown in FIG. 9, there are N resolutions that each support N bitrates. Additionally, an adaptation set within a period 904, 906 of an MPD 902 may be used for audio, as shown as an audio block 916 in the example of FIG. 9.

For some embodiments, a manifest file (such as a media manifest file or an MPD) may be used. The information in the manifest file may include location data of two or more views. For some embodiments, the information in the manifest file may include interpolation priority data for one or more views. For some embodiments, selecting a subsampled representation may be based on the interpolation priority data for one or more views. For example, interpolation priority data may be used to determine how often a sub-view is interpolated or updated.

Table 1 shows a pseudocode version of an exemplary MPD with fields as shown in FIG. 9 and a sub-view configuration for a 5×5 array light field as shown in FIG. 7.

The example shown in Table 1 illustrates three different light field view adaptation sets: Full, Center, and Left. The number of sampled views and sampled view positions differ between adaptation sets. For a particular resolution, fewer views results in more pixels per view. Traditional DASH rate and resolution adaptations may be used within each view category. An example of UHD/HD is shown in the "Center" light field view adaptation set.

TABLE 1

Period
    Adaptation set 1: Light field scene description:
        Sparse view array. Number of sub-views 5 × 5. Locations of virtual cameras.
    Adaptation set 2: Subset 1 (full light field): number of sub-views 5 × 5 (sub-views 1-25)
        Resolution 1: 1920 × 1080 px per sub-view
            Bitrate 1: Encoded with codec XX, required transfer capacity 35 Mbps
            Bitrate 2: Encoded with codec XX, required transfer capacity 31 Mbps
        Resolution 2: 1280 × 720 px per sub-view
            Bitrate 1: Encoded with codec XX, required transfer capacity 22 Mbps
            Bitrate 2: Encoded with codec XX, required transfer capacity 19 Mbps
    Adaptation set 3: Subset 2 (Sparse sampling): number of sub-views 2 × 2 (sub-views 1, 5, 21, 25)
        Resolution 1: 1920 × 1080 px per sub-view
            Bitrate 1: Encoded with codec XX, required transfer capacity 9 Mbps
            Bitrate 2: Encoded with codec XX, required transfer capacity 8 Mbps
        Resolution 2: 1280 × 720 px per sub-view
            Bitrate 1: Encoded with codec XX, required transfer capacity 6 Mbps
            Bitrate 2: Encoded with codec XX, required transfer capacity 5 Mbps
    Adaptation set 4: Subset 3 (Semi-dense partial sampling): number of sub-views 2 × 2 (sub-views 2, 6, 8, 12)
        Resolution 1: 1920 × 1080 px per sub-view
            Bitrate 1: Encoded with codec XX, required transfer capacity 9 Mbps
            Bitrate 2: Encoded with codec XX, required transfer capacity 8 Mbps
        Resolution 2: 1280 × 720 px per sub-view
            Bitrate 1: Encoded with codec XX, required transfer capacity 6 Mbps
            Bitrate 2: Encoded with codec XX, required transfer capacity 5 Mbps
    Adaptation set 5: Subset 4 (Semi-dense partial sampling): number of sub-views 2 × 2 (sub-views 4, 8, 10, 14)
        Resolution 1: 1920 × 1080 px per sub-view
            Bitrate 1: Encoded with codec XX, required transfer capacity 9 Mbps
            Bitrate 2: Encoded with codec XX, required transfer capacity 8 Mbps
        Resolution 2: 1280 × 720 px per sub-view
            Bitrate 1: Encoded with codec XX, required transfer capacity 6 Mbps
            Bitrate 2: Encoded with codec XX, required transfer capacity 5 Mbps
    Adaptation set 6: Subset 5 (Semi-dense partial sampling): number of sub-views 2 × 2 (sub-views 12, 16, 18, 22)
        Resolution 1: 1920 × 1080 px per sub-view
            Bitrate 1: Encoded with codec XX, required transfer capacity 9 Mbps
            Bitrate 2: Encoded with codec XX, required transfer capacity 8 Mbps
        Resolution 2: 1280 × 720 px per sub-view
            Bitrate 1: Encoded with codec XX, required transfer capacity 6 Mbps
            Bitrate 2: Encoded with codec XX, required transfer capacity 5 Mbps
    Adaptation set 7: Subset 6 (Semi-dense partial sampling): number of sub-views 2 × 2 (sub-views 14, 18, 20, 24)
        Resolution 1: 1920 × 1080 px per sub-view
            Bitrate 1: Encoded with codec XX, required transfer capacity 9 Mbps
            Bitrate 2: Encoded with codec XX, required transfer capacity 8 Mbps
        Resolution 2: 1280 × 720 px per sub-view
            Bitrate 1: Encoded with codec XX, required transfer capacity 6 Mbps
            Bitrate 2: Encoded with codec XX, required transfer capacity 5 Mbps
    Adaptation set 8: Subset 7 (Single sub-view): number of sub-views 1 × 1 (sub-view 1)
        Resolution 1: 1920 × 1080 px per sub-view
            Bitrate 1: Encoded with codec XX, required transfer capacity 3 Mbps
            Bitrate 2: Encoded with codec XX, required transfer capacity 2.5 Mbps
        Resolution 2: 1280 × 720 px per sub-view
            Bitrate 1: Encoded with codec XX, required transfer capacity 2 Mbps
            Bitrate 2: Encoded with codec XX, required transfer capacity 1.8 Mbps

.
                .
                .

Figure 10:
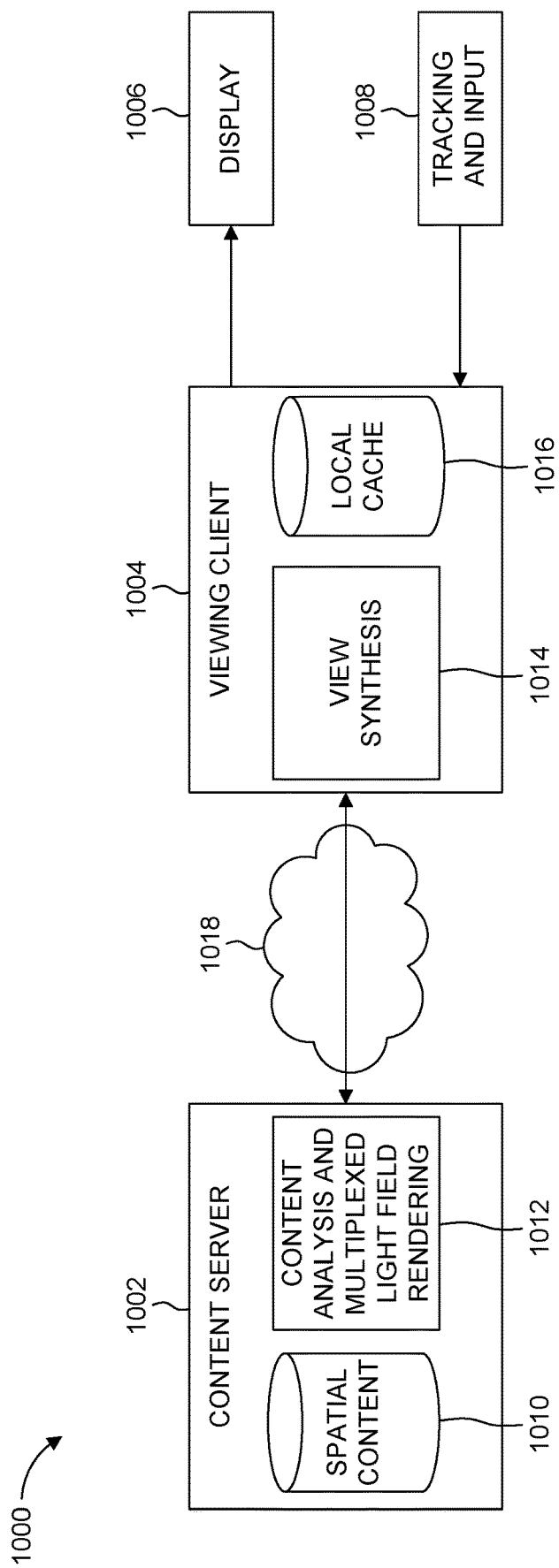
FIG. 10 is a system diagram illustrating an example set of interfaces for multiplexed light field rendering according to some embodiments.

Adaptation set 32: Subset 31 (Single sub-view): number of sub-views 1 × 1 (sub-view 25)
        Resolution 1: 1920 × 1080 px per sub-view
            Bitrate 1: Encoded with codec XX, required transfer capacity 3 Mbps
            Bitrate 2: Encoded with codec XX, required transfer capacity 2.5 Mbps
        Resolution 2: 1280 × 720 px per sub-view
            Bitrate 1: Encoded with codec XX, required transfer capacity 2 Mbps
            Bitrate 2: Encoded with codec XX, required transfer capacity 1.8 Mbps FIG. 10 is a system diagram illustrating an example set of interfaces for multiplexed light field rendering according to some embodiments. In some embodiments, an example system 1000 with a server (e.g., a content server 1002) may include a database 1010 of spatial content. A content server 1002 may be capable of running an example process 1012 for analyzing content and performing multiplexed light field rendering. One or more content servers 1002 may be connected via a network 1018 to a client (e.g., a viewing client 1004). In some embodiments, a viewing client 1004 may include a local cache 1016. The viewing client 1004 may be enabled to execute an example process 1014 for synthesizing views (or sub-views for some embodiments) to the content. The viewing client 1004 may be connected to a display 1006 to use for displaying content (including synthesized views of the content). The viewing client 1004, in some embodiments, may include an input 1008 for receiving tracking data (such as user gaze tracking data, or, e.g., user position data, such as user head position data, e.g., from a headset or head mounted device (HMD)) and input data. For some embodiments, a viewing client 1004 (or a sensor for some embodiments) may be used to track a direction of gaze of a user. The direction of gaze of the user may be used to select a subsampled representation of content. For example, the direction of gaze of the user may be used to determine a viewpoint of the user (and associated sub-view), such as the example sub-views indicated by a white oval in FIGS. 4 and 5. For some embodiments, the distance between a user's gaze point and the center of each sub-view in a full light field array may be minimized to determine the sub-view closest to the gaze of the user. The sub-view associated with that minimum distance may be selected as the viewpoint sub-view.

For some embodiments, selecting a representation (such as a sub-sampling view of a light field array) may be based on a position of a user. In some embodiments, a viewing client may track a user head position, and selecting a representation may be based on the tracked user head position. With some embodiments, a direction of gaze of a user may be tracked, and selecting a representation may be based on the tracked direction of gaze of the user.

Figure 11:
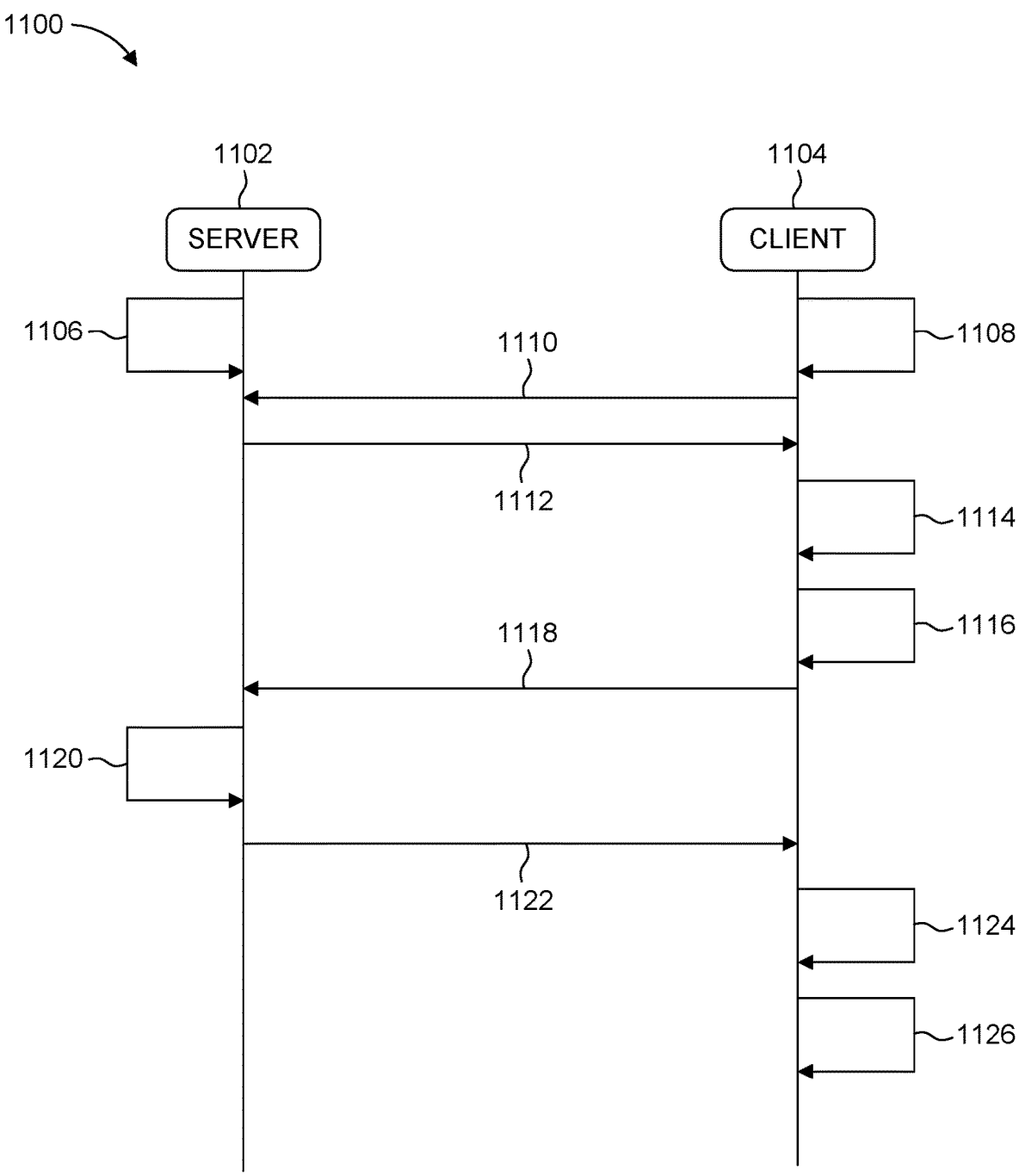
FIG. 11 is a message sequencing diagram illustrating an example process for multiplexed light field rendering with an example client pull model according to some embodiments.

FIG. 11 is a message sequencing diagram illustrating an example process for multiplexed light field rendering with an example client pull model according to some embodiments. For some embodiments of an example light field (LF) generation process 1100, a server 1102 may generate 1106 subsampled light fields and descriptions for an MPD, such as is described for a few examples in relation to FIGS. 2-9. In some embodiments, a client 1104 (or viewing client) may track 1108 a viewer's gaze and use the viewer's gaze for selecting content. A content request may be sent 1110 from the client 1104 to the server 1102 (or content server), and the MPD may be sent 1112 in response to the client 1104. For some embodiments, the server 1102 may send 1112 the MPD to the client without a request. In some embodiments, the client 1104 may estimate 1114 the bandwidth available for a network between the server 1102 and the client 1104 and/or estimate the bandwidth to be used under one or more subsampling scenarios. The client 1104 may select 1116 a light field subsampling based in part on the estimated bandwidth(s). For example, the LF subsampling may be selected 1116 from a sample set that minimizes the bandwidth used while maintaining one or more light field parameters above a threshold (such as using a resolution and a bit rate above particular thresholds for the top two priority sub-views). The client 1104 may send 1118 a light field representation request to the server 1102. The server 1102 may retrieve the requested LF representation and transmit 1120 the requested representation to the client. The client 1104 may receive the requested representation as one or more content segments. The client 1104, for some embodiments, may interpolate 1124 one or more interpolated sub-views using the received content segments. The viewing client 1104 may display 1126 the received and interpolated sub-view light field content data. In some embodiments, one or more synthesized views (e.g., interpolated synthesized views) may be synthesized from the one or more interpolated sub-views the viewing client 1104 may display 1126 the one or more synthesized views (e.g., interpolated synthesized views).

For example, the client may receive content segments for the highest, second highest, and third-highest priority sub-views shown in FIG. 4, and the client may interpolate content data for one or more additional sub-views. For some embodiments, for example, content segments may be requested by a client for highest priority sub-views at a request rate shown in Eqn. 1:

$$\text{Highest Priority Sub-view Update Frequency} = \frac{1}{X} \quad \text{Eqn. 1}$$

for a variable x equal to a unit of time. Content segments may be requested by a client for second highest priority sub-views at a request rate shown in Eqn. 2:

$$\text{Second Highest Priority Sub-view Update Frequency} = \frac{1}{2X} \quad \text{Eqn. 2}$$

Content segments may be requested by a client for third highest priority sub-views at a request rate shown in Eqn. 3:

$$\text{Third Highest Priority Sub-view Update Frequency} = \frac{1}{3X} \quad \text{Eqn. 3}$$

Some embodiments may interpolate sub-view content data for sub-views for which content data is not received for a particular time step. Some embodiments may store sub-view content data and may use stored sub-view content data for time steps occurring in-between a sub-view request rate for a particular priority. The request rates shown in Eqns. 1 to 3 are examples, and request rates may be assigned differently for some embodiments.

For some embodiments, selecting a representation of the light field (which may be a light field subsampling for some embodiments) may be based on a bandwidth constraint. For example, a representation may be selected which is below the bandwidth constraint. For some embodiments, a user head position may be tracked, and a representation may be selected based on the user head position. In some embodiments, a direction of gaze of a user may be tracked and a representation may be selected based on the direction of gaze of the user. For some embodiments, a client process may include interpolating at least one view, such that selecting a representation selects a representation from a group including the interpolated view. For some embodiments, a client process may include requesting light field video content from a server, such that obtaining the selected subsampled representation includes executing a process selected from a group consisting of: retrieving the selected subsampled representation from a server, requesting the selected subsampled representation from a server, and receiving the selected subsampled representation. For some embodiments, a client process may include requesting the media manifest file from a server; and requesting the light field content associated with the selected view subset, such that obtaining the light field content associated with the selected view subset may include executing a process selected from a group consisting of: retrieving the light field content associated with the selected view subset from a server, requesting the light field content associated with the selected view subset from a server, and receiving the light field content associated with the selected view subset.

Figure 12:
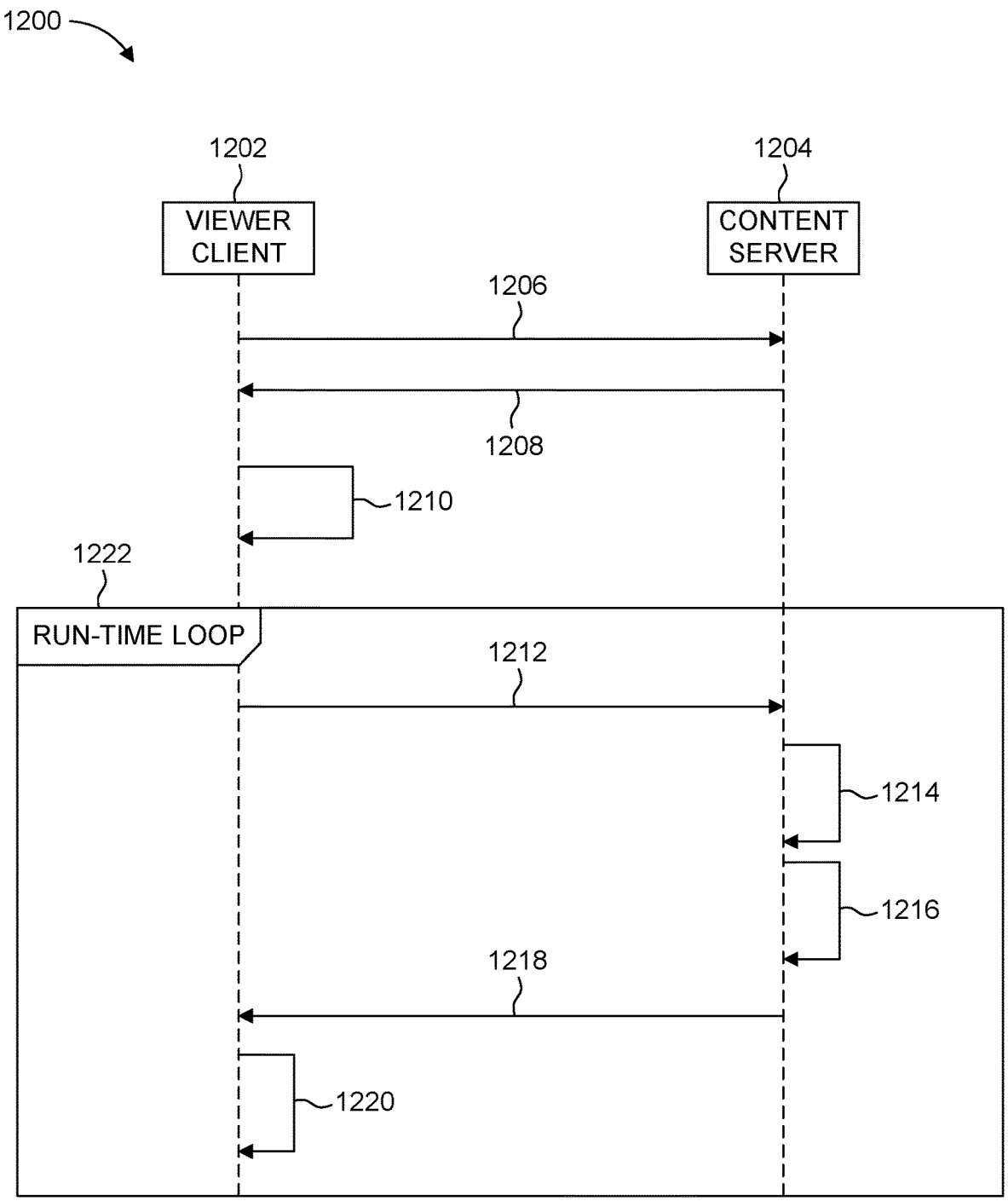
FIG. 12 is a message sequencing diagram illustrating an example process for multiplexed light field rendering with an example server push model according to some embodiments.

FIG. 12 is a message sequencing diagram illustrating an example process for multiplexed light field rendering with an example server push model according to some embodiments. Client and server processing are described in more detail further down in the application.

For some embodiments, an example server push process 1200 may include, e.g., a pre-processing process and a run-time process 1222. With some embodiments of the example pre-processing process, a viewing client 1202 may send 1206 a content request to a content server 1204, and a content server 1204 may respond 1208 with the first full light field frames. The viewing client 1202 may update 1210 the viewpoint and synthesize a view, which may be done using the first full light field frames.

With some embodiments of the example run-time process 1222, a viewing client 1202 may send 1212 an updated viewpoint to the content server. The content server 1204 may use a motion model of viewpoint motion to predict viewpoint position at the next time step. For some embodiments, the content server 1204 may build 1214 the motion model using in part tracked motion of a user. The content server 1204 may analyze 1216 content and may prioritize the light field sub-views to be rendered for the next time step based on the predicted view position. The content server 1204 may send 1218 to the viewing client 1202 the light field sub-view selected, the virtual camera position associated with the selected sub-view, and a timestamp of the content. The viewing client 1202 may update 1220 the viewpoint and synthesize one or more sub-views using the temporal variability of the light field data. For some embodiments, a frame may include a frame-packed representation of two or more views corresponding to the selected representation. For some embodiments, light field data may include 2D image frame data transmitted from a content server to a client device. For some embodiments, light field content may include a frame of light field content (which may be transmitted from a content server to a client device).

Figure 13:
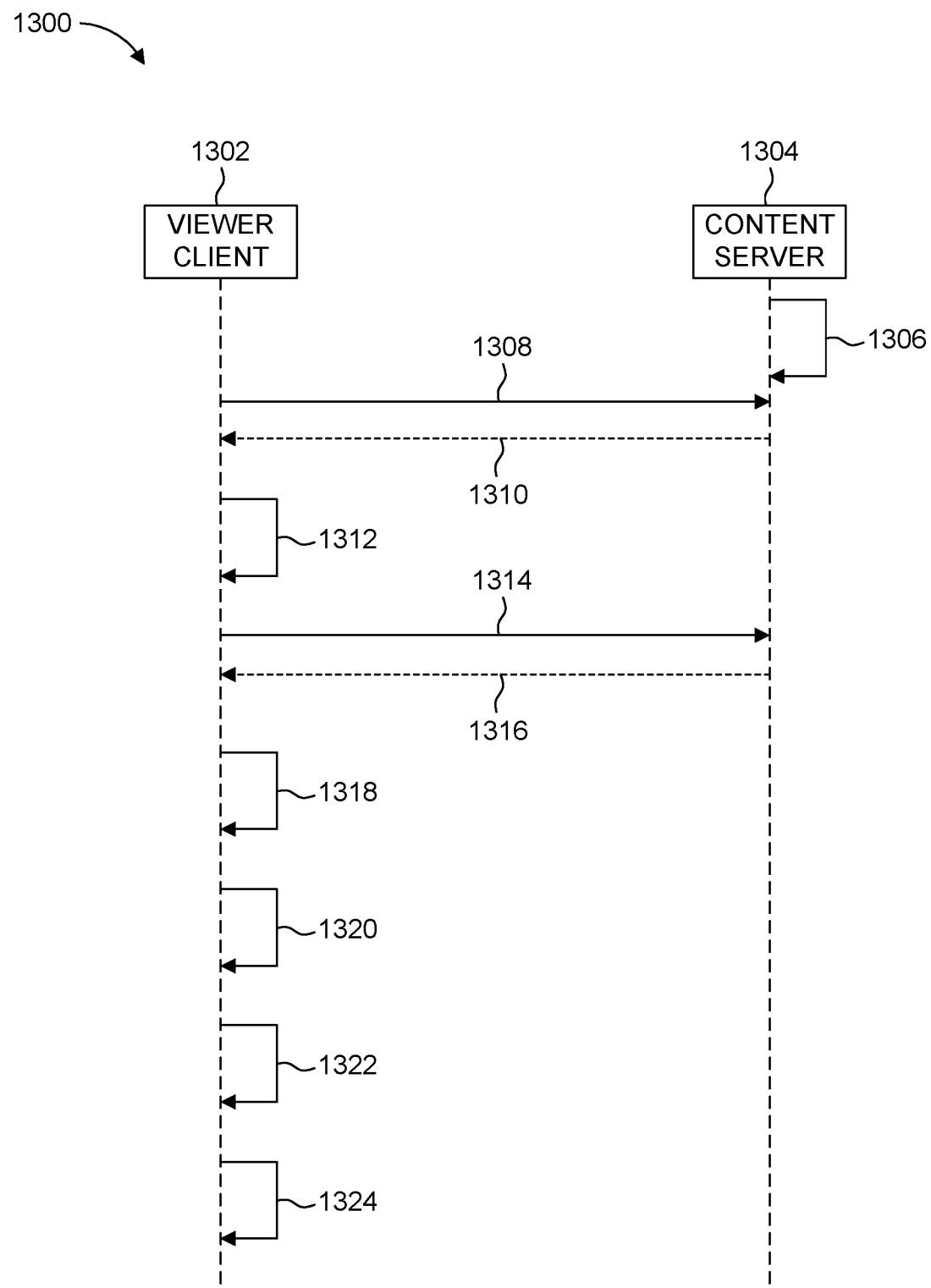
FIG. 13 is a message sequencing diagram illustrating an example process for multiplexed light field rendering with an example client pull model according to some embodiments.

FIG. 13 is a message sequencing diagram illustrating an example process for multiplexed light field rendering with an example client pull model according to some embodiments. For some embodiments of an example client pull model process 1300, the client 1302 may execute the future viewpoint prediction and perform content analysis to determine which sub-views are prioritized. For some embodiments, based on the priorities assigned to the sub-views according to analysis performed by the viewing client 1302, the client 1302 may pull specific sub-view streams from the content server 1304. In this model, the client 1302 may select which light field sampling to use by choosing how many sub-views to pull and by choosing which spatial distribution to use across the whole light field array. The viewing client 1302 may dynamically change the number of individual sub-views pulled and the sampling distribution according to the viewpoint motion, content complexity and display capabilities. Subsets of views may be collected at the server and provided as alternate light field sub-samplings for some embodiments. The client may choose one of these subsets based on local criteria, such as memory available, display rendering capabilities, and/or processing power. Distributing subsets of views may allow the encoder to take advantage of redundancy among views for greater compression compared with compressing views individually. FIG. 13 illustrates an overview of the sequence for processing and communicating between the viewing client 1302 and content server 1304 in an example client pull session 1300.

For some embodiments, a content server 1304 may render 1306 a light field subset in sequential order. A viewing client 1302 may request 1308 content, and the content server 1304 may send 1310 back an MPD file. The viewing client 1302 may select 1312 the subsets to be pulled. The viewing client 1302 may request 1314 a subset, and the content server 1304 may respond 1316 with subset content data, virtual camera positions, and timestamps of capturing the content data. The viewing client 1302 may store 1318 the received data to a local cache. The viewing client 1302 may update 1320 the viewpoint of the user and synthesize the view using temporal variability in the light field data stored in local cache. The viewing client 1302 may use (or build 1322 for some embodiments) a motion model of the viewpoint motion and predict viewpoint position in the next time step. The viewing client 1302 may analyze 1324 content and prioritize light field subsets to the pulled based on the predicted viewpoint position.

For some embodiments of an example client pull model, the client receives a media presentation description from the content server. A media presentation description (MPD) may indicate available subsets and may include alternate light field sub-samplings compiled by the content server. Subsets may include individual sub-views or a collection of sub-views, and the sampling density, the distribution, and the number of sub-views included may vary for each subset. By compiling several sub-views into a subset, the content server may provide a good candidate subsampling according to the content. The encoder may take advantage of the redundancy among views for greater compression if the subset is delivered as a single stream. Each subset may be available in one or more spatial resolution and compression versions.

For some embodiments of the client pull model, the content server may render and/or provide each individual light field sub-view at a fixed frame rate. For some embodiments, the content server may analyze content to determine the sub-view update frequency. For some embodiments, selecting a representation may include predicting a viewpoint of a user; and selecting the selected representation may be based on a predicted viewpoint of the user.

Figure 14:
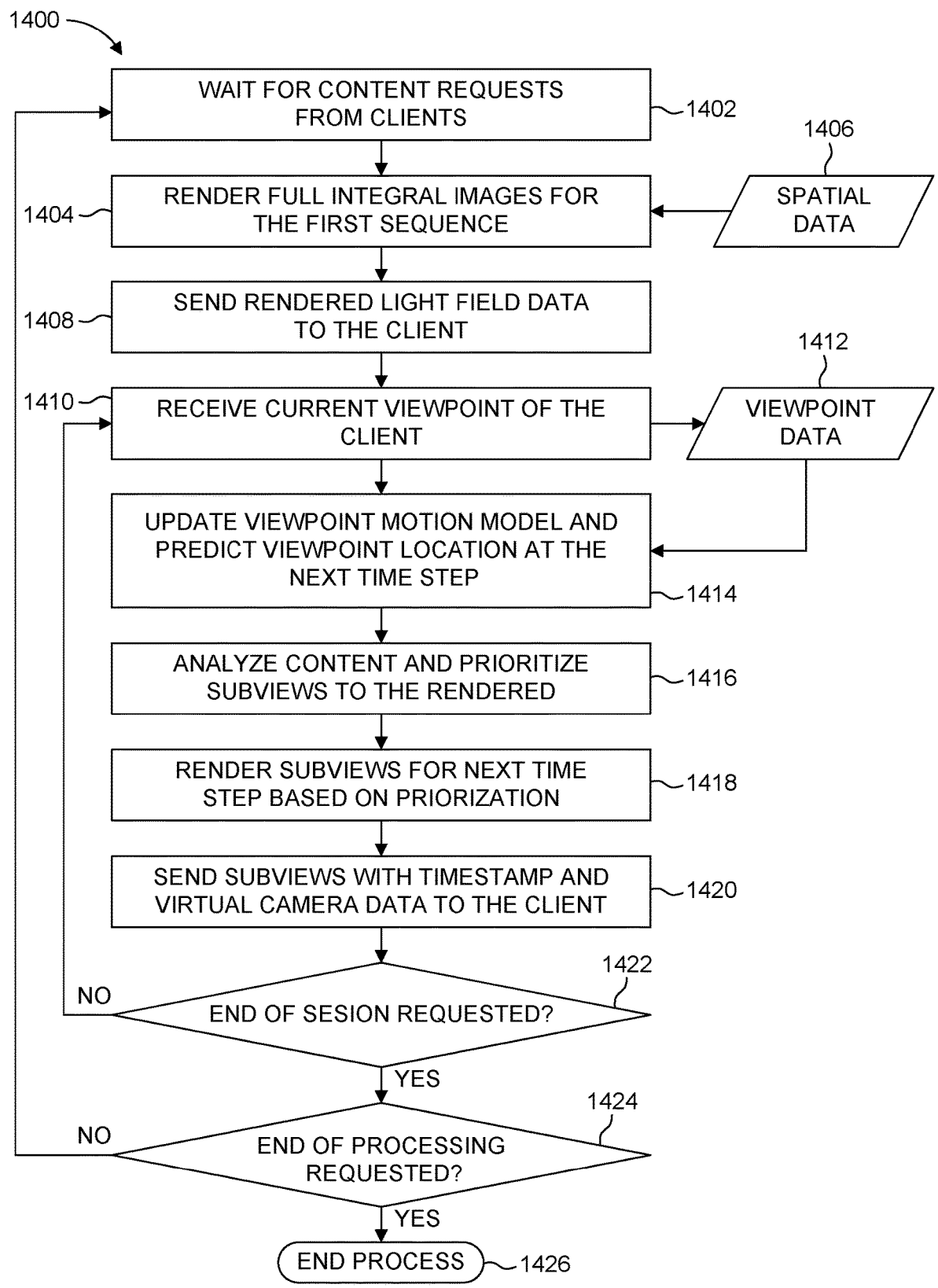
FIG. 14 is a flowchart illustrating an example process for a content server according to some embodiments.

FIG. 14 is a flowchart illustrating an example process for a content server according to some embodiments. For some embodiments, an example process 1400 executed by the content server may include receiving 1402 a content request from the client (e.g. "wait for content requests from clients"). The viewing client may use tracking (e.g., user and/or eye position tracking) to determine the user viewpoint and to send the user viewpoint to the content server upon displaying the content. The process 1400 may further include rendering 1404 full integral images for a first sequence of frames of the integral light field. Spatial data 1406 may be retrieved from memory, such as a cache local to the server. The rendered light field data may be sent 1408 to the client. The current viewpoint of the client may be received 1410 and stored in memory as viewpoint data 1412. A motion estimation model may be built and/or updated 1414 using viewpoint location data received from the client. A predicted viewpoint location for the next time step (which may be equal to the estimated arrival time of the rendered content at the viewing client) may be estimated with the motion estimation model. For some embodiments, the predicted viewpoint location may be based on the estimated network communication latency between server and the client and the model estimating the continuity of the viewpoint motion. For estimating the motion, a Kalman filtering or any other suitable motion estimation model may be used. The content may be analyzed 1416 using the predicted viewpoint for the next time step to determine a rendering priority for the light field sub-views. Using the predicted viewpoint, the content server may perform a content analysis to determine the highest priority sub-views at the next time step for rendering and transmitting to the viewing client. Sub-views may be rendered 1418 based on the rendering priority. Rendered light field sub-view content, a timestamp, and the virtual camera location may be streamed 1420 to the client. A determination of whether an end of session is requested may be performed 1422. If an end of session is not requested, the process 1400 may repeat, starting with receiving 1410 the current viewpoint of the client. A determination of whether an end of processing is requested may be performed 1424. If an end of processing signal is received, the process 1400 exits 1426. Otherwise, the process 1400 may repeat, starting with waiting 1402 for a content request from a client. With some embodiments, for the duration of the content or until viewing client signals end of session, the content server continually streams multiplexed light field data, prioritizing the rendering of the sub-views.

Figure 15:
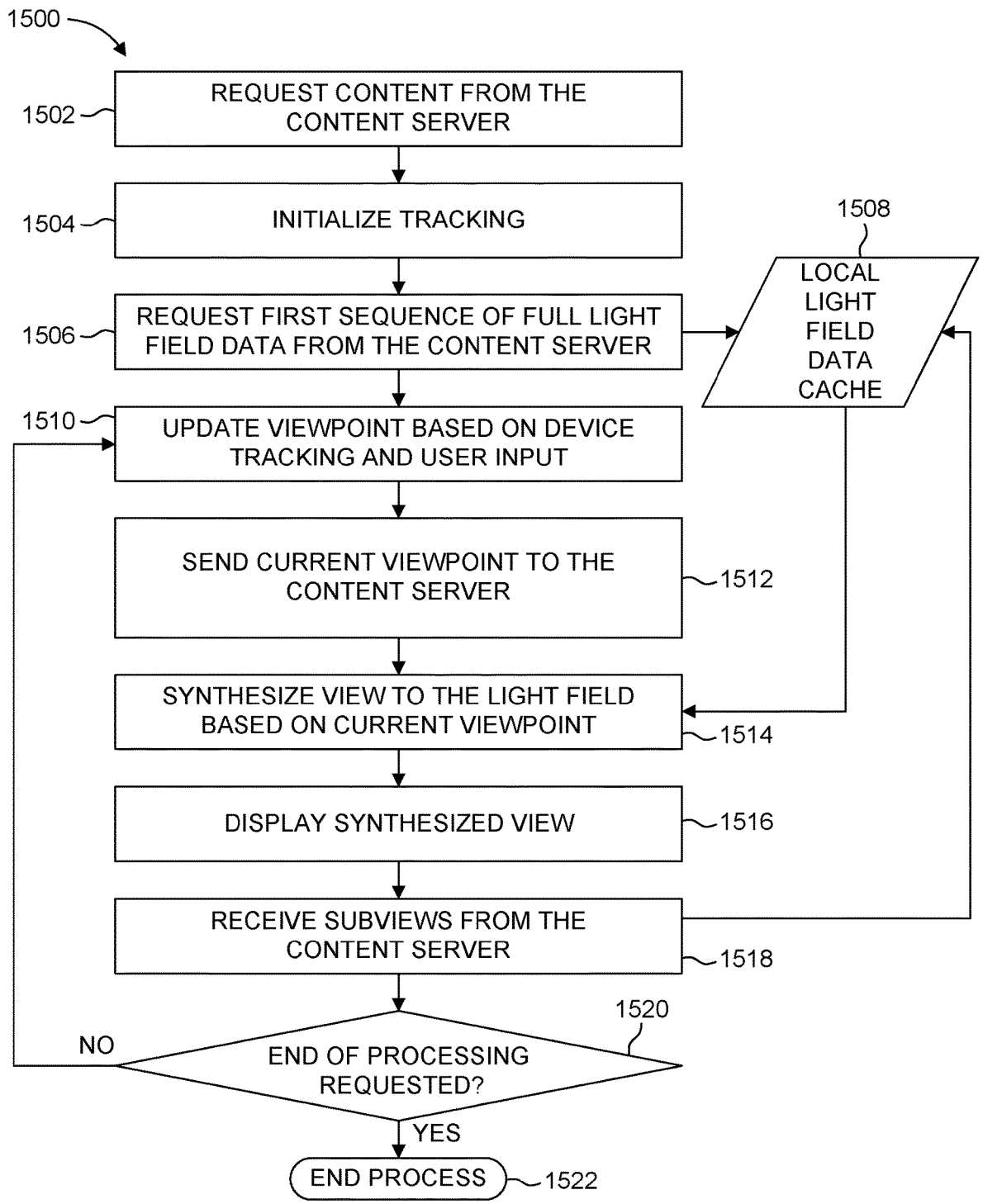
FIG. 15 is a flowchart illustrating an example process for a viewing client according to some embodiments.

FIG. 15 is a flowchart illustrating an example process for a viewing client according to some embodiments. If a user starts the viewing client application, the user also indicates the content to be viewed. Content may be a link to the content, e.g., located on and/or streamed from the content server. The link to the content may be a URL identifying the content server and specific content. A viewing client application may be launched by an explicit command by the user or automatically by the operating system based on identifying content type request and application associated with the specific content type. In addition to being a stand-alone application, a viewing client may be integrated with a web browser or a social media client, or the viewing client may be part of the operating system. If a viewing client application is launched, the viewing client may initialize sensors used for device, user, and/or gaze tracking.

Some embodiments of an example process 1500 executed by the viewing client may include requesting 1502 content from the content server and initializing 1504 gaze tracking of the user. The viewing client may receive 1506 the first full integral light field image frames from the content server. The light field data may be stored in local cache memory 1508 and displayed by the viewing client. An initial user viewpoint may be set using a default position, which may be used to display the first light field frames. The viewpoint may be updated 1510 based on the device tracking and user input. The current viewpoint may be sent 1512 to the content server. The content server may use the received viewpoint to render one or more sub-views of the light field, which may be streamed to the client. The client may receive 1518 these sub-views, along with a timestamp indicating the shared time step of the rendering, and the location of the virtual camera relative to the full array of images and optical parameters used for rendering the sub-view.

One or more views to the light field may be synthesized 1514 based on the current viewpoint. The synthesized views may be, e.g., novel views that lack light field content specifically associated with that particular view. The synthesized view(s) may be displayed 1516 by the viewing client. The viewing client may receive 1518 light field sub-view content rendered by the content server, which may be stored in memory, such as a local light field cache 1508. The viewing client may synthesize viewpoints for one or more rendering steps using an up-to-date viewpoint updated 1510 using tracking and user input. A determination may be performed 1520 to determine if an end of processing signal is received. If an end of processing signal is received, the process 1500 may end 1522. Otherwise, the process 1500 may repeat, by updating 1510 the user viewpoint.

For some embodiments, a client process may include generating a signal for display using the rendered representation. In some embodiments, a client process may include determining a viewpoint of the user using the direction of gaze of the user, such that selecting the selected representation may include selecting the selected representation based on the viewpoint of the user. With some embodiments, a client process may include determining a viewpoint of the user using the direction of gaze of the user; and selecting at least one sub-sampling of a view of a multi-view video, such that selecting a sub-sampling of the view may include selecting a sub-sampling of the view within a threshold viewpoint angle of the viewpoint of the user.

For some embodiments, a viewing client renders images to be displayed by synthesizing viewpoints matching the current viewpoint using locally cached light field data. If synthesizing a viewpoint, the viewing client may select sub-views to be used in synthesizing. In some embodiments, for selection the viewing client may inspect the local light field cache to identify sub-views that are, e.g., close to the current viewpoint, that have up-to-date data available, that have enough data from various time steps to enable interpolation or prediction to produce a good estimation of the sub-view appearance at a given time step, etc. To mitigate the temporal variance between sub-views (which may be received in separate subset streams), the viewing client may use techniques developed for video frame interpolation, such as the techniques mentioned in Nikilaus, S., et al., *Video Frame Interpolation via Adaptive Separable Convolution*, PROC. OF THE IEEE INT'L CONF. ON COMP. VISION 261-270 (2017) ("Nikilaus") to produce a frame corresponding with the rendering time if there are "future" frames already available from the content server, or video frame prediction as described in Vukotić, Vedran, et al., *One-Step Time-Dependent Future Video Frame Prediction with a Convolutional Encoder-Decoder Neural Network*, PROC. OF INT'L CONF. ON IMAGE ANALYSIS AND PROCESSING 140-151 (2017) if there are only frames from previous time steps available for the specific sub-view. For some embodiments, the viewing client may use one of these two methods to estimate a sub-view for a specific time step, which may be used for rendering and displaying a view. For some embodiments, the viewing client uses sub-view images stored in a local cache for some time steps. In some embodiments, if the viewing client has all sub-views to be used for synthesizing a viewpoint at a given time step, the viewing client may use the process described in Kalantari, Nima Khademi, et al., *Learning-Based View Synthesis for Light Field Cameras*, 37.6 ACM TRANSACTIONS ON GRAPHICS (TOG) 193 (2016) ("Kalantari") to synthesize e.g., a novel viewpoint from sparse integral light field formed by the selected sub-views.

For some embodiments, an example viewing client process may include determining a viewpoint of the user from the direction of gaze of the user. The process may further include selecting one or more sub-views of the light field video content from a group including the one or more interpolated views and the retrieved subsampled representation. The process may further include synthesizing a view of the light field using the one or more selected sub-views and the viewpoint of the user. For some embodiments, the process may include determining a viewpoint of the user from the direction of gaze of the user; and selecting one of the plurality of subsampled representations based on the viewpoint of the user. For some embodiments, an example viewing client process may further include displaying the synthesized view of the light field. For some embodiments, selecting one or more sub-views of the light field may include selecting one or more sub-views within a threshold viewpoint angle of the viewpoint of the user.

For some embodiments, a client process may include determining a viewpoint of the user from the direction of gaze of the user, such that selecting one of the plurality of subsampled representations may be further based on the viewpoint of the user. In some embodiments, a client process may include displaying a synthesized view of the light field. With some embodiments, selecting one or more sub-views of the light field may include selecting one or more sub-views within a threshold viewpoint angle of the viewpoint of the user.

Adaptive Light Field Streaming

Supporting dynamic user viewpoints and motion parallax with many existing multi-view coding standards leads to excessive usage of bandwidth, especially in applications producing only single-view or stereo-view 2D images for the display in a single time step. Examples of such applications include 3DoF+ or 6DoF application based on viewing the content on HMDs or other 2D displays.

In some embodiments, for optimizing the rendering and data distribution, a subset of the full integral light field data may be produced and transmitted, and the receiver may synthesize additional views from the views transmitted. Furthermore, the impact of perceived image quality resulting from the selection of rendered and transmitted sub-views may guide the process of sub-view rendering either at the server side or on the client side to ensure the quality of experience.

For some embodiments, data transmission may be optimized by adapting light field streaming to the available resources by varying the number of light field sub-views during streaming.

The content server may provide multiple versions of the light field data that feature variable number of light field sub-views. In addition to several versions of the streamed content, the server may provide meta-data describing the available streams as an adaptive streaming manifest. At the beginning of a content streaming session, the client may download manifest meta-data and starts to download content segments based on the manifest meta-data. While downloading content segments, the client may observe session characteristics and network and processing performance and may adapt streaming quality by switching between available content streams.

For some embodiments, clients may optimize quality of experience while dynamically adapting light field streaming to the varying performance and network transmission conditions. Content delivery bandwidth requirements may be reduced by allowing the viewing client to dynamically adjust the number of light field sub-views that are transmitted from the content server to the viewing client.

Some embodiments may use an example client pull model for streaming, operating similar to the MPEG-Dash model. The server may produce several versions of the light field content by varying the number of sub-views that are included in each single version of the stream. The server may provide a manifest file (e.g., an MPD) to the client indicating the number and location of sub-views included with each available version of the content stream. The client may continually analyze session characteristics and performance metrics to determine the streams to be downloaded to provide a quality of experience (QoE) with given network and computing resources.

Supporting dynamic viewpoints and motion parallax with existing multi-view coding standards leads to excessive usage of bandwidth in particular in applications requiring only lower number of viewpoints at any given time. Example methods and systems in accordance with some embodiments may avoid existing restrictions by taking into account current and predicted user viewpoint and impact of chosen number of sub-views packaged into a frame for delivery on perceived image quality.

Figure 16:
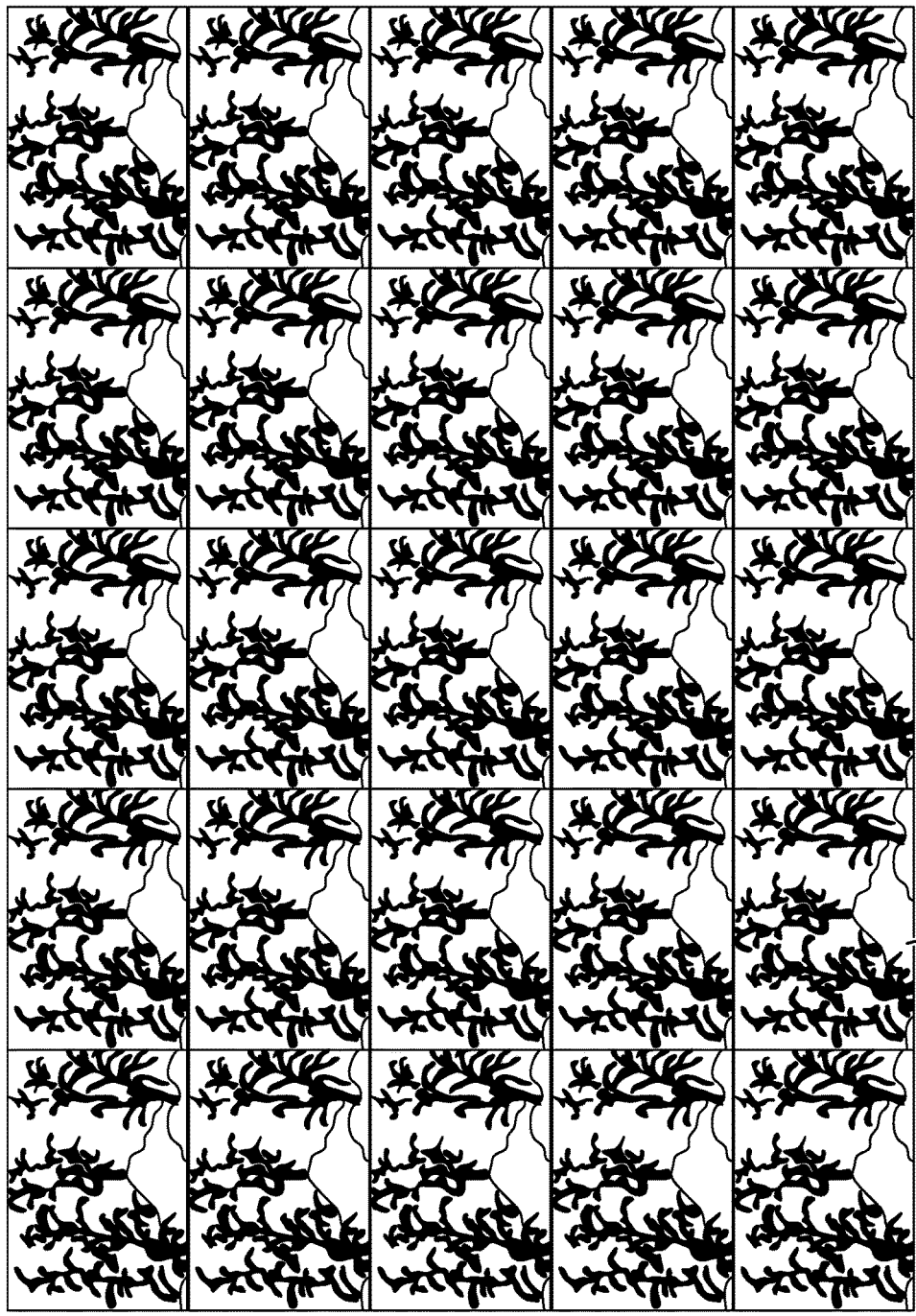
FIG. 16 is a schematic illustration showing an example light field rendered with 5×5 sub-views according to some embodiments.

FIG. 16 is a schematic illustration showing an example light field rendered with 5×5 sub-views according to some embodiments. For some embodiments, subsampling of views may be used to reduce transmission bandwidth with view interpolation used at the receiver to generate needed views. With some embodiments, varying the number of packed views may be used to adapt to bandwidth or processing constraints at the client. FIG. 16 shows an example full light field 1600 rendered with a 5×5 virtual camera array of sub-views 1602.

Figure 17:
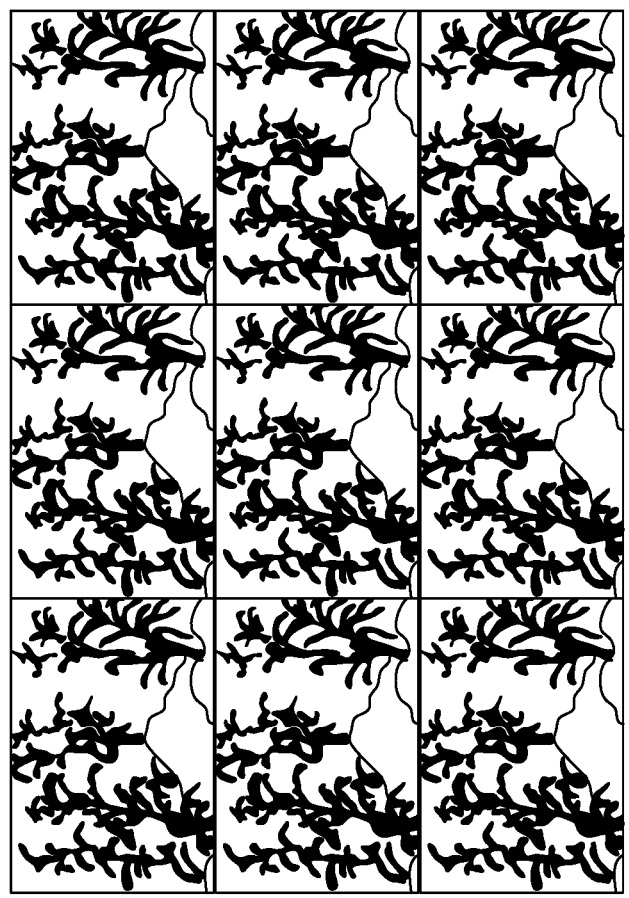
FIG. 17 is a schematic illustration showing an example light field rendered with 3×3 sub-views according to some embodiments.
Figure 19B:
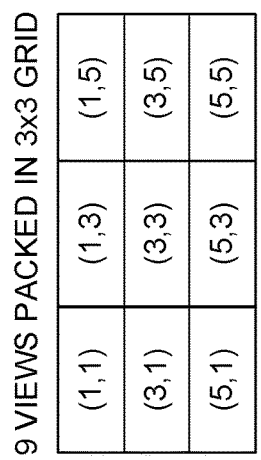
FIG. 19B is a diagram showing an example 3×3 array light field configuration corresponding to FIG. 17 according to some embodiments.

FIG. 17 is a schematic illustration showing an example light field rendered with 3×3 sub-views according to some embodiments. Priorities for individual light field sub-views may be determined based on the content analysis and context information (e.g., user/gaze location and display capabilities). Individual sub-view sets may be generated based on the sequential priority order. The client may receive sub-views, store the sub-views in cache, and use temporally coherent interpolations of sub-views to synthesize novel viewpoints. FIG. 17 represents an example of nine views packed in a 3×3 grid 1700. The views in FIG. 17 were selected in a form of a checkerboard pattern from the full light field shown in the 5×5 array of FIG. 16 using priorities as described above for some embodiments. FIG. 19B (below) presents an example in which particular sub-views were selected for an example 3×3 array.

Figure 18:
FIG. 18 is a schematic illustration showing an example light field rendered with 2×3 sub-views according to some embodiments.

FIG. 18 is a schematic illustration showing an example light field rendered with 2×3 sub-views according to some embodiments. FIG. 18 represents an example of six views packed in a 2×3 grid 1800. The views in FIG. 18 were selected in a rectangle pattern from the full light field shown in the 5×5 array of FIG. 16 using priorities as described above for some embodiments. FIG. 19C (below) presents an example in which particular sub-views were selected for an example 2×3 array.

Figure 19A:
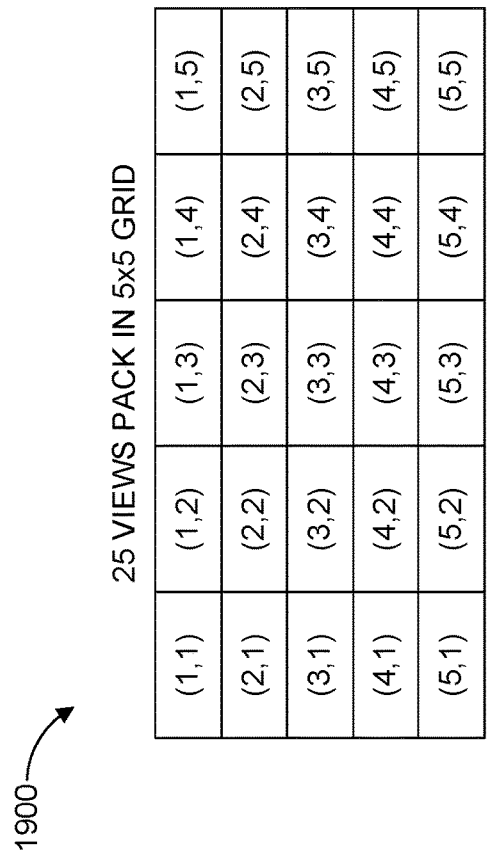
FIG. 19A is a diagram showing an example 5×5 array light field configuration corresponding to FIG. 16 according to some embodiments.
Figure 19C:
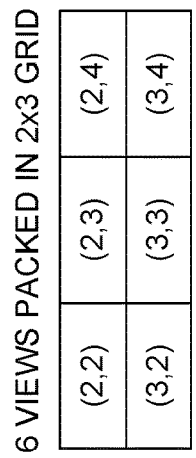
FIG. 19C is a diagram showing an example 2×3 array light field configuration corresponding to FIG. 18 according to some embodiments.

FIG. 19A is a diagram showing an example 5×5 array light field configuration corresponding to FIG. 16 according to some embodiments. For some embodiments, a Media Presentation Description (MPD) may include details of a full (or entire) light field array, such as the number of views, an index to those views, and the sampling location of views within the adaptation sets. For example, the full light field array 1900 may have N×M view positions. FIG. 19A shows an example naming convention for a full light field 5×5 array 1900. The first number in each coordinate position indicates the row, and the second number indicates the column. Location (1,1) is in the upper left corner, and location (5,5)

is the lower right corner. Other embodiments may use a different naming convention, such as the example shown in FIG. 21.

FIG. 19B is a diagram showing an example 3×3 array light field configuration corresponding to FIG. 17 according to some embodiments. The 3×3 array 1920 shown in FIG. 19B corresponds to the solid black ovals in FIG. 20. For example, the uniform subsampled 3×3 array 1920 of FIG. 19B indicates a sub-view (5,3) in the lower center position. This sub-view corresponds to the black oval of FIG. 20 in the fifth (bottom) row and third (center) column.

FIG. 19C is a diagram showing an example 2×3 array light field configuration corresponding to FIG. 18 according to some embodiments. The 2×3 array 1940 shown in FIG. 19C corresponds to a rectangle pattern of views selected from a middle portion of the full light field of the 5×5 array of FIG. 16. For example, the 2×3 array 1940 of FIG. 19C indicates a sub-view (2,4) in the upper right position. This sub-view corresponds to the second (upper-middle) row and fourth (center-right) column of FIG. 16. The example 2×3 array 1940 of FIG. 19C may be illustrated with black ovals as in FIG. 20 (not shown).

Figure 20:
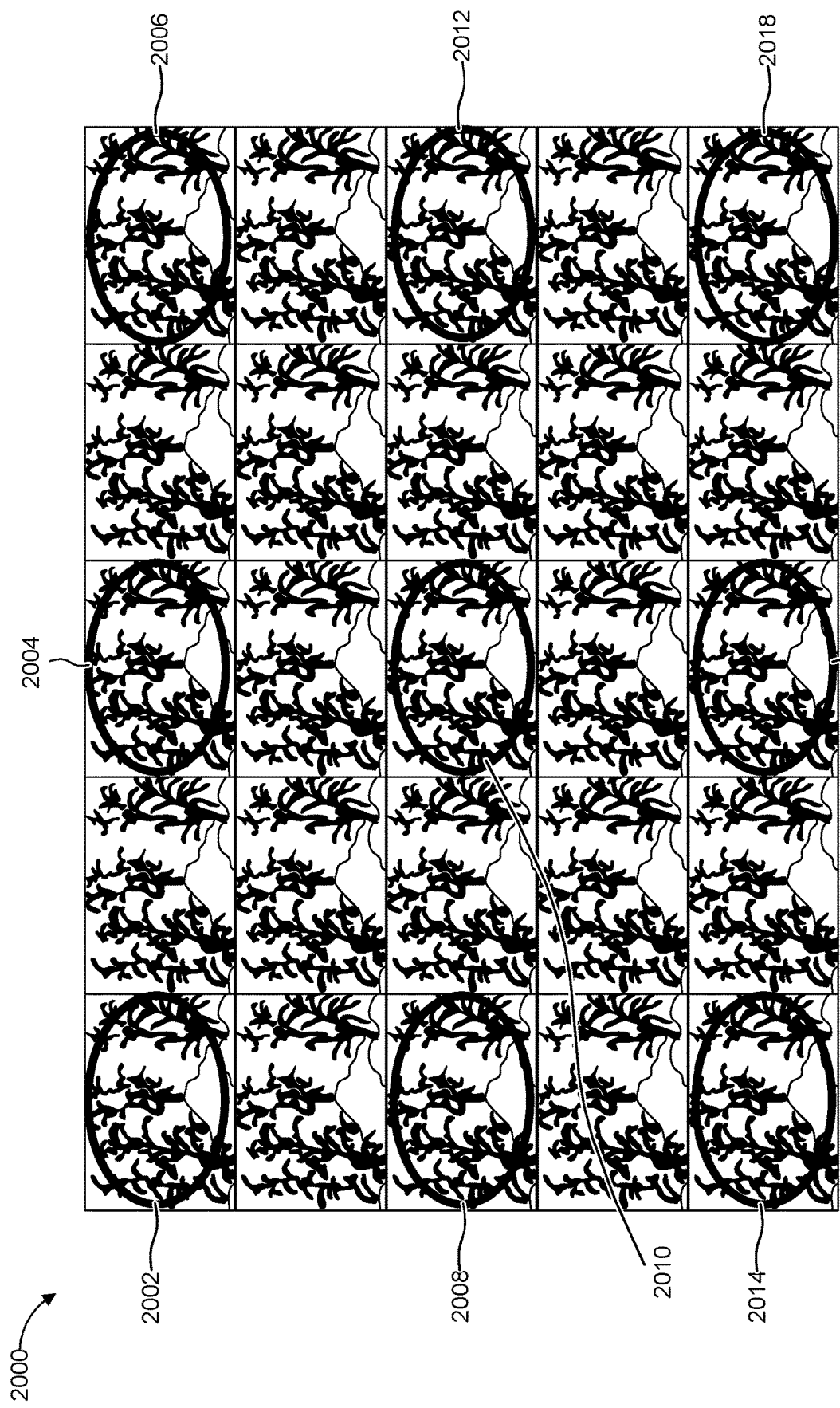
FIG. 20 is a schematic illustration showing example sub-sampling using 3×3 sub-views according to some embodiments.

FIG. 20 is a schematic illustration showing example sub-sampling using 3×3 sub-views according to some embodiments. The content server may generate several sub-sampling versions of the original light field data by using several sub-sampling configurations. For example, the content server may reduce the number of sub-views of the full light field 2000 to a sub-sampling of 3×3 sub-views 2002, 2004, 2206, 2208, 2010, 2012, 2014, 2016, 2018 as illustrated in FIGS. 17 and 19B. Similarly, the content server may generate, for example, 10×10, 5×5, 2×2, and 1×1 array sub-samplings.

The content server may generate meta-data describing available streams in an MPD file. For example, if the MPD describes two sub-sampling configurations (a 10×10 array and a 5×5 array), the 10×10 array may use a first stream, and the 5×5 array may use a second stream. For some embodiments, support for the 10×10 array of sub-views may have, for example, only one stream (not 100 individual streams). Similarly, for some embodiments, the 5×5 array may have only five streams (or another number of streams less than 25).

Figure 21:
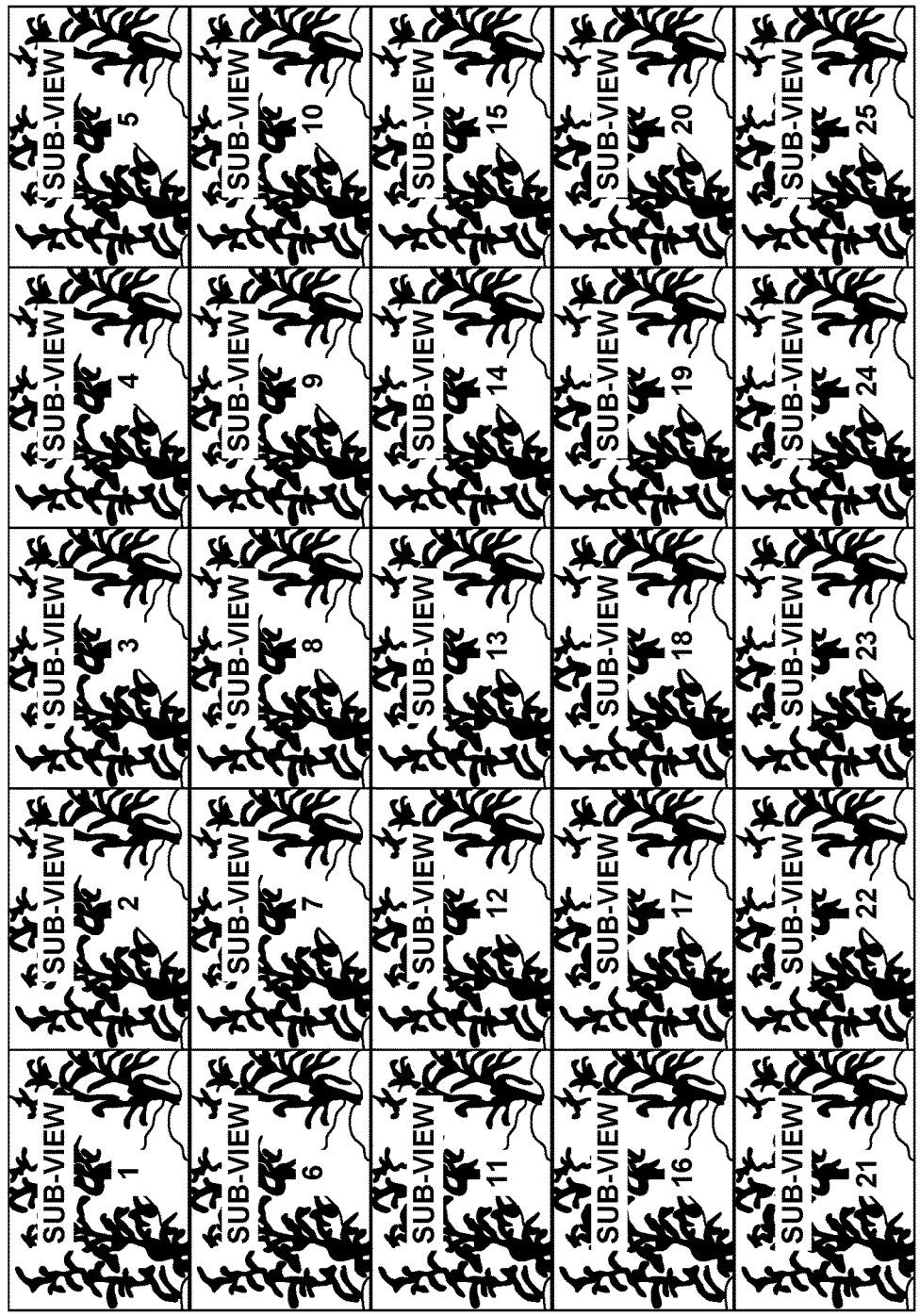
FIG. 21 is a schematic illustration showing an example numbering configuration of light field sub-views according to some embodiments.
Figure 22:
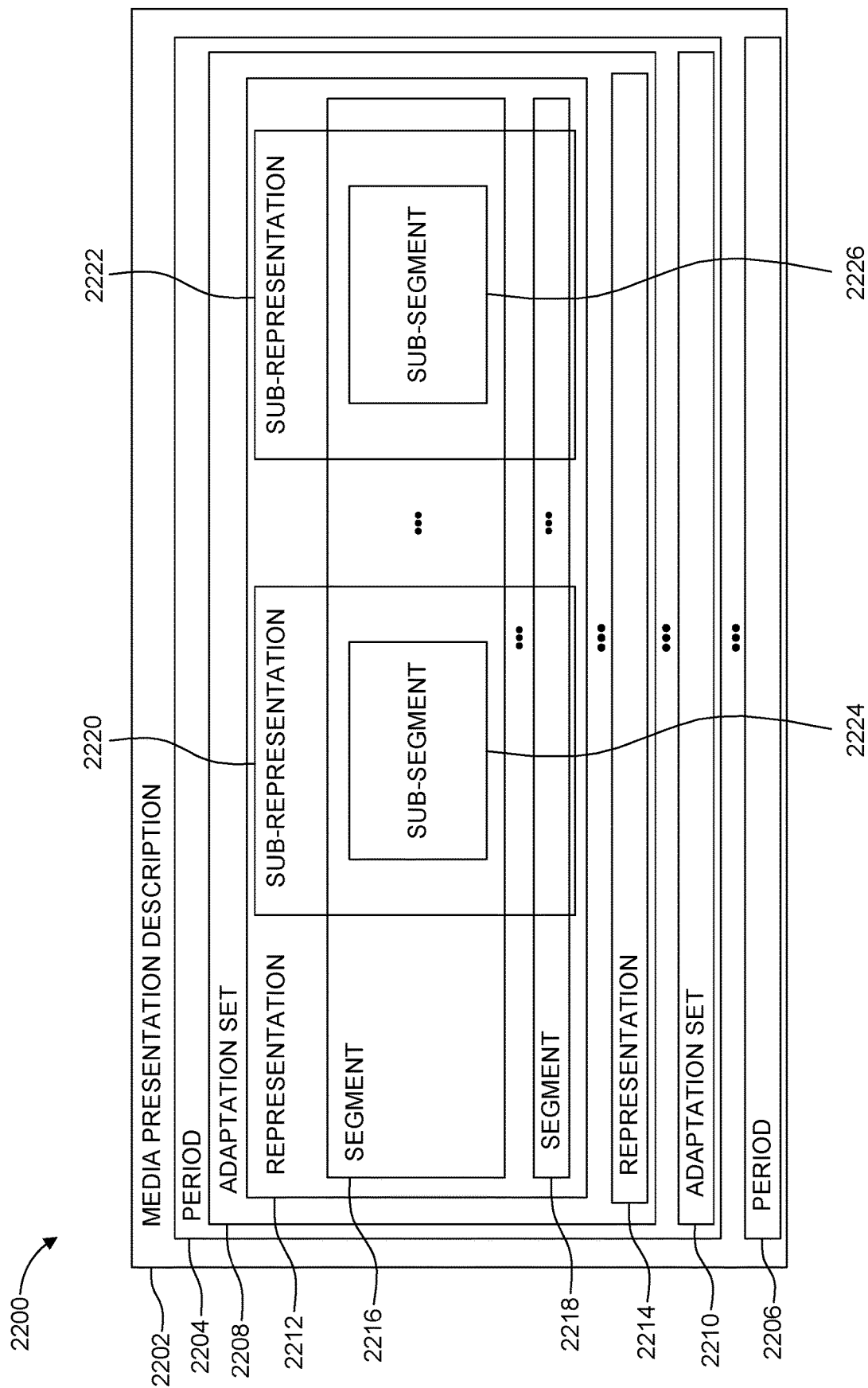
FIG. 22 is a diagram showing an example MPEG-DASH Media Presentation Description (MPD) file according to some embodiments.
Figure 23:
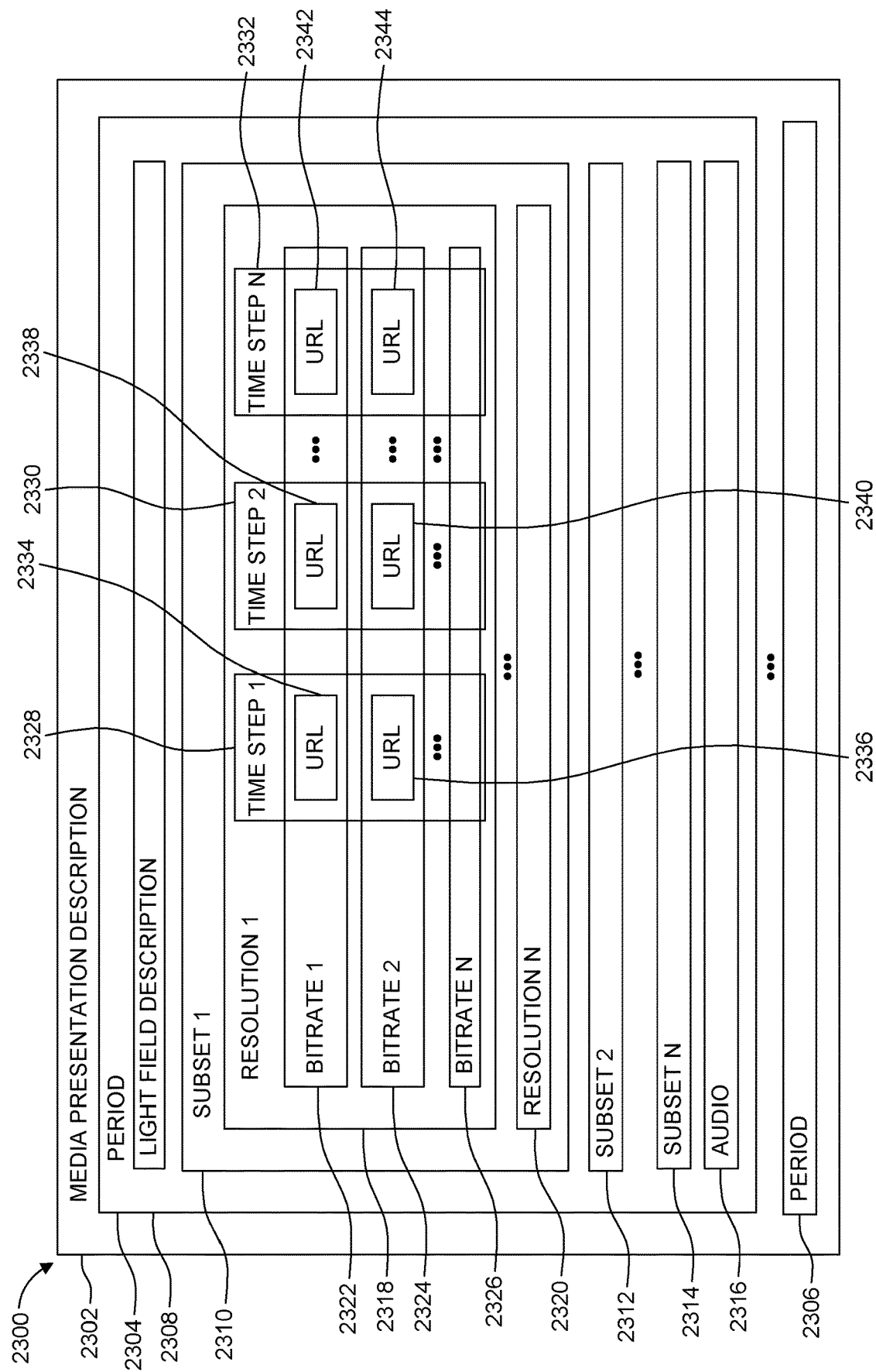
FIG. 23 is a diagram showing an example MPD file with light field configuration elements according to some embodiments.

FIG. 21 is a schematic illustration showing an example numbering configuration of light field sub-views according to some embodiments. The example sub-view numbering configuration 2100 shown in FIG. 21 is used in the example MPD shown in Table 2. FIG. 21 shows an example sub-view number configuration for a full light field 5×5 array. The sub-view numbering configuration of FIG. 21 may be compared with the sub-view numbering configuration of FIG. 19A. While FIG. 19A shows an example coordinate sub-view numbering configuration, FIG. 21 shows an example sequential sub-view numbering configuration. The top row of the 5×5 array of FIG. 21 numbers the sub-views 1 to 5 left to right. The second-row numbers the sub-views 6 to 10 left to right down to the last row, which numbers the sub-views 21 to 25 left to right. FIGS. 21-23 and Table 2 together show an example MPD for an example client pull model.

FIG. 22 is a diagram showing an example MPEG-DASH Media Presentation Description (MPD) file according to some embodiments. An example client pull model may use the standard structure of the MPEG-DASH media presentation description (MPD) illustrated in FIG. 22. The MPD file format shown in FIG. 22 may be used for transmitting the overall media description downloaded by the viewing client as part of a streaming session initialization. The organizational structure of the MPEG-DASH MPD is shown in FIG. 22.

The top-level period fields 2204, 2206 may indicate a start time and a duration. An MPD 2202 may include one or more period fields 2204, 2206. A period field 2204, 2206 may include one or more adaptation sets 2208, 2210. An adaptation set 2208, 2210 may include one or more representation fields 2212, 2214. Each representation 2212, 2214 within an adaptation set 2208, 2210 may include the same content encoded with different parameters. A representation field 2212, 2214 may include one or more segments 2216, 2218. A segment 2216, 2218 may include one or more sub-segments 2224, 2226 that includes a DASH media file. A representation field 2212, 2214 may be divided into one or more sub-representation fields 2220, 2222. A sub-representation field 2220, 2222 may include information that applies to only one media stream.

FIG. 23 is a diagram showing an example MPD file with light field configuration elements according to some embodiments. FIG. 23 illustrates how MPD data enabling an example client pull model of light field streaming may be organized in compliance with the MPEG-DASH protocol structure.

In some embodiments, the MPD structure 2300 uses a period 2304, 2306 as the top hierarchical entity. Each period 2304, 2306 may provide information for a single light field scene. A single scene may be, for example, a continuous light field rendering within which the virtual camera array used for rendering remains constant. An entire experience may include several scenes that are each specified in a separate period block. Each period block may include a light field rendering setup, which is labeled as a light field description 2308 in FIG. 23 and correlates with a first adaptation set. The light field rendering setup block 2308 may include the number of sub-views, the placement of virtual cameras used by the sub-views, and an overview of the scene layout, such as the size of the view and the size and placement of elements in the view. Each period block 2304, 2306 may include one or more subset blocks 2310, 2312, 2314, in which each subset block correlates to an adaptation set. Each subset adaptation set 2310, 2312, 2314 may include one or more different version of the content encoded with different configuration parameters. For example, content may be encoded with different resolutions, different compression rates, different bitrates, and/or different supported codecs. Each subset 2310, 2312, 2314 may include a selected number of sub-views that are in different adaptation sets, with a resolution depending on the representation block, encoded with a particular codec at a particular bitrate for a segment block. Each subset 2310, 2312, 2314 may be divided into short clips included in sub-segment blocks that have a link to the actual video data.

Adaptation sets within a period 2304, 2306 of an MPD 2302 may include subsets 2310, 2312, 2314 of a full array of views, varying the number of views and sampling location of views among an adaptation set. An adaptation set may include the number of views present and an index of available views. An adaptation set may indicate a priority level of sub-views. An adaptation set (or subset 2310, 2312, 2314 for some embodiments) may include one or more resolutions 2318, 2320 that each include one or more bitrates 2322, 2324, 2326. For each resolution 2318, 2320, there may be a series of time steps 1, 2, . . . , N (2328, 2330, 2332). Each time step 2328, 2330, 2332 may have a separate URL 2334, 2336, 2338, 2340, 2342, 2344 for each bitrate supported. For the example shown in FIG. 23, there are N resolutions that each support N bitrates. Additionally, an adaptation set within a period 2304, 2306 of an MPD 2302 may be used for audio, as shown as an audio block 2316 in the example of FIG. 23.

For some embodiments, an MPD may include information corresponding to two or more views corresponding to a selected view subset. For some embodiments, for at least one of the view subsets, the media manifest file (e.g., MPD) may include information corresponding to two or more views of the light field content.

Table 2 shows pseudocode for an exemplary MPD with fields as shown in FIG. 23 and a sub-view configuration for a 5×5 array light field as shown in FIG. 21. The example shown in Table 2 illustrates three different light field view adaptation sets with a varying number of views packed into each frame. Traditional DASH rate and resolution adaptations may be used within each view category.

be similarly configured to, or differently configured than, e.g., the example content server, e.g., of FIG. 10.

Figure 25:
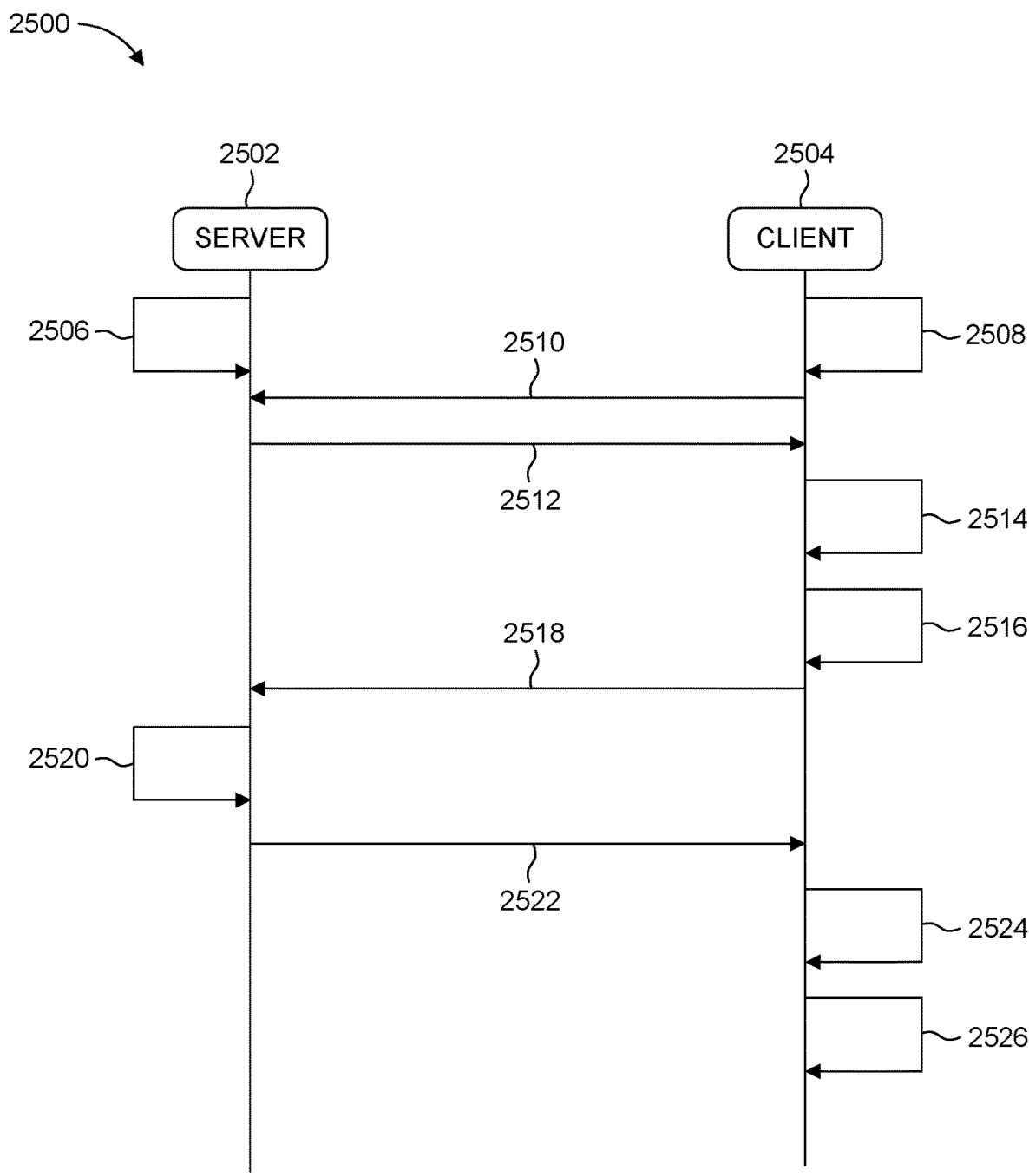
FIG. 25 is a message sequencing diagram illustrating an example process for adaptive light field streaming using estimated bandwidth and view interpolation according to some embodiments.

FIG. 25 is a message sequencing diagram illustrating an example process for adaptive light field streaming using estimated bandwidth and view interpolation according to some embodiments. For some embodiments of an example adaptive LF streaming process 2500, a server 2502 may generate 2506 subsampled light fields and descriptions for an MPD, such as is described for a few examples in relation to FIGS. 16-23. In some embodiments, a client 2504 (or viewing client) may track 2508, e.g., a viewer's gaze and use the viewer's gaze for selecting content. Tracking, e.g., a user's position (e.g., in combination with, or instead of, gaze) may be used in some embodiments. A content request may be sent 2510 from the client 2504 to the server (or content server 2502), and the MPD may be sent in response to the client. For some embodiments, the server 2502 may

TABLE 2

Figure 24:
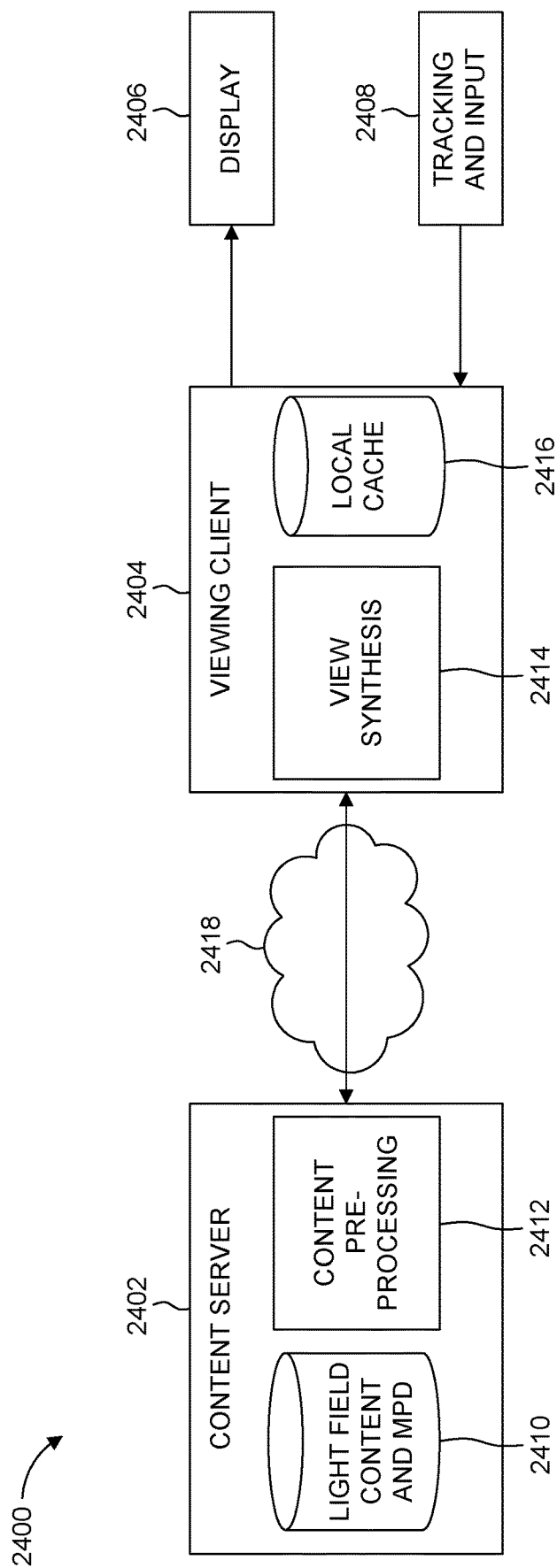
FIG. 24 is a system diagram illustrating an example set of interfaces for adaptive light field streaming according to some embodiments.

Period
    Adaptation set 1: Light field scene description:
        Sparse view array. Number of sub-views 5 × 5. Locations of virtual cameras.
    Adaptation set 2: Subset 1 (full light field): number of sub-views 5 × 5 (sub-views contained 1-25)
        Resolution 1: 1920 × 1080 px per sub-view
            Bitrate 1: Encoded with codec XX, required transfer capacity 35 Mbps
            Bitrate 2: Encoded with codec XX, required transfer capacity 31 Mbps
        Resolution 2: 1280 × 720 px per sub-view
            Bitrate 1: Encoded with codec XX, required transfer capacity 22 Mbps
            Bitrate 2: Encoded with codec XX, required transfer capacity 19 Mbps
    Adaptation set 3: Subset 2: number of sub-views 3 × 3 (sub-views contained 1, 3, 5, 11, 13, 15, 21, 23, 25)
        Resolution 1: 1920 × 1080 px per sub-view
            Bitrate 1: Encoded with codec XX, required transfer capacity 10 Mbps
            Bitrate 2: Encoded with codec XX, required transfer capacity 9 Mbps
        Resolution 2: 1280 × 720 px per sub-view
            Bitrate 1: Encoded with codec XX, required transfer capacity 7 Mbps
            Bitrate 2: Encoded with codec XX, required transfer capacity 6 Mbps
    Adaptation set 4: Subset 3: number of sub-views 2 × 2 (sub-views contained 1, 5, 21, 25)
        Resolution 1: 1920 × 1080 px per sub-view
            Bitrate 1: Encoded with codec XX, required transfer capacity 7 Mbps
            Bitrate 2: Encoded with codec XX, required transfer capacity 6 Mbps
        Resolution 2: 1280 × 720 px per sub-view
            Bitrate 1: Encoded with codec XX, required transfer capacity 4 Mbps
            Bitrate 2: Encoded with codec XX, required transfer capacity 3 Mbps
    Adaptation set 5: Subset 4: number of sub-views 1 × 1 (sub-views contained 13)
        Resolution 1: 1920 × 1080 px per sub-view
            Bitrate 1: Encoded with codec XX, required transfer capacity 2 Mbps
            Bitrate 2: Encoded with codec XX, required transfer capacity 1.5 Mbps
        Resolution 2: 1280 × 720 px per sub-view
            Bitrate 1: Encoded with codec XX, required transfer capacity 1 Mbps
            Bitrate 2: Encoded with codec XX, required transfer capacity 0.7 Mbps FIG. 24 is a system diagram illustrating an example set of interfaces for adaptive light field streaming according to some embodiments. In some embodiments, an example system 2400 with a server (e.g., a content server 2402) may include a database 2410 of light field content and one or more MPDs. A content server 2402 may be capable of running an example process 2412 for pre-processing of content. One or more content servers 2402 may be connected via a network 2418 to a client (e.g., a viewing client 2404). In some embodiments, a viewing client 2404 may include a local cache 2416. The viewing client 2404 may be enabled to execute an example process 2414 for synthesizing views (or sub-views for some embodiments) to the content. The viewing client 2404 may be connected to a display 2406 to use for displaying content (including synthesized views of the content). The viewing client 2404, in some embodiments, may include an input 2408 for receiving tracking data (such as user gaze tracking data) and input data. The example content server 2402, e.g., of FIG. 24 may send 2512 the MPD to the client without a request. In some embodiments, the client 2504 may estimate 2514 the bandwidth available for a network between the server 2502 and the client 2504 and/or estimate the bandwidth to be used under one or more subsampling scenarios. The client 2504 may select 2516 a quantity or array configuration of packed views based in part on the estimated bandwidth(s). For example, the quantity or array configuration of packed views may be selected 2516 from a sample set that minimizes the bandwidth used while maintaining one or more light field parameters above a threshold (such as using a resolution and a bit rate above particular thresholds for the top two priority sub-views). The client 2504 may send 2518 a light field representation request to the server 2502. The server 2502 may retrieve 2520 the requested LF representation and transmit 2522 the requested representation to the client 2504. The client 2504 may receive the requested representation as one or more content segments. The client 2504, for some embodiments, may interpolate 2524 one or more interpolated sub-views using the received content segments. The viewing client 2504 may display 2526 the received and interpolated sub-view light field content data.

For some embodiments, a client process may include: obtaining light field content associated with a selected representation; decoding a frame of the light field content; combining two or more views represented in the frame to generate a combined view synthesis result; and rendering to a display the combined view synthesis result.

Figure 26:
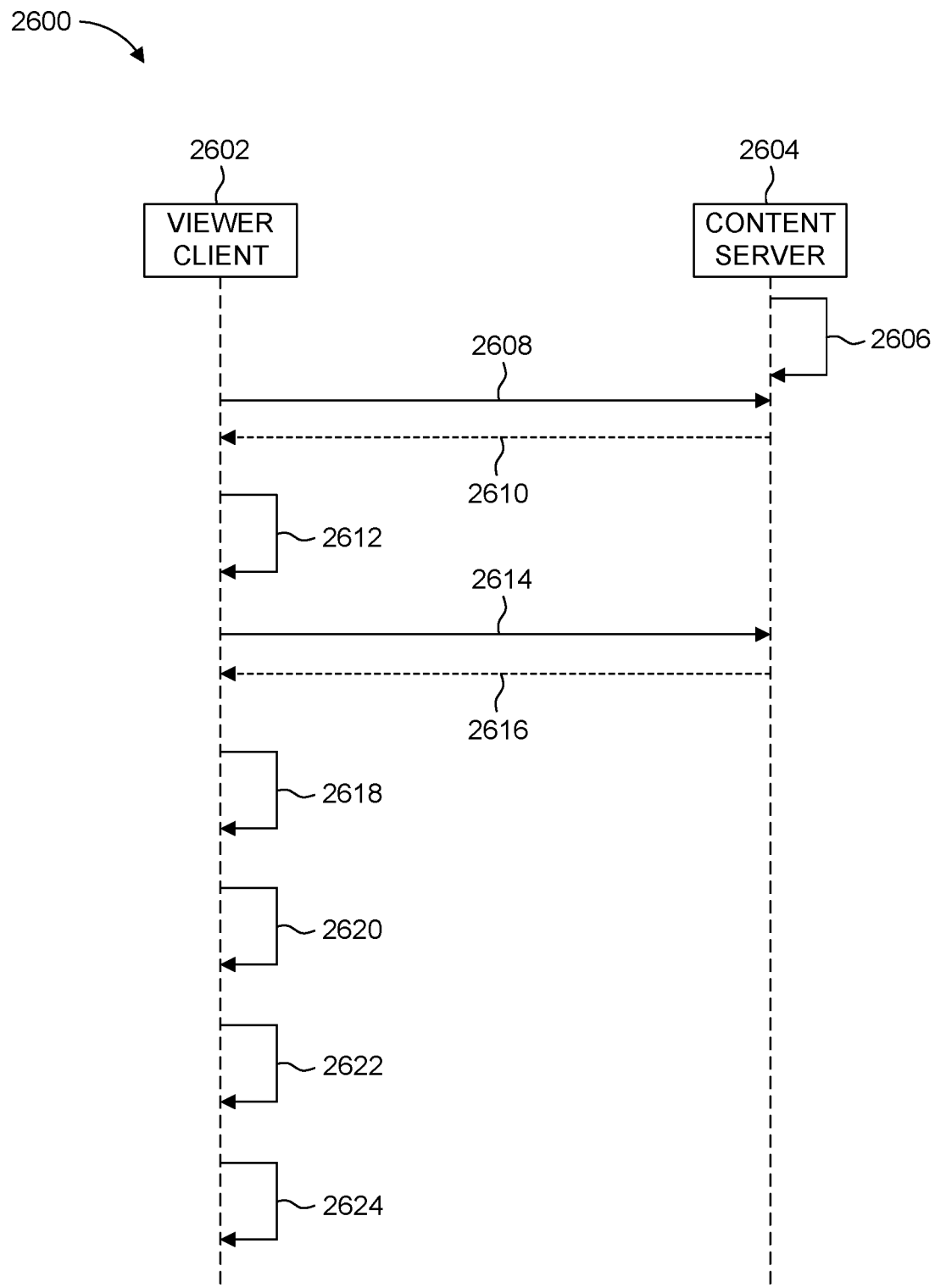
FIG. 26 is a message sequencing diagram illustrating an example process for adaptive light field streaming using a predicted view position according to some embodiments.

FIG. 26 is a message sequencing diagram illustrating an example process for adaptive light field streaming using a predicted view position according to some embodiments. For some embodiments, the client 2602 may execute the future viewpoint prediction and perform content analysis to determine which sub-views are prioritized. In some embodiments, the prioritization may be based on, for example, delivery bandwidth and view interpolation requirements and resources. For some embodiments, based on the priorities assigned to the sub-views according to, e.g., analysis performed by the viewing client 2602, the client 2602 may pull specific representations featuring the selected number of sub-views from the content server. In this model, the client 2602 may select which light field sampling to use by choosing how many sub-views to pull. The viewing client 2602 may dynamically change the number of individual sub-views pulled according to the viewpoint motion, content complexity and display capabilities. Content representations with different numbers of views may be collected at the server and provided as alternate light field sub-samplings for some embodiments. The client 2602 may choose one of these subsets based on local criteria, such as memory available, display rendering capabilities, and/or processing power. FIG. 26 illustrates an overview of the sequence for processing and communicating between the viewing client 2602 and content server 2604 in an example client pull session 2600.

For some embodiments, a content server 2604 may render 2606 a light field subset in sequential order. A viewing client 2602 may request 2608 content, and the content server 2604 may send back 2610 an MPD file. The viewing client 2602 may select 2612 the number of views of the content representation to be pulled. The viewing client 2602 may request 2614 a subset, and the content server 2604 may respond 2616 with subset content data, virtual camera positions, and timestamps of capturing the content data. The viewing client 2602 may store 2618 the received data to a local cache. The viewing client 2602 may update 2620 the viewpoint of the user and synthesize the view using temporal variability in the light field data stored in local cache. The viewing client 2602 may use (or build 2622 for some embodiments) a motion model of the viewpoint motion and predict viewpoint position in the next time step. The viewing client 2602 may analyze 2624 content and prioritize light field subsets to the pulled based on the predicted viewpoint position.

For some embodiments, selecting one of the plurality of view subsets may include parsing the information in the media manifest file (e.g., an MPD) for the plurality of view subsets of light field content.

Figure 27:
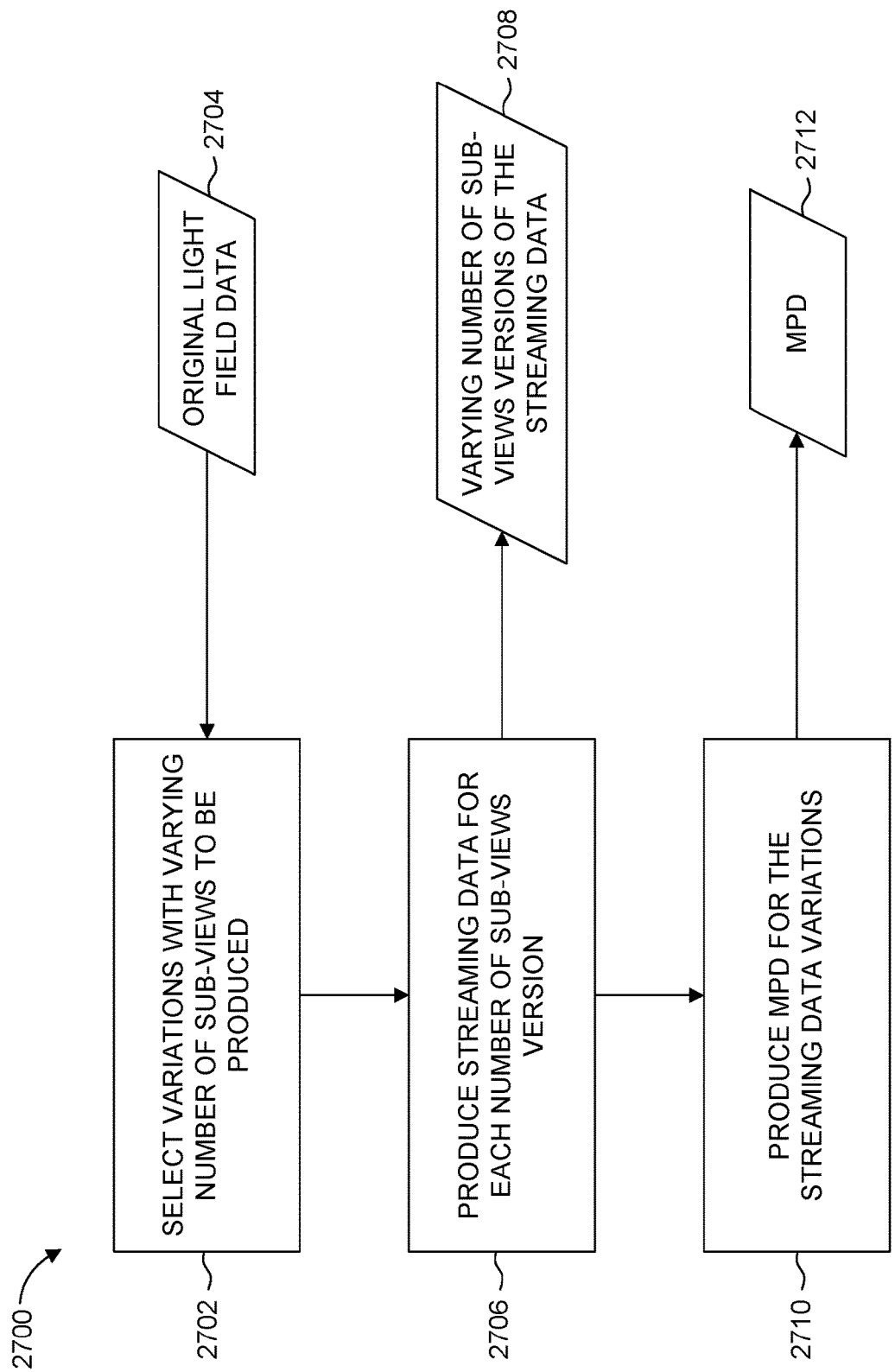
FIG. 27 is a flowchart illustrating an example process for content server pre-processing according to some embodiments.

FIG. 27 is a flowchart illustrating an example process for content server pre-processing according to some embodiments. In some embodiments of a pre-processing phase, the server may generate multiple light field data subsets and meta-data describing the subsets. Multiple light field data subsets may be configured by selecting a quantity of sub-views in various sub-samplings to be used to reduce the number of sub-views included in the streaming data.

For some embodiments, the content server may execute an example pre-processing method multiple times for different sub-sampling configurations. In some configurations of the example pre-processing method, the original light field data 2704 may be received or read from memory, such as a local content server cache. The content server may select 2702 variations with a varying number of sub-views 2708 to be produced. The content server may produce 2706 streaming data for each sub-view configuration (or sub-sampling configuration for some embodiments). The content server may produce 2710 an MPD (or metadata within an MPD) for each streaming data version or variation. The MPD 2712 may be stored in local cache by the content server.

Figure 28:
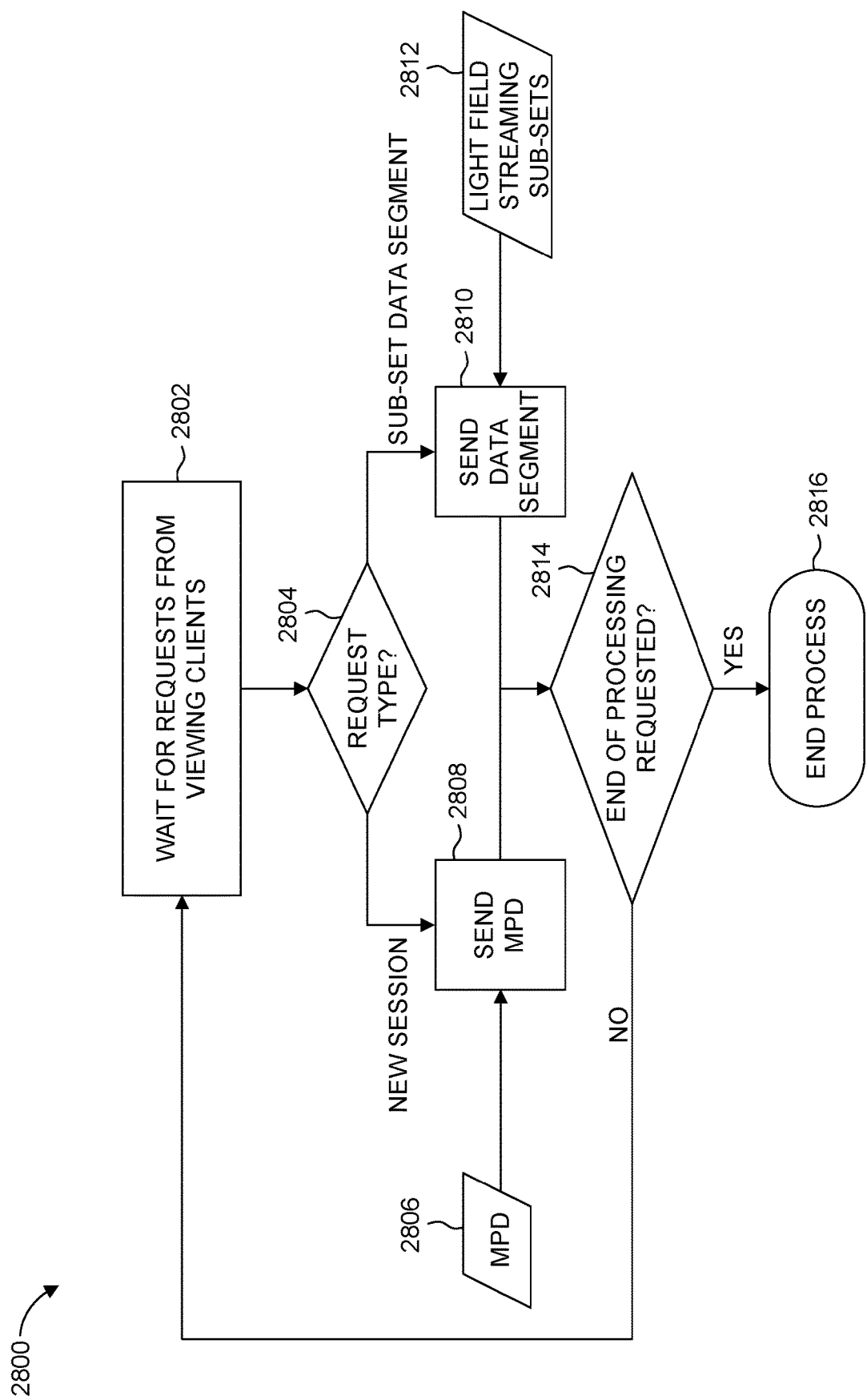
FIG. 28 is a flowchart illustrating an example process for content server run-time processing according to some embodiments.

FIG. 28 is a flowchart illustrating an example process for content server run-time processing according to some embodiments. For some embodiments, an example adaptive content distribution run-time process 2800, such as the example shown in FIG. 28, may be executed after performing pre-processing, such as the example pre-processing method of FIG. 27. In some embodiments, a content server may receive 2802 a request for content from a viewing client. The run-time process 2800 may determine 2804 the request type. If the content request indicates a new session, the content server may retrieve 2806 from memory (such as a local cache) an MPD corresponding to the content request and send 2808 the MPD to the viewing client. For some embodiments, the MPD may be generated at run-time, which may be, e.g., similar to the process described in relation to FIG. 27. If the content request indicates a request for a sub-set data segment, the content server may retrieve 2812 the light field sub-set stream from memory and send 2810 the data segment to the viewing client. The run-time process 2800 may determine 2814 if an end of processing is requested. If an end of processing signal is received, the process may end 2816. Otherwise, the process may repeat by waiting 2802 to receive a request for content.

Figure 29:
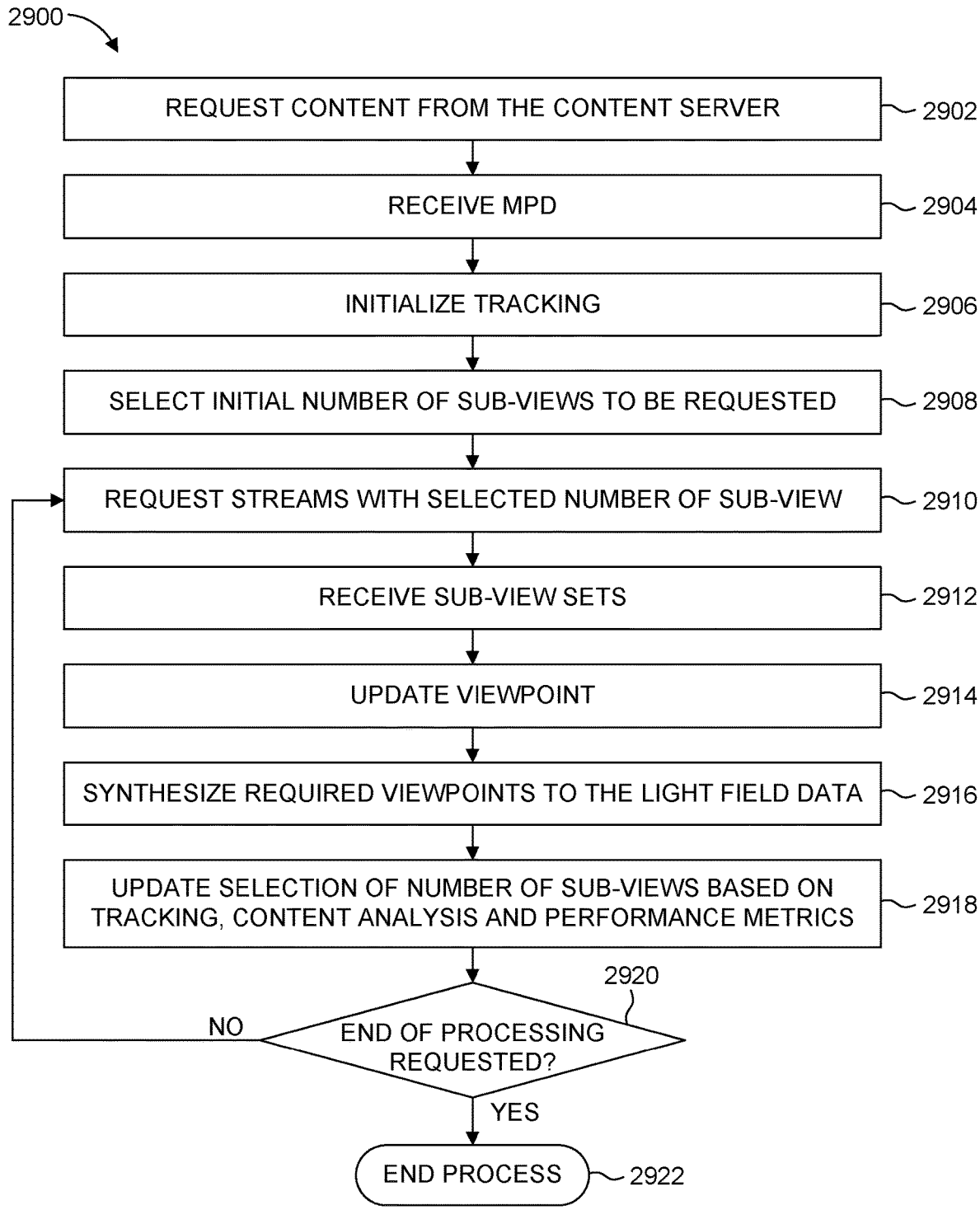
FIG. 29 is a flowchart illustrating an example process for a viewing client according to some embodiments.

FIG. 29 is a flowchart illustrating an example process for a viewing client according to some embodiments. For some embodiments of an example viewing client process 2900, a content request may be sent 2902 to the content server. In some embodiments, the content request may be sent if the user launches a viewing client application and indicates the content to be viewed. In some embodiments, the viewing client application may be launched by executing an explicit command by the user or a script file or automatically by the operating system by identifying a content request and an application associated with a content type in the content request. In some embodiments, the viewing client may be, e.g., a stand-alone application, an integrated web browser or social media client, or a part of an operating system. For some embodiments, launching the viewing client application causes initialization of sensors, such as sensors used by the viewing client device, by the user, or by gaze tracking, for example.

The viewing client may receive 2904 e.g., a manifest file (e.g. a media manifest file) such as an MPD (or an adaptation manifest for some embodiments) corresponding to the requested content. For some embodiments, the viewing client initializes 2906 device tracking. The viewing client may select 2908 an initial number of sub-views (or representations) to request from a content server (or to download from the content server). The viewing client may download sub-segments sequentially from the content server. In some embodiments, the viewing client may determine an initial adaptation set (or the number of packed sub-sets for some embodiments) and a particular representation based on, for example, display settings, tracking application settings, resolution, and bitrate, to request from the content server.

The sub-views may be packed into each frame of content to be pulled by the viewing client. For some embodiments, the viewing client may request 2910 streams with the selected number of sub-views. For some embodiments, the viewing client may download, from the content server, media segments for the selected sub-sets. In some embodiments, the content may be a URL link identifying the content data and/or an MPD file. The viewing client receives 2912 the sub-view sets. As the first segments of the representation are received, the client may begin a continual run-time process in some embodiments. The run-time process may include updating 2914 the viewpoint. The viewpoint may be updated based on the device tracking and user input. Viewpoints may be synthesized 2916 using the received light field data and the current viewpoint. From the received data, the client renders the light field as display-specific formats, interpolating additional sub-views for some viewing conditions.

The number of sub-views selected may be updated 2918 based on, for example, user tracking (e.g., user position, user gaze, user viewpoint, user view tracking), content analysis, performance metrics, viewpoint motion, content complexity, display capabilities, network and processing performance, or any other suitable criteria. For some embodiments, performance metrics (such as, e.g., bandwidth used, bandwidth available, and client capabilities) may be measured or observed and the number of sub-views selected may be updated. The viewing client may update the number of sub-views selected as part of an example run-time process. The run-time process 2900 may include determining 2920 if an end of processing is requested. If an end of processing signal is received, the process 2900 may end 2922. Otherwise, the process 2900 may repeat by requesting 2910 (or downloading for some embodiments) the selected sub-view streams.

In some embodiments, the frame may include a frame-packed representation of two or more views corresponding to the selected view subset. For some embodiments, combining two or more views represented in a frame may include using a view synthesis technique. In some embodiments, selecting one of the plurality of view subsets selects the view subset based on at least one of the following criteria: gaze tracking, complexity of the content, display capability, and bandwidth available to retrieve light field content. With some embodiments, selecting one of the plurality of view subsets may include: predicting a viewpoint of a user; and selecting the view subset based on the predicted viewpoint of the user. For example, the viewpoint subset may be selected to be within a viewpoint angle threshold of the viewpoint of the user.

For some embodiments, selecting a representation may select a representation based on at least one of the following criteria: user head position, gaze tracking, complexity of the content, display capability, and bandwidth available to retrieve light field content. For some embodiments, selecting a view subset may select a view subset based on at least one of the following criteria: user head position, gaze tracking, complexity of the content, display capability, and bandwidth available to retrieve light field content.

In some embodiments, a frame may include a frame-packed representation of two or more views corresponding to a selected view subset. With some embodiments, combining two or more views represented in a frame may include using a view synthesis technique. For some embodiments, selecting a view subset may include: predicting a viewpoint of a user; and selecting the view subset based on the predicted viewpoint of the user. In some embodiments, generating a view from the obtained light field content may include interpolating the view from the light field content associated with the selected view subset may include using the information in the manifest file respectively corresponding to the view to generate the generated view.

Figure 30:
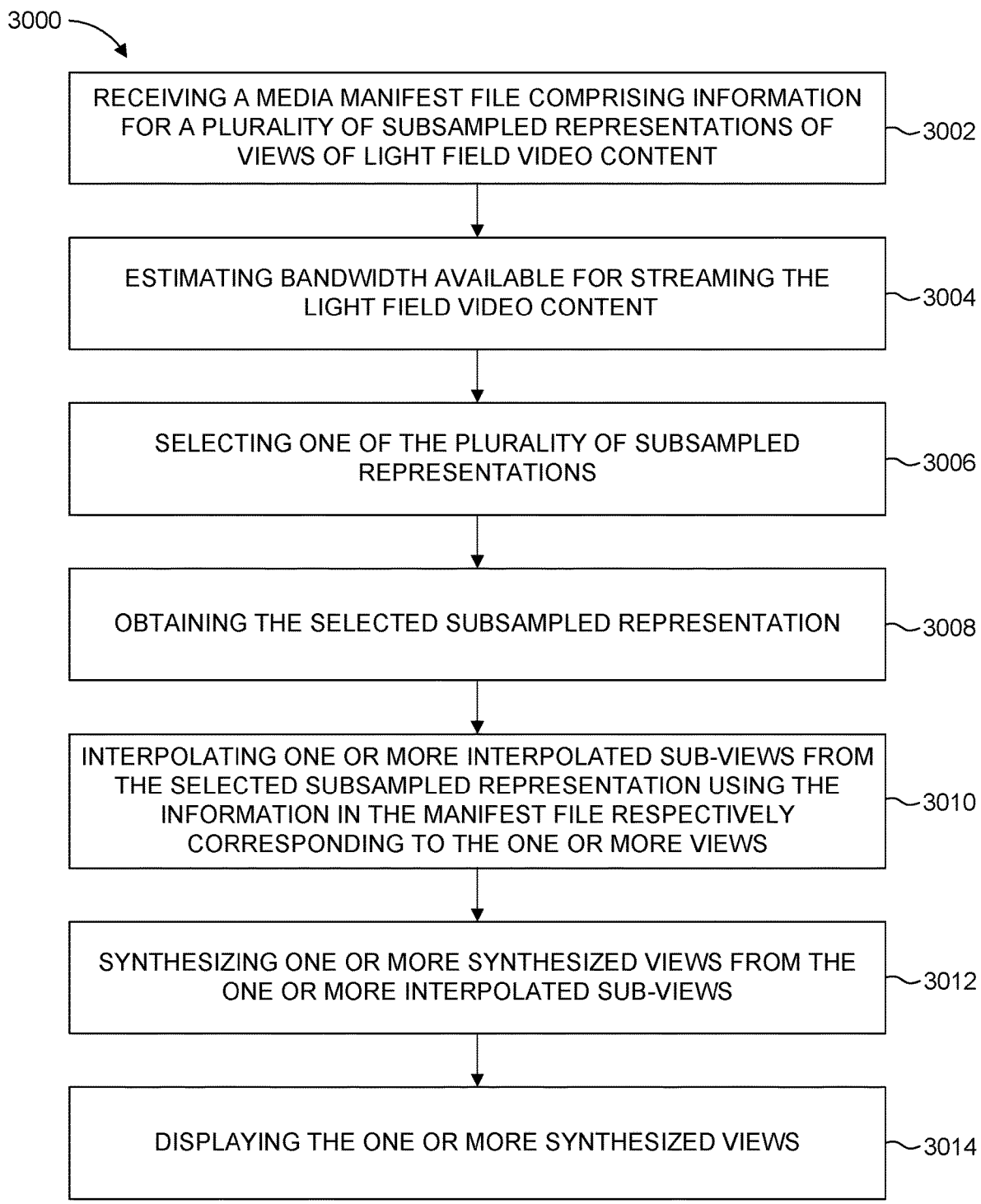
FIG. 30 is a flowchart illustrating an example process for a viewing client according to some embodiments.

FIG. 30 is a flowchart illustrating an example process for a viewing client according to some embodiments. Some embodiments of an example method 3000 of a viewing client may include receiving 3002 a media manifest file including information for a plurality of subsampled representations of views of light field video content. In some embodiments, the media manifest file may be an MPD. The example method 3000 may further include estimating 3004 bandwidth available for streaming the light field video content, selecting 3006 one of the plurality of subsampled representations, and obtaining 3008 the selected subsampled representation. Some embodiments of the example method 3000 may include interpolating 3010 one or more interpolated sub-views from the selected subsampled representation using the information in the manifest file respectively corresponding to the one or more views. Some embodiments of the example method 3000 may further include synthesizing 3012 one or more synthesized views from the one or more interpolated sub-views. Some embodiments of the example method 3000 may further include displaying 3014 the one or more synthesized views.

For some embodiments, the example method 3000 may further include requesting light field video content from a server. For some embodiments of the example method 3000, retrieving the selected subsampled representation from a server may include requesting the selected subsampled representation from a server and receiving the selected subsampled representation. In some embodiments, an example apparatus may include a processor and a non-transitory computer-readable medium storing instructions that are operative, when executed by the processor, to perform any of the methods described above. Some embodiments of an example method may include: obtaining light field content associated with the selected representation; generating a view of the light field content from the obtained light field content; and rendering to a display the generated view. Some embodiments of an example method may include: receiving a media manifest file including information for a plurality of subsampled representations of views of light field video content; estimating bandwidth available for streaming the light field video content; selecting one of the plurality of subsampled representations; obtaining the selected subsampled representation; interpolating one or more interpolated sub-views from the selected subsampled representation using the information in the manifest file respectively corresponding to the one or more views; synthesizing one or more synthesized views from the one or more interpolated sub-views; and displaying the one or more synthesized views. Some embodiments of an apparatus may include a processor; and a non-transitory computer-readable medium storing instructions that are operative, when executed by the processor, to perform any one of the example methods listed above.

Figure 31:
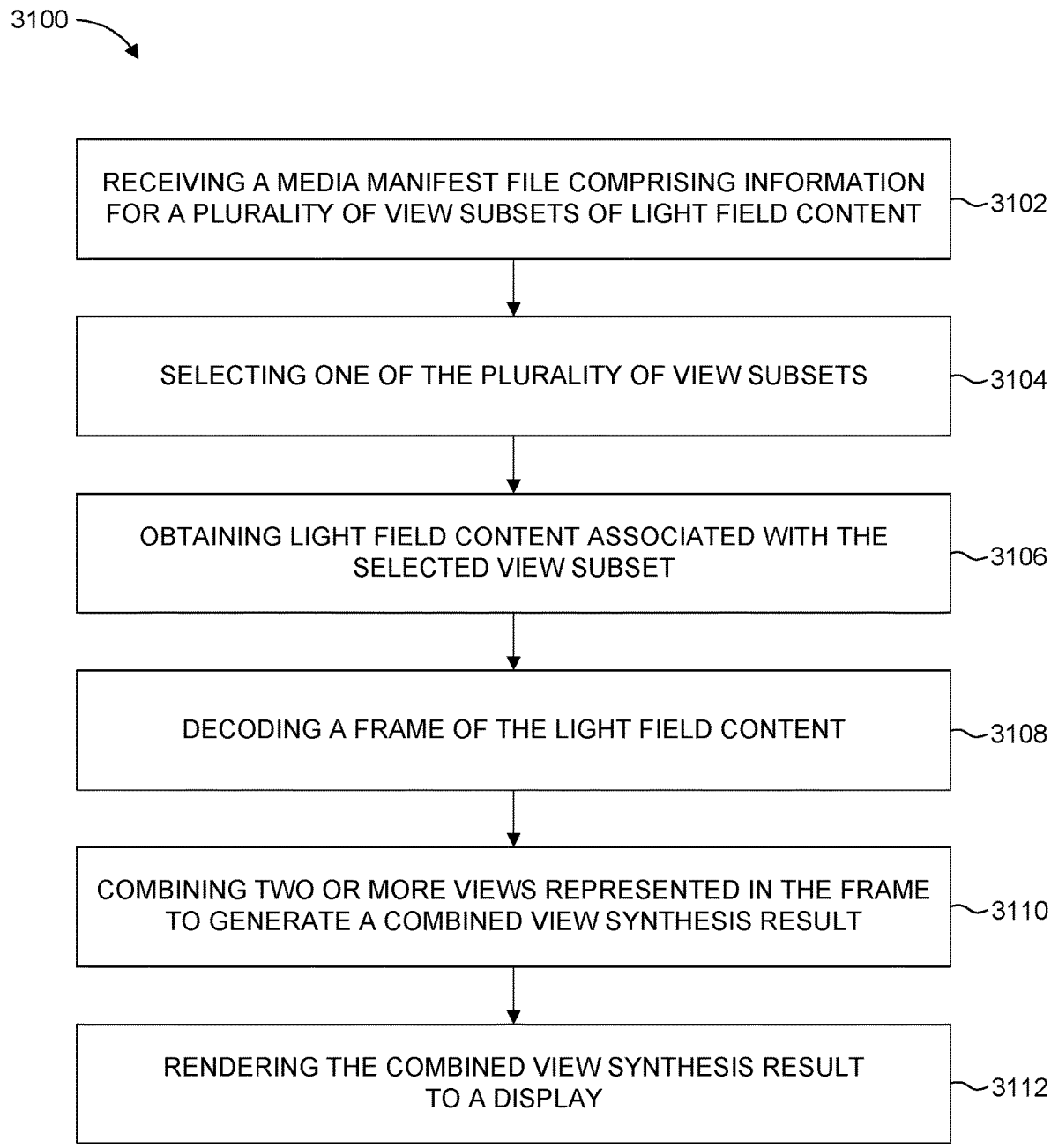
FIG. 31 is a flowchart illustrating an example process for a viewing client according to some embodiments.

FIG. 31 is a flowchart illustrating an example process for a viewing client according to some embodiments. Some embodiments of an example method 3100 of a viewing client may include receiving 3102 a media manifest file including information for a plurality of view subsets of light field content. The example method 3100 may further include selecting 3104 one of the plurality of view subsets and obtaining light field content associated with the selected view subset. In some embodiments, the example method 3100 may include decoding 3108 a frame of the light field content. The example method 3100 may include combining 3110 two or more views represented in the frame to generate a combined view synthesis result. The example method 3100 may further include rendering 3112 the combined view synthesis result to a display. For some embodiments of the example method 3100, retrieving the MPD may include requesting and receiving the MPD. For some embodiments, the example methods described in relationship to FIGS. 30 and 31 may be performed by a client device. For some embodiments, the light field content may be three-dimensional light field content. In some embodiments, an example apparatus may include a processor and a non-transitory computer-readable medium storing instructions that are operative, when executed by the processor, to perform any of the methods described above.

For some embodiments, generating a view of light field content may include: decoding a frame of the light field content; and combining two or more views represented in the frame to generate the generated view, such that the obtained (or retrieved for some embodiments) light field content includes the frame of the light field content. In some embodiments, an example method may include: receiving a media manifest file including information for a plurality of view subsets of light field content; selecting one of the plurality of view subsets; obtaining light field content associated with the selected view subset; decoding a frame of the light field content; combining two or more views represented in the frame to generate a combined view synthesis result; and rendering the combined view synthesis result to a display. With some embodiments, a sample method may include: receiving a media manifest file including information for a plurality of view subsets of light field content; selecting one of the plurality of view subsets; obtaining light field content associated with the selected view subset; generating a view from the obtained light field content; and rendering the generated view to a display. For some embodiments of the sample method, generating one or more views from the obtained light field content may include: decoding a frame of the light field content; and combining two or more views represented in the frame to generate the generated view, such that the obtained light field content includes the frame of the light field content. Some embodiments of an apparatus may include a processor; and a non-transitory computer-readable medium storing instructions that are operative, when executed by the processor, to perform any one of the example methods listed above.

Figure 32:
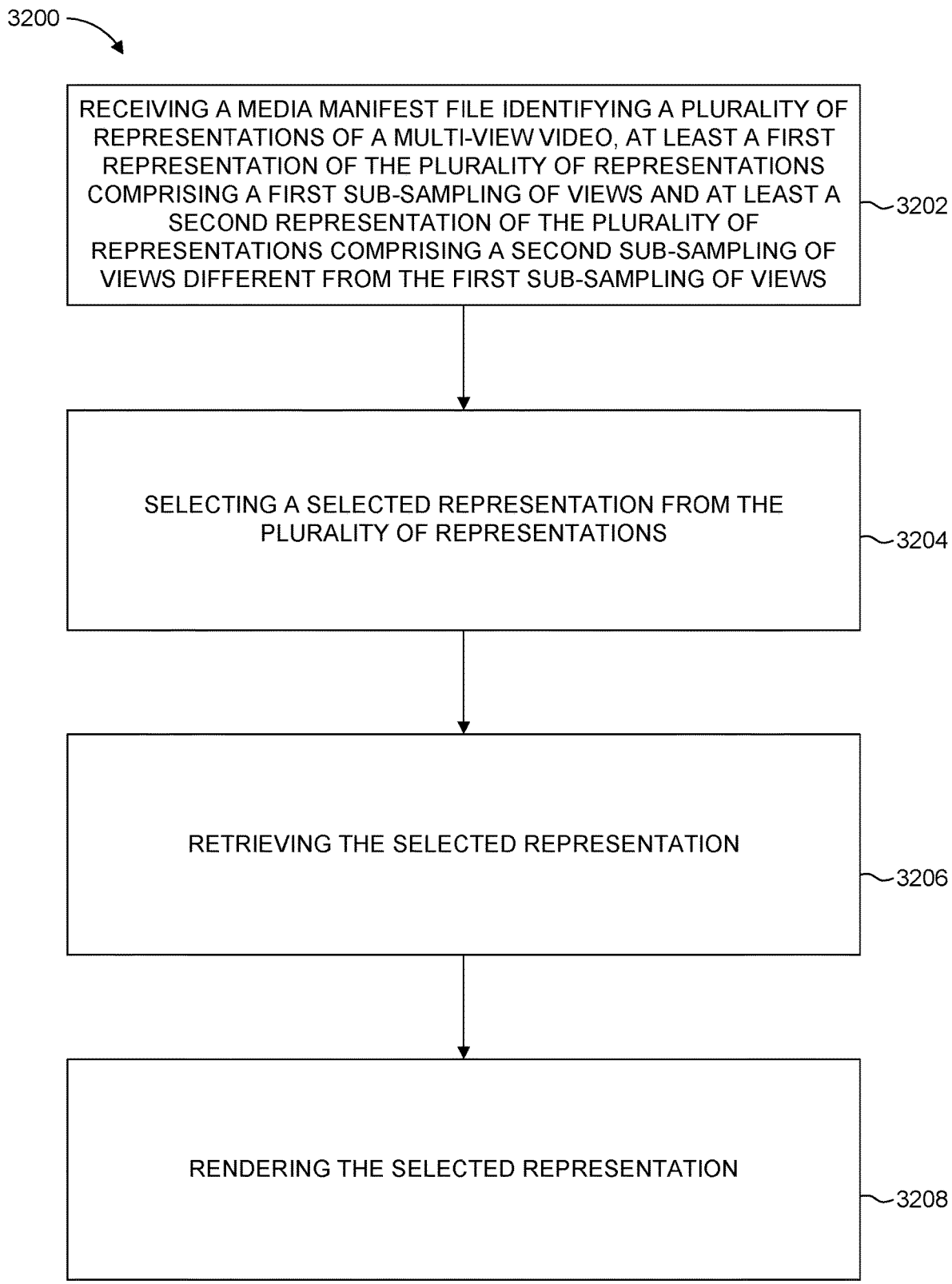
FIG. 32 is a flowchart illustrating an example process for a viewing client according to some embodiments.

FIG. 32 is a flowchart illustrating an example process for a viewing client according to some embodiments. For some embodiments, an example process 3200 may include receiving 3202 a media manifest file identifying a plurality of representations of a multi-view video, such that at least a first representation of the plurality of representations may include a first sub-sampling of views and at least a second representation of the plurality of representations comprising a second sub-sampling of views different from the first sub-sampling of views. For some embodiments, the example process 3200 may further include selecting 3204 a selected representation from the plurality of representations. For some embodiments, the example process 3200 may further include retrieving 3206 the selected representation. For some embodiments, the example process 3200 may further include rendering 3208 the selected representation. For some embodiments, an apparatus may include a processor and a non-transitory computer-readable medium storing instructions that are operative, when executed by the processor, to perform an embodiment of the example process 3200.

While the methods and systems in accordance with some embodiments are discussed in the context of a display, some embodiments may be applied to virtual reality (VR), mixed reality (MR), and augmented reality (AR) contexts as well. Also, although the term "head mounted display (HMD)" is used herein in accordance with some embodiments, some embodiments may be applied to a wearable device (which may or may not be attached to the head) capable of, e.g., VR, AR, and/or MR for some embodiments.

An example method in accordance with some embodiments may include: receiving a media manifest file identifying a plurality of representations of a multi-view video, at least a first representation of the plurality of representations including a first sub-sampling of views and at least a second representation of the plurality of representations comprising a second sub-sampling of views different from the first sub-sampling of views; selecting a selected representation from the plurality of representations; retrieving the selected representation; and rendering the selected representation.

For some embodiments of the example method, each representation of the plurality of representations may have a respective density of views toward a particular respective direction.

For some embodiments of the example method, the media manifest file may identify, for one or more representations of the plurality of representations, the respective density of views and the particular respective direction.

For some embodiments of the example method, the two or more different sub-samplings of views may differ at least in with respect to density of views of the sub-samplings of views toward particular directions.

Some embodiments of the example method may further include: tracking the view direction of the user, wherein selecting the selected representation may include selecting a sub-sampling of views of the two or more sub-samplings of views, the selected sub-sampling of views having a high density of view toward the tracked view direction of the user.

Some embodiments of the example method may further include: tracking the view direction of the user, wherein selecting the selected representation may include selecting the selected representation based on the tracked view direction of the user.

Some embodiments of the example method may further include: obtaining the view direction of the user, wherein selecting the selected representation comprises selecting the selected representation based on the obtained view direction of the user.

For some embodiments of the example method, selecting the selected representation may be based on a position of a user.

For some embodiments of the example method, selecting the selected representation may be based on a bandwidth constraint.

For some embodiments of the example method, at least one of the plurality of representations may include a higher density of views for a first view direction than a second view direction.

Some embodiments of the example method may further include generating a signal for display using the rendered representation.

Some embodiments of the example method may further include tracking a head position of a user, wherein selecting the selected representation may be based on the head position of the user.

Some embodiments of the example method may further include tracking a direction of gaze of a user, wherein selecting the selected representation may be based on the direction of gaze of the user.

Some embodiments of the example method may further include determining a viewpoint of the user using the direction of gaze of the user, wherein selecting the selected representation may include selecting the selected representation based on the viewpoint of the user.

Some embodiments of the example method may further include determining a viewpoint of the user using the direction of gaze of the user; and selecting at least one sub-sampling of a view of the multi-view video, wherein selecting the at least one sub-sampling of the view may include selecting at least one sub-sampling of the view within a threshold viewpoint angle of the viewpoint of the user.

Some embodiments of the example method may further include interpolating at least one view, wherein selecting the selected representation may select the selected representation from the plurality of representations and the at least one view.

For some embodiments of the example method, wherein the media manifest file may include priority data for one or more views, and wherein interpolating the at least one view uses the priority data.

For some embodiments of the example method, wherein the media manifest file may include priority data for one or more views, and wherein selecting the selected representation uses the priority data.

Some embodiments of the example method may further include: obtaining light field content associated with the selected representation; decoding a frame of the light field content; combining two or more views represented in the frame to generate a combined view synthesis result; and rendering to a display the combined view synthesis result.

For some embodiments of the example method, the frame may include a frame-packed representation of two or more views corresponding to the selected representation.

For some embodiments of the example method, for at least one of the plurality of representations, the media manifest file may include information corresponding to two or more views of the light field content.

For some embodiments of the example method, selecting the selected representation may select the representation based on at least one of the following criteria: user head position, gaze tracking, complexity of the content, display capability, and bandwidth available to retrieve light field content.

For some embodiments of the example method, selecting the selected representation may include: predicting a viewpoint of a user; and selecting the selected representation based on the predicted viewpoint of the user.

Some embodiments of the example method may further include: obtaining light field content associated with the selected representation; generating a generated view of the light field content from the obtained light field content; and rendering to a display the generated view.

For some embodiments of the example method, generating the generated view of the light field content may include: decoding a frame of the light field content; and combining two or more views represented in the frame to generate the generated view, wherein the obtained light field content may include the frame of the light field content.

Some embodiments of the example method may further include: decoding a frame of light field content; and combining two or more views represented in the frame to generate a combined view synthesis result, wherein the plurality of representations of the multi-view video may include a plurality of sub-sampling of views of the light field content, and wherein rendering the selected representation may include rendering the combined view synthesis result to a display.

Some embodiments of the example method may further include: requesting the media manifest file from a server; and requesting the light field content associated with the selected view subset, wherein obtaining the light field content associated with the selected view subset may include executing a process selected from a group consisting of: retrieving the light field content associated with the selected view subset from the server, requesting the light field content associated with the selected view subset from the server, and receiving the light field content associated with the selected view subset.

For some embodiments of the example method, combining two or more views represented in the frame may include using a view synthesis technique.

For some embodiments of the example method, selecting one of the plurality of sub-sampling of views may select the view subset based on at least one of the following criteria: user head position, gaze tracking, complexity of the content, display capability, and bandwidth available to retrieve light field content.

For some embodiments of the example method, selecting one of the plurality of sub-sampling of views may include: predicting a viewpoint of a user; and selecting the view subset based on the predicted viewpoint of the user.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file including information for a plurality of subsampled representations of views of light field video content; selecting one of the plurality of subsampled representations; obtaining the selected subsampled representation; interpolating one or more interpolated sub-views from the selected subsampled representation using the information in the manifest file respectively corresponding to the one or more views; synthesizing one or more synthesized views from the one or more interpolated sub-views; and displaying the one or more synthesized views.

Some embodiments of the example method may further include estimating bandwidth available for streaming the light field video content, such that selecting the subsampled representation of the plurality of subsampled representations is based on the estimated bandwidth.

Some embodiments of the example method may further include tracking a position of a user, such that selecting the subsampled representation of the plurality of subsampled representations is based on the position of the user.

Some embodiments of the example method may further include requesting the light field video content from a server, wherein obtaining the selected subsampled representation may include executing a process selected from a group consisting of: retrieving the selected subsampled representation from the server, requesting the selected subsampled representation from the server, and receiving the selected subsampled representation.

For some embodiments of the example method, the information in the manifest file may include location data of two or more views.

For some embodiments of the example method, the information in the manifest file may include interpolation priority data for one or more of the plurality of views, and selecting one of the plurality of subsampled representations may be based on the interpolation priority data for one or more of the plurality of views.

Some embodiments of the example method may further include tracking a head position of a user, wherein selecting one of the plurality of subsampled representations is based on the head position of the user.

Some embodiments of the example method may further include tracking a direction of gaze of a user, wherein selecting one of the plurality of subsampled representations may be based on the direction of gaze of the user.

Some embodiments of the example method may further include: determining a viewpoint of the user from the direction of gaze of the user; and selecting one or more sub-views of the light field video content from a group including the one or more interpolated views and the selected subsampled representation, wherein synthesizing the one or more synthesized views from the one or more interpolated sub-views may include synthesizing the one or more synthesized views of the light field using the one or more selected sub-views and the viewpoint of the user.

Some embodiments of the example method may further include displaying the synthesized view of the light field.

For some embodiments of the example method, selecting one or more sub-views of the light field may include selecting one or more sub-views within a threshold viewpoint angle of the viewpoint of the user.

Some embodiments of the example method may further include: determining a viewpoint of the user from the direction of gaze of the user, wherein selecting one of the plurality of subsampled representations may include selecting the subsampled representation based on the viewpoint of the user.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file including information for a plurality of sub-sampling of views of light field content; selecting one of the plurality of sub-sampling of views; obtaining light field content associated with the selected sub-sampling of views; decoding a frame of the light field content; combining two or more views represented in the frame to generate a combined view synthesis result; and rendering the combined view synthesis result to a display, wherein the obtained light field content comprises the frame of the light field content.

Some embodiments of the example method may further include: requesting the media manifest file from a server; and requesting the light field content associated with the selected view subset, wherein obtaining the light field content associated with the selected view subset may include executing a process selected from a group consisting of: retrieving the light field content associated with the selected view subset from the server, requesting the light field content associated with the selected view subset from the server, and receiving the light field content associated with the selected view subset.

For some embodiments of the example method, the frame may include a frame-packed representation of two or more views corresponding to the selected view subset.

For some embodiments of the example method, the media manifest file may include information corresponding to the two or more views corresponding to the selected view subset.

For some embodiments of the example method, for at least one of the plurality of sub-sampling of views, the media manifest file may include information corresponding to two or more views of the light field content.

For some embodiments of the example method, selecting one of the plurality of sub-sampling of views may include parsing the information in the media manifest file for the plurality of sub-sampling of views of light field content.

For some embodiments of the example method, combining two or more views represented in the frame may include using a view synthesis technique.

For some embodiments of the example method, selecting one of the plurality of sub-sampling of views may select the view subset based on at least one of the following criteria: gaze tracking, complexity of the content, display capability, and bandwidth available to retrieve light field content.

For some embodiments of the example method, selecting one of the plurality of sub-sampling of views may include: predicting a viewpoint of a user; and selecting the view subset based on the predicted viewpoint of the user.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file including information for a plurality of sub-sampling of views of light field content; selecting one of the plurality of sub-sampling of views; obtaining light field content associated with the selected view subset; generating a view from the obtained light field content; and rendering the generated view to a display.

For some embodiments of the example method, generating the view from the obtained light field content may include interpolating the view from the light field content associated with the selected view subset using the information in the manifest file respectively corresponding to the view to generate the generated view.

For some embodiments of the example method, generating one or more views from the obtained light field content may include: decoding a frame of the light field content; and combining two or more views represented in the frame to generate the generated view, wherein the obtained light field content may include the frame of the light field content.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a media manifest file identifying a plurality of sub-sampling of views of a multi-view video, the plurality of sub-sampling of views including two or more different density of views; selecting a selected sub-sampling from the plurality of sub-sampling of views; retrieving the selected sub-sampling; and rendering the selected sub-sampling.

An example apparatus in accordance with some embodiments may include: a processor; and a non-transitory computer-readable medium storing instructions that are operative, when executed by the processor, to perform any one of the methods listed above.

An example method in accordance with some embodiments may include: rendering a representation of views including a full array of light field video content; sending the rendered full array representation of views; obtaining a current viewpoint of a client; predicting a future viewpoint using the current viewpoint and a viewpoint motion model; prioritizing a plurality of subsampled representations of views of the light field video content; rendering the prioritized plurality of subsampled representations of views of light field video content; and sending the prioritized plurality of subsampled representations of views.

An example apparatus in accordance with some embodiments may include: a processor; and a non-transitory computer-readable medium storing instructions that are operative, when executed by the processor, to perform any one of the methods listed above.

An example method in accordance with some embodiments may include: selecting a plurality of sub-views of light field video content; producing streaming data for each of the plurality of sub-views of the light field video content; and producing a media manifest tile including the streaming data for each of the plurality of sub-views of the light field video content.

An example apparatus in accordance with some embodiments may include: a processor; and a non-transitory computer-readable medium storing instructions that are operative, when executed by the processor, to perform any one of the methods listed above.

An example method in accordance with some embodiments may include: receiving a request for information for light field video content; sending a media manifest file including information for a plurality of subsampled representations of views of the light field video content when the request is a new session request; and sending a data segment including a sub-set of the light field video content when the request is a sub-set data segment request.

An example apparatus in accordance with some embodiments may include: a processor; and a non-transitory computer-readable medium storing instructions that are operative, when executed by the processor, to perform any one of the methods listed above.

An example signal in accordance with some embodiments may include a signal carrying a representation of views including a full array of light field video content and a plurality of subsampled representations of views of the light field video content.

An example signal in accordance with some embodiments may include a signal carrying a plurality of sub-views of light field video content.

An example signal in accordance with some embodiments may include a signal carrying streaming data for each of a plurality of sub-views of light field video content.

An example signal in accordance with some embodiments may include a signal carrying information for a plurality of subsampled representations of views of light field video content.

An example signal in accordance with some embodiments may include a signal carrying a data segment including a sub-set of light field video content.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method, implemented by a server, the method comprising:
   receiving, from an apparatus, a message indicating a request for a media manifest file;
   sending, to the apparatus, the media manifest file identifying a plurality of representations of a light field video content comprising a plurality of sub-views of an integral light field image, at least a first representation of the plurality of representations comprising a first subset of sub-views of the plurality of sub-views and at least a second representation of the plurality of representations comprising a second subset of sub-views of the plurality of sub-views,
   wherein the first and second subsets of sub-views each comprise multiple sub-views of the plurality of sub-views, and wherein the second subset of sub-views is different from the first subset of sub-views;
   receiving, from the apparatus, a selected representation from the plurality of representations; and
   sending, to the apparatus, the selected representation.

2. The method of claim 1, wherein each representation of the plurality of representations has a respective density of views toward a particular respective direction.

3. The method of claim 2, wherein the media manifest file identifies, for one or more representations of the plurality of representations, the respective density of views and the particular respective direction.

4. The method of claim 1, wherein the first and second subsets of sub-views differ at least with respect to density of views of the subsets of sub-views toward particular directions.

5. The method of claim 1, wherein the selected representation is based on a position of a user.

6. The method of claim 1, wherein at least one of the plurality of representations comprises a higher density of views for a first view direction than a second view direction.

7. The method of claim 1, wherein the media manifest file comprises priority data for one or more views, and wherein the selected representation is based on the priority data.

8. A server comprising:

a processor; and a memory storing instructions that are operative, when executed by the processor, to cause the server to:

receive, from an apparatus, a message indicating a request for a media manifest file;

send, to the apparatus, the media manifest file identifying a plurality of representations of a light field video content comprising a plurality of sub-views of an integral light field image, at least a first representation of the plurality of representations comprising a first subset of sub-views of the plurality of sub-views and at least a second representation of the plurality of representations comprising a second subset of sub-views of the plurality of sub-views, wherein the first and second subsets of sub-views each comprise multiple sub-views of the plurality of sub-views, and wherein the second subset of sub-views is different from the first subset of sub-views;

receive, from the apparatus, a selected representation from the plurality of representations; and send, to the apparatus, the selected representation.

* * * * *